United States Patent
Amada et al.

(10) Patent No.: US 7,719,737 B2
(45) Date of Patent: May 18, 2010

(54) OPTICAL SCANNING DEVICE, IMAGE FORMING APPARATUS AND LIQUID CRYSTAL DEVICE DRIVING METHOD

(75) Inventors: Taku Amada, Kanagawa (JP); Seizo Suzuki, Kanagawa (JP); Akihisa Itabashi, Tokyo (JP); Hiroyuki Suhara, Kanagawa (JP); Mitsuo Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/969,709

(22) Filed: Jan. 4, 2008

(65) Prior Publication Data
US 2008/0170282 A1    Jul. 17, 2008

Related U.S. Application Data

(62) Division of application No. 11/032,257, filed on Jan. 11, 2005, now Pat. No. 7,403,316.

(30) Foreign Application Priority Data

Jan. 14, 2004  (JP) .............................. 2004-006820
Feb. 25, 2004  (JP) .............................. 2004-050054
Mar. 31, 2004  (JP) .............................. 2004-105468

(51) Int. Cl.
G02B 26/08  (2006.01)
(52) U.S. Cl. .................. 359/196.1; 359/204.1; 347/239
(58) Field of Classification Search .................. 359/196, 359/196.1–218.1; 349/113; 347/232–239, 347/241–244
See application file for complete search history.

(56) References Cited

U.S. PATENT DOCUMENTS

| 5,566,012 | A  | * | 10/1996 | Koshimizu et al. .......... 349/116 |
| 5,748,272 | A  | * | 5/1998  | Tanaka et al. ................. 349/86 |
| 5,784,141 | A  |   | 7/1998  | Chen et al. |
| 6,342,963 | B1 |   | 1/2002  | Yoshino |
| 2003/0156310 | A1 |  | 8/2003 | Suzuki et al. |
| 2004/0057096 | A1 |  | 3/2004 | Amada et al. |

FOREIGN PATENT DOCUMENTS

| JP | 3-116112 | 5/1991 |
| JP | 04-196869 | 7/1992 |
| JP | 5-19190 | 1/1993 |
| JP | 6-214177 | 8/1994 |
| JP | 07-287165 | 10/1995 |
| JP | 09-128785 | 5/1997 |
| JP | 9-131920 | 5/1997 |
| JP | 10-239607 | 9/1998 |
| JP | 10-239939 | 9/1998 |
| JP | 2001-100127 | 4/2001 |
| JP | 2001-133718 | 5/2001 |
| JP | 2001-166237 | 6/2001 |
| JP | 2001-305453 | 10/2001 |
| JP | 2002-214579 | 7/2002 |

(Continued)

*Primary Examiner*—Euncha P Cherry
(74) *Attorney, Agent, or Firm*—Oblon, Spivak, McClelland, Maier & Neustadt, L.L.P.

(57) ABSTRACT

An optical scanning device includes a laser-beam-phase-modulatable liquid crystal device. The liquid crystal device has stripe-like electrode patterns arranged in one direction, with a provision of a part for changing an effective value of a driving voltage separately for each of stripe-like electrode patterns.

42 Claims, 30 Drawing Sheets

| | FOREIGN PATENT DOCUMENTS | |
|---|---|---|
| JP | 2002-341270 | 11/2002 |
| JP | 2003-075762 | 3/2003 |
| JP | 2003-107382 | 4/2003 |
| JP | 2003-295153 | 10/2003 |
| JP | 2003-337293 | 11/2003 |

* cited by examiner

| | SURFACE NUMBER | | 10°C | 25°C | 45°C | NOTE |
|---|---|---|---|---|---|---|
| CYLINDRICAL LENS 113 | 2 | SUB | 64.49 | 64.50 | 64.51 | GLASS<br>α=7.5E-06<br>[1/°C] |
| | | REFRACTIVE INDEX | 1.51439 | 1.51433 | 1.51425 | |
| FIRST SCANNING LENS 115-1 | 6 | COAXIAL r1 | -312.56 | -312.60 | -312.64 | |
| | 7 | COAXIAL r2 | -82.94 | -82.95 | -82.96 | |
| | | REFRACTIVE INDEX | 1.52722 | 1.52716 | 1.52708 | |
| SECOND SCANNING LENS 115-2 | 8 | MAIN r1 | -499.94 | -500.00 | -500.08 | |
| | | SUB | -47.68 | -47.68 | -47.69 | |
| | 9 | MAIN r2 | -999.89 | -1000.00 | -1000.15 | |
| | | SUB | -23.38 | -23.38 | -23.38 | |
| | | REFRACTIVE INDEX | 1.52722 | 1.52716 | 1.52708 | |

NOTE: ALTHOUGH NOT SHOWN AS NUMERICAL VALUE, ASPHERICAL COEFFICIENT CHANGES ALONG WITH COEFFICIENT OF LINEAR EXPANSION. COAXIAL MEANS ROTATIONAL SYMMETRICAL. OSCILLATION WAVELENGTH OF SEMICONDUCTOR LASER CHANGES ALONG WITH TEMPERATURE (Δn = -0.2 [nm/°C]).

(b)

| SURFACE NUMBER | Rm[mm] | Rs[mm] | X[mm] | N(25°C) | NOTE |
|---|---|---|---|---|---|
| 0 | — | — | — | | LIQUID CRYSTAL DEVICE 143 (EXIT SURFACE) |
| 1 | ∞ | ∞ | 29.0 | | (OMITTED) |
| 2 | ∞ | ∞ | 3.0 | | (OMITTED) |
| 3 | ∞ | 64.5 | | 1.514 | CYLINDRICAL LENS 113 (ENTRANCE SURFACE) |
| 4 | ∞ | ∞ | 124.9 | | (EXIT SURFACE) |
| 5 | ∞ | ∞ | 62.8 | (REFLECTION) | POLYGON MIRROR 114 (REFLECTIVE SURFACE) |
| 6* | -312.6 | ↑ | 31.4 | 1.527 | FIRST SCANNING LENS 115-1 (ENTRANCE SURFACE) |
| 7* | -83.0 | ↑ | 78.0 | | (EXIT SURFACE) |
| 8* | -500.0 | -47.7 | 3.5 | 1.527 | SECOND SCANNING LENS 115-2 (ENTRANCE SURFACE) |
| 9* | -1000.0 | -23.4 | 142.3 | | (EXIT SURFACE) |
| 10 | — | — | — | | PHOTOCONDUCTIVE BODY (TO-BE-SCANNED SURFACE) 116 |

NOTE: IN THIS TABLE, ASTERISKED SURFACE IS ASPHERICAL SURFACE.

FIG.15

| | SURFACE NUMBER | | 10°C | 25°C | 45°C | NOTE |
|---|---|---|---|---|---|---|
| CYLINDRICAL LENS 113 | 2 | r1 SUB | 64.49 | 64.50 | 64.51 | GLASS α=7.5E-06 [1/°C] |
| | | REFRACTIVE INDEX | 1.51439 | 1.51433 | 1.51425 | |
| FIRST SCANNING LENS 115-1 | 6 | r1 COAXIAL | -312.27 | -312.60 | -313.04 | RESINOUS α=7.0E-05 [1/°C] |
| | 7 | r2 COAXIAL | -82.86 | -82.59 | -83.07 | |
| | | REFRACTIVE INDEX | 1.52888 | 1.52716 | 1.52535 | |
| SECOND SCANNING LENS 115-2 | 8 | r1 MAIN | -499.48 | -500.00 | -500.70 | |
| | | SUB | -47.63 | -47.68 | -47.75 | |
| | 9 | r2 MAIN | -998.95 | -1000.00 | -1001.40 | |
| | | SUB | -23.36 | -23.38 | -23.41 | |
| | | REFRACTIVE INDEX | 1.52888 | 1.52716 | 1.52535 | |

(a)

| | SURFACE NUMBER | | 10°C | 25°C | 45°C | NOTE |
|---|---|---|---|---|---|---|
| TEMPERATURE CORRECTION LENS 122 | 1 | COAXIAL | 139.85 | 140.00 | 140.20 | RESINOUS α=7.0E-05[1/°C] |
| | | REFRACTIVE INDEX | 1.52888 | 1.52716 | 1.52535 | |
| CYLINDRICAL LENS 113 | 3 | SUB | 64.49 | 64.50 | 64.51 | |
| | | REFRACTIVE INDEX | 1.51439 | 1.51433 | 1.51425 | |
| FIRST SCANNING LENS 115-1 | 6 | r1 COAXIAL | -312.56 | -312.59 | -312.64 | |
| | 7 | r2 COAXIAL | -82.94 | -82.95 | -82.96 | |
| | | REFRACTIVE INDEX | 1.52722 | 1.52716 | 1.52708 | |
| SECOND SCANNING LENS 115-2 | 8 | r1 MAIN | -499.94 | -500.00 | -500.08 | GLASS α=7.5E-06[1/°C] |
| | | SUB | -47.68 | -47.68 | -47.69 | |
| | 9 | r2 MAIN | -999.89 | -1000.00 | -1000.15 | |
| | | SUB | -23.38 | -23.38 | -23.38 | |
| | | REFRACTIVE INDEX | 1.52722 | 1.52716 | 1.52708 | |

(b)

| SURFACE NUMBER | Rm[mm] | Rs[mm] | X[mm] | N(25°C) | NOTE | |
|---|---|---|---|---|---|---|
| 0 | – | – | 13.0 | | LIQUID CRYSTAL DEVICE 143 | (EXIT SURFACE) |
| 1 | 140.0 | ↓ | 3.0 | 1.52716 | TEMPERATURE CORRECTION LENS 122 | (ENTRANCE SURFACE) |
| 2 | ∞ | ∞ | 13.0 | | | (EXIT SURFACE) |
| 3 | ∞ | 64.5 | 3.0 | 1.514 | CYLINDRICAL LENS 113 | (ENTRANCE SURFACE) |
| 4 | ∞ | ∞ | 124.9 | | | (EXIT SURFACE) |
| 5 | ∞ | ∞ | 62.8 | (REFLECTION) | POLYGON MIRROR 114 | (REFLECTIVE SURFACE) |
| 6* | -312.6 | ↓ | 31.4 | 1.527 | FIRST SCANNING LENS 115-1 | (ENTRANCE SURFACE) |
| 7* | -83.0 | ↓ | 78.0 | | | (EXIT SURFACE) |
| 8* | -500.0 | -47.7 | 3.5 | 1.527 | SECOND SCANNING LENS 115-2 | (ENTRANCE SURFACE) |
| 9* | -1000.0 | -23.4 | 142.3 | | | (EXIT SURFACE) |
| 10 | – | – | – | | PHOTOCONDUCTIVE BODY (TO-BE-SCANNED SURFACE) 116 | |

| | | Material of chief optical device | Beam waist positional shift amount upon temperature change from 25°C to 45°C | |
|---|---|---|---|---|
| | | | Main scan direction | Sub-scan direction |
| Comparison Example | Configuration (A) | Cylindrical lens: glass<br>Scanning optical system: glass | −1.17 | −0.36 |
| Present Invention | Configuration (B) | Cylindrical lens: glass<br>Scanning optical system: resinous | −0.06 | +0.87 |
| Another one of Present Invention | Configuration (C) | Cylindrical lens: glass<br>Temperature correction lens: resinous<br>Scanning optical system: glass | −0.01 | +0.11 |

OPTICAL SCANNING DEVICE, IMAGE FORMING APPARATUS AND LIQUID CRYSTAL DEVICE DRIVING METHOD

CROSS-REFERENCE TO RELATED APPLICATIONS

This application is a divisional of U.S. application Ser. No. 11/032,257, filed Jan. 11, 2005, now U.S. Pat. No. 7,403,316 and is based upon and claims the benefit of priority from prior Japanese Patent Application Nos. 2004-105468, filed Mar. 31, 2004, 2004-050054, filed Feb. 25, 2004, and 2004-006820, filed Jan. 14, 2004. The entire contents of each of these documents are incorporated herein by reference.

BACKGROUND OF THE INVENTION

1. Field of the Invention

The present invention relates to an optical scanning device, an image forming apparatus and a liquid crystal device driving method, and, in particular, to an optical scanning device or a multi-beam optical scanning device used for a laser writing optical system, an image forming apparatus such as a laser writing optical system, or a laser printer, a digital copier, a laser facsimile machine, a laser plotter, or such.

The present invention also relates to an optical scanning device provided with a liquid crystal device which can modulate phase of a laser beam, to an image forming apparatus, such as a laser writing optical system, or a laser printer, a digital copier, a laser facsimile machine, a laser plotter or such, employing the optical scanning device and a liquid crystal device driving method carried out in the optical scanning device.

2. Description of the Related Art

Recently, performance of an image forming apparatus such as a laser printer, a digital copier or such, has been improved, i.e., image quality is improved, processing speed is increased, and color printing or color copy could be practically carried out. Along with such an improvement of the performance, users are requesting a further higher quality.

For the request for processing speed, to apply a multi-beam manner is effective. However, in this manner, pitch adjustment among a plurality of beams is required. For this purpose, a method of rotating a multi-beam light source about an optical axis, a method of using an optical device prepared for pitch adjustment or such may be applied (for example, see Japanese Laid-open Patent Application No. 9-131920).

For the request for image quality improvement, reduction of a beam spot is required. Various methods have been proposed therefor (for example, see Japanese Laid-open Patent Applications Nos. 3-116112, 5-19190 and 2001-166237).

However, technical problems exist in actually achieving reduction of a beam spot diameter. In particular, it is necessary to consider that an image forming apparatus or an optical scanning device has many heat sources such as a fixing unit, a polygon scanner or such. Accordingly, it is necessary to take account of temperature fluctuation in the operation environment in seeking the reduction of a beam spot diameter.

In the above-mentioned related art of rotating a light source unit about an optical axis, since the light source unit itself is moved in this art, a problem may occur in terms of reliability of the electrical components. Further, in the related art of using an optical device for pitch adjustment, since a high accuracy glass optical device is required, a problem in terms of the required cost may occur.

Further, even if a beam spot diameter is adjusted initially at a high accuracy, a positional shift of the beam spot may occur due to influence of aging such as temperature fluctuation or such.

Therefore, a liquid crystal device driven by an electrical signal has been proposed to carry out the above-mentioned pitch adjustment (for example, see Japanese Laid-open Patent Application No. 6-214177). In this method, a beam pitch is detected by means of a detector, and, based on the detection result, the liquid crystal device is driven. Thereby, it is possible to correct for the aging variation of the beam pitch. The liquid crystal device is advantageous when it is used as a beam pitch adjustment device in that it is driven by a low voltage signal, does not generate heat, does not generate vibration, does not generate noise, is small sized, and also, is light weighted.

This liquid crystal device acting as the pitch adjustment device has a cell structure in which a liquid crystal layer on the order of several through tens of μm is sealed by two glass substrates. Therefore, a central part of the liquid crystal layer having a relatively high thermal expansion coefficient expands when an ambient temperature increases. As a result, a positive power lens function may appear. When the liquid crystal device thus has such a lens function due to increase in the ambient temperature, a beam waist position may shift, and thus, the beam spot diameter may degrade (increase).

In an optical scanning device used in an optical writing part of an image forming apparatus, a rotational speed of a polygon mirror acting as a deflection device may be improved for the purpose of improving a recording speed. However, in this case, a problem may occur in terms of durability, noise or vibration of a polygon motor, a problem in a laser modulation speed or such, and thus, there is a limit in the improvement of the recording speed in this manner. Therefore, as an alternative method, a multi-beam scanning device is proposed by which a plurality of laser beams are used to simultaneously carry out scanning and recording a plurality of scan lines simultaneously.

As a type of a multi-beam light source device emitting a plurality of laser beams used in the multi-beam scanning device, there is a type in which a multi-beam semiconductor laser (for example, a semiconductor array) having a plurality of light emitting points (light emitting channels) enclosed by a single package is used. However, it is difficult to increase the number of the channels in terms of manufacturing process. Also, it is difficult to remove influence of thermal/electrical crosstalk. Further, it is difficult to shorten the oscillation wavelength. As a result, the light source device may become expensive.

On the other hand, many proposals have been made for a light source device in which a single beam semiconductor laser is used as a light source, and, with the use of a beam creation device, a plurality of laser beams are created therefrom, and a multi-beam scanning device uses them. However, in this method, a problem in which an arrangement of beam spots (beam pitch, or scan line separation) on a to-be-scanned surface may change due to environmental fluctuation, aging fluctuation or such may occur. Then, many proposals have been made for solving this problem.

The present applicant made one proposal in Japanese Laid-open Patent Application No. 2003-337293, 'Optical Scanning Device, Light Source Device and Image Forming Apparatus'. In the art, a 'liquid crystal device' driven by an electrical signal is used to correct beam spot arrangement on a to-be-scanned surface. In this art, in order to control the beam spot arrangement on the to-be-scanned surface, the liquid crystal device is used as a 'light path deflection device' which is disposed in or immediately subsequent to a light source part, for deflecting a laser beam by a slight angle (several through tens of minutes).

Recently, along with the request for increasing the recording speed of a color image forming apparatus, for example, a so-called 'four drum tandem type image forming apparatus' is practically used in a form of a digital copier, a laser printer or such. In this apparatus, four photosensitive drums are disposed along a direction of conveying a recording member (for example, a recording paper) or a direction of an intermediate transfer body; latent images are formed thereon simultaneously with exposure thereof by means of corresponding plurality of scanning optical systems; these latent images are then visualized with the use of developing agents of respective different colors, such as yellow, magenta, cyan and black, or such, by means of a developing device; these visualized images are transferred onto the common recording member or intermediate transfer body in a superposing manner; and thus, a color image is obtained thereon.

This four drum tandem type image forming apparatus is advantageous for carrying out high-speed printing in comparison to a one drum type image forming apparatus, in that a color image can be output in the same speed as that for a monochrome image. However, since this type of machine has the four scanning optical systems for the respective four photosensitive drums, a problem may occur in that miniaturization of the machine may be difficult. Further, another problem may occur for avoiding color drift which may occur when the toner images of the respective colors developed on the respective photosensitive drums are transferred to the recording member or the intermediate transfer body in the superposing manner.

The following causes of generation of the above-mentioned color drift in particular in a sub-scan direction in the four drum tandem type image forming apparatus may be cited for example:

(1) fluctuation of a feeding speed of the photosensitive drum in a circumferential direction (the sub-scan direction);

(2) fluctuation of the feeding speed of the recording member or the intermediate transfer body in the conveyance direction (the sub-scan direction);

(3) positional error among the photosensitive drums;

(4) positional error of beam spots written among the scanning optical systems;

(5) positional error of the above-mentioned items (1) through (4) due to environmental fluctuation, or temperature fluctuation occurring when continuous printing is carried out for example; and (6) when writing is carried out simultaneously to the respective photosensitive drums in a multi-beam manner, since rotation of a polygon scanner and the photosensitive drum feeding speed are not in synchronization with one another in general, a positional shift for a number of beams may occur in the sub-scan direction.

As a scheme for avoiding the color drift, the following methods are known for example:

(A) As disclosed in Japanese Laid-open Patent Application No. 2001-133718, in an image forming apparatus using a plurality of scanning devices, a position of each entire scanning device (housing) is adjusted with respect to a photosensitive body, and thus, scan lines can be made coincident on the respective photosensitive bodies. However, in this method, a mechanism may become complicated for the adjustment, and also, a time is required for the adjustment. Furthermore, since the housing having a large weight is adjusted in its position, it may be difficult to respond to an aging fluctuation such as temperature fluctuation, and thus, it may be difficult to carry out color drift correction at high accuracy during printing or for possible fluctuation in the operation environment.

(B) As disclosed in Japanese Laid-open Patent Application No. 2001-100127, a galvano mirror is used to control the sub-scan beam position. However, since the galvano mirror has a sensitivity too high to control the sub-scan position, the control may be easily affected by external vibration, and thus, a high surface accuracy (approximately four times that of a transmission surface) is required for maintaining a further satisfactory beam spot diameter.

(C) As a configuration of solving the problem of positional error among the multiple beams, Japanese Laid-open Patent Application No. 10-239939 discloses a color image forming apparatus having a correction device which switches a laser beam to write an image first from among a plurality of laser beams according to a phase relationship between an intermediate transfer reference signal and a line synchronization signal, whereby an image writing start position can be adjusted for each color in a sub-scan direction, and thus, the color drift can be corrected. However, even by applying this method. it is not possible to achieve a correction in an amount smaller than one line, and, as a result, a color drift more than 42 µm may occur in a case of writing in 600 dpi ('dpi': dots per inch) for example.

Japanese Laid-open Patent Application No. 2002-214579 discloses one example of the prior art for deflecting a laser beam path with the use of a liquid crystal device. In this example relating to an image display apparatus, by applying a voltage to a transparent electrode array formed in an arrangement pitch corresponding to the pixel pitch, an uneven electric field is formed in the liquid crystal layer, and, a light path is deflected by means of refractive index distribution thus generated in the liquid crystal layer.

However, in this case of the deflection device applying the liquid crystal device in the prior art, a voltage is applied between both ends of the transparent electrodes arranged like a stripe with equal separation, and a resistance member is provided such that an electric potential distribution may have a uniform slope (linear characteristic) in the arrangement direction. When the refractive index distribution in the liquid crystal layer is controlled in such a manner that the electric potential distribution in the liquid crystal layer may have a uniform slope, there is a possibility that, even when the electric potential distribution has a uniform slope, the refractive index distribution in the liquid crystal layer may not necessarily have a uniform slope, but may behave to draw a curve which may be approximated by a high-order polynomial. If a laser beam is applied to the liquid crystal layer appearing such a curved refractive index distribution (that is, having a power component), the liquid crystal acts as a lens, and thus, an optical axis direction of an exit beam therefrom changes unexpectedly (that is, the light path is deflected). In addition, also a condition of convergence or divergence of the exit beam may change unexpectedly.

SUMMARY OF THE INVENTION

The present invention has been devised for the purpose of solving the above-mentioned problems, and, an object of the present invention is to provide an optical scanning device or a multi-beam optical scanning device by which, it is possible to achieve shortening of a beam spot diameter in consideration of temperature fluctuation, and also, it is possible to ensure a high accuracy in a beam spot position, at a low cost.

Further, another object of the present invention is to provide an image forming apparatus employing the above-mentioned optical scanning device or the multi-beam optical scanning device by which a high quality image can be output.

A further object of the present invention is to provide an optical scanning device configured so that, when a liquid crystal device is applied as a light path deflection device (that is, a device controlling a beam spot position on a to-be-scanned surface) in an optical scanning device (optical writing device), change in convergence or divergence condition of an exit beam along with light path deflection of an entrance beam may be well controlled, and thus, a beam spot shape on the to-be-scanned surface may be stabilized. A further another object of the present invention is to provide an image forming apparatus employing this optical scanning device. Further another object of the present invention is to provide a liquid crystal device driving method by which, when a liquid crystal device is applied as a light path deflection device (that is, a device controlling a beam spot position on a to-be-scanned surface) in an optical scanning device (optical writing device), change in convergence or divergence condition of an exit beam along with light path deflection of an entrance beam may be well controlled, and thus, a beam spot shape on the to-be-scanned surface may be stabilized.

More specifically, the present invention has the following objects:

1) to provide an optical scanning device configured so that an electric potential distribution in a liquid crystal layer may be freely controlled;

2) to provide an optical scanning device configured so that an entrance beam may be deflected in its light path without generation of any power component;

3) to provide an optical scanning device configured so that a beam waist positional shift along with a beam spot positional control on a to-be-scanned surface may be well controlled, and a beam spot shape thereon may be stabilized;

4) to provide an optical scanning device configured so that a convergence or divergence condition of a laser beam exiting from a liquid crystal device may be freely controlled;

5) to provide an optical scanning device configured so that, as a result of respective necessary components being mounted on a common substrate, the number of components may be reduced, and the cost may be reduced;

6) to provide a multi-beam optical scanning device configured so that scan line separation may be controlled, or scanning density may be switched;

7) to provide a multi-station optical scanning device applied in a multi-color image forming apparatus, configured so that, inter-station scan line error may be well controlled;

8) to provide an optical scanning device configured so that a beam spot shape on a to-be-scanned surface may be stabilized;

9) to provide an optical scanning device configured so that, based on a beam pitch (or scan line separation) detection result, high accuracy control of beam spot position may be achieved;

10) to provide an optical scanning device configured so that, based on a detection result of a beam waist position (imaging condition), high accuracy control of beam waist position may be achieved; and 11) to provide an optical scanning device configured so that, based on a detection result by means of a temperature sensor provided inside the device, a change in a beam spot position on a to-be-scanned surface or a beam spot position may be well estimated.

Furthermore, another object of the present invention is to provide an image forming apparatus employing the above-mentioned optical scanning device and by which high definition image output can be achieved.

Further another object of the present invention is to provide a liquid crystal device driving method for driving a liquid crystal device applicable as a light path deflection device or a focusing adjustment device.

In order to solve the above-mentioned problems, preferred embodiments of the present invention have the following features/configurations:

(1) An optical scanning device includes:

a light source;

a deflector deflecting a light beam from the light source;

a coupling lens carrying out coupling of the light beam from the light source;

a first optical system leading the light beam from the coupling lens to the deflector;

a scanning optical system leading the light beam deflected by the deflector to a to-be-scanned surface; and a phase-modulatable liquid crystal device disposed on a light path lying from the light source through the to-be-scanned surface and driven by an electric signal, wherein:

the first optical system at least includes an optical device having:

a surface having power positive in a sub-scanning direction; and a surface having power positive in a main scanning direction.

In this configuration, upon assembling of the optical scanning device, a beam waist position can be adjusted, and also, a beam spot position on the to-be-scanned surface can be changed. Accordingly, it is possible to achieve an optical scanning device at a low cost in which a beam spot diameter can be reduced and a high beam spot positional accuracy can be ensured.

(2) In the optical scanning device of item (1):

the first optical system includes at least two optical devices.

In this configuration, it is possible to separate the beam waist position adjustment function at the time of assembly of the optical scanning device and beam waist correction function concerning temperature fluctuation inside of the optical scanning device.

(3) In the optical scanning device of item (1):

at least one optical system included in the first optical system is movable in an optical axis.

In this configuration, it is possible to adjust the beam waist position upon assembly of the optical scanning device.

(4) In the optical scanning device of item (1):

at least one optical system included in the first optical system is resinous.

In this configuration, it is possible to reduce a beam waist positional shift otherwise occurring due to temperature fluctuation inside of the optical scanning device because the optical system is resinous and thus has a relatively high thermal expansion coefficient.

(5) In the optical scanning device of item (1):

at least one surface of an optical devise included in the first optical system has a coaxial (rotatable symmetrical) shape.

In this configuration, it is possible to work for the surface shape at a high accuracy.

(6) In the optical scanning device of item (5):

the coaxial (rotational symmetrical) surface includes an aspherical shape.

In this configuration, it is possible to reduce aberration occurring.

(7) In the optical scanning device of item (1);

a light path of the light beam incident on the light crystal device is deflected by means of phase modulation of the liquid crystal device.

In this configuration, it is possible to change the beam spot position on the to-be-scanned surface.

(8) A multi-beam optical scanning device includes:
a light source;
a deflector deflecting a light beam from the light source;
a coupling lens carrying out coupling of the light beam from the light source;
a first optical system leading the light beam from the coupling lens to the deflector;
a scanning optical system leading the light beam deflected by the deflector to a to-be-scanned surface; and
a phase-modulatable liquid crystal device disposed on a light path lying from the light source through the to-be-scanned surface and driven by an electric signal, wherein:
the first optical system at least includes a surface having power positive in a sub-scanning direction and a surface having power positive in a main scanning direction, wherein:
the liquid crystal device is disposed on at least one of light paths of a plurality of light beams from the light source, and at least two light beams are led to a common to-be-scanned surface.

In this configuration, it is possible to achieve a multi-beam optical scanning device in which separation of a plurality of beam spots (scan line separation) for scanning the to-be-scanned surface can be appropriately corrected. By applying this optical scanning device in an image forming apparatus as an exposing device, it is possible to obtain a printed output image of a high density at a high speed.

(9) A multi-beam optical scanning device includes:
a plurality of light sources;
a deflector deflecting light beams from the light sources;
coupling lenses carrying out coupling of the light beams from the light sources;
a first optical system leading the light beams from the coupling lens to the deflector;
a scanning optical system leading the light beams deflected by the deflector to a to-be-scanned surface; and
a phase-modulatable liquid crystal device disposed on a light path lying from the light source through the to-be-scanned surface and driven by an electric signal, wherein:
the first optical system at least includes a surface having power positive in a sub-scanning direction and a surface having power positive in a main scanning direction, wherein:
the liquid crystal device is disposed on at least one of light paths of the plurality of light beams from the light sources, and at least one of the plurality of light beams is led to a to-be-scanned surface different from a to-be-scanned surface to which another light beam is led.

In this configuration, it is possible to achieve a multi-beam optical scanning device in which relative position among a plurality of beam spots scanning a plurality of to-be-scanned surfaces respectively can be appropriately corrected. By applying this optical scanning device in an image forming apparatus as an exposing device, it is possible to obtain a printed output image of reduced color drift among image carrying bodies (to-be-scanned surfaces).

(10) An image forming apparatus includes:
an image carrying body;
an exposing part exposing the image carrying body with a light beam, and forming a latent image thereon;
a developing part developing the latent image formed on the image carrying body;
a transferring part transferring a thus-visualized image from the image carrying body to a recording medium; and
a fixing part fixing an image thus transferred to the recording medium, wherein:
the optical scanning device of any one of items (1) through (7), or the multi-beam scanning device of item (8) or (9) is applied as the exposing part for forming the latent image on the image carrying body.

In this configuration, it is possible to apply beam spot(s) at desired position(s) on the to-be scanned surface(s) (image carrying body (bodies)) for scanning it (them), and thus, it is possible to obtain a high-density, high-quality printed output image at a high speed.

(11) An optical scanning device includes:
a light source;
a deflector deflecting a light beam from the light source;
a coupling lens carrying out coupling on the light beam from the light source;
a scanning optical system leading the light beam deflected by the deflector to a to-be-scanned surface; and
a phase-modulatable liquid crystal device, wherein:
at least one optical device provided on a light path has a surface of a positive power, and also, is resinous.

In this configuration, it is possible to cancel out power change of the liquid crystal device occurring due to temperature change by power change of the resinous optical device in the optical scanning device provided with the phase-modulatable liquid crystal device, and thus, it is possible to correct a beam waist positional shift on the to-be-scanned surface.

(12) In the optical scanning device of item (11):
the resinous optical device having the positive power is included in the scanning optical system.

In this configuration, by providing a configuration such that the scanning optical lens having a complicated aspherical shape is made of resin, it is possible to produce it easily in a mass-production manner.

(13) In the optical scanning device of item (11):
the resinous optical device having the positive power is provided between the coupling lens and the deflector.

In this configuration, by providing a function of correcting a beam waist positional shift in the optical system provided between the coupling lens and the deflector, it is possible to improve design freedom in comparison to a case where the same correction function is provided in the scanning optical system. Furthermore, by providing a configuration such that the optical system provided between the coupling lens and the deflector includes a plurality of optical devices, it is possible to effectively correct the beam waist position.

(14) In the optical scanning device as claimed of item (11):
the phase-modulatable liquid crystal device has a function of deflecting a light path of the incident light beam.

In this configuration, as a result of deflecting a laser beam path by a slight angle by means of the liquid crystal device, it is possible to appropriately change a beam spot position on the to-be scanned surface.

(15) In the optical scanning device as claimed of item (14):
the phase-modulatable liquid crystal device has a focus adjustment function.

In this configuration, by controlling divergent, convergent or parallel condition of a laser beam by means of the liquid crystal device, it is possible to intentionally control, with an external electric signal, a beam waist position in the vicinity of the to-be-scanned surface.

(16) In the optical scanning device of any one of items (11) through (15):
a plurality of light sources are provided, wherein:
the liquid crystal device is disposed on at least one of light paths of a plurality of light beams emitted by the plurality of light sources; and
at least two light beams are led to the common to-be-scanned surface.

In this configuration, a multi-beam scanning device for scanning a single to-be-scanned surface with a plurality of laser beams is provided. By applying this device in an image forming apparatus as an exposing device, it is possible to reduce the rotation speed of a polygon mirror when a predetermined number of sheets of printed images are output in comparison to a case of applying a single-laser-beam scanning device. Thus, it is possible to reduce heat generation, noise and power consumption, and thus, it is possible to achieve energy saving. In this case, since beam spot position on the to-be-scanned surface can be corrected by means of the deflection function of the liquid crystal device, it is possible to highly accurately control scan line separation, and thus, it is possible to obtain a high quality output image.

(17) In the optical scanning device of any one of items (11) through (16):

a plurality of light sources are provided, wherein:

the liquid crystal device is disposed on at least one of light paths of a plurality of light beams emitted by the plurality of light sources; and at least one of the plurality of light beams is led to a to-be-scanned surface different from a to-be-scanned surface to which another light beam is led.

In this configuration, a multi-beam scanning device having a function of correcting relative position among a plurality of beam spots scanning a plurality of to-be-scanned surfaces respectively is provided. By applying this device in a tandem type (color) image forming apparatus, it is possible to obtain a printed output image having reduced color drift among a plurality of photosensitive drums (to-be-scanned surfaces). Thereby, it is possible to reduce the number of timings (frequency) to detect color drift among the respective photosensitive bodies, and, in a case of an image forming apparatus in which a toner image should be produced specially for color drift detection, it is possible to reduce a required toner amount, and thus, it is possible to reduce useless toner discharge.

(18) In the optical scanning device of item (11):

an optical system including at least two optical devices is provided between the coupling and the deflector; and the optical system includes a resinous optical device at least having positive-power rotationally-symmetrical surface.

In this configuration, since not only beam waist correction at a time of temperature change can be carried out but also a temperature correction lens is disposed movably in the optical axis direction, it is possible to correct a beam waist position upon assembly of the optical scanning device. Further, by applying the rotationally-symmetrical surface, it is possible to reduce occurrence of mounting error (in a rotational direction) upon carrying out movement adjustment.

(19) In an image forming apparatus forming an image on an image carrying body by carrying out an electronic photographic process:

the optical scanning device of any one of items (11) through (18) is applied to a part which carries out an exposing process of the electronic photographic process.

In this configuration, since the optical scanning device having a function of applying a beam spot at a desired position to scan a to-be-scanned surface (photosensitive body) is applied as an exposing device of the image forming apparatus, it is possible to obtain a high-density, high-quality printed output image at a high speed.

(20) In an optical scanning device including a laser-beam-phase-modulatable liquid crystal device:

the liquid crystal device has stripe-like electrode patterns arranged in one direction, with provision of a part configured to change an effective value of a driving voltage separately for each of the stripe-like electrode patterns.

In this configuration, by controlling the voltages applied to the stripe-like electrode patterns respectively, it is possible to arbitrarily control a phase of a laser beam transmitted by the liquid crystal device.

(21) In an optical scanning device including a laser-beam-phase-modulatable liquid crystal device:

the liquid crystal device has stripe-like electrode patterns arranged in one direction, wherein;

a phase difference obtained from driving the liquid crystal device is in proportion to a position (coordinate) in the direction of the arrangement of the stripe-like electrode patterns.

In this configuration, it is possible to change a phase difference to be obtained as a result of the liquid crystal device being driven linearly within an effective area of the liquid crystal device in a simple driving method.

(22) In the optical scanning device of item (20):

an effective value of a driving voltage is separately changed for each of the stripe-like electrode patterns in such a manner that a phase difference obtained from driving the liquid crystal device may be in proportion to a position (coordinate) in the direction of the arrangement of the stripe-like electrode patterns.

In this configuration, in addition to the effects and the advantages of the configuration of item (20), even when the driving voltage and the thus-obtained phase difference do not have a proportional relationship, it is possible to cause the phase difference to be obtained in the effective area of the liquid crystal device to be distributed linearly.

(23) In the optical scanning device of item (20):

an effective value of a driving voltage is separately changed for each of the stripe-like electrode patterns in such a manner that a difference (PV within an entrance beam diameter) between a maximum value and a minimum value of a curve obtained from removing a slope component from a curve obtained from approximating, by a polynomial having a quadratic order or more, a deviation between a transmission wavefront aberration of transmitted light when the liquid crystal device is driven and the same when the liquid crystal device is not driven may be equal to or less than $\lambda/4$ (where $\lambda$ denotes a laser beam wavelength). It is noted that, throughout the specification, PV is an abbreviation of 'a peak to a valley' and means a difference between the maximum value and the minimum value.

In this configuration, in addition to the effects and the advantages of the configuration of item (20), since degradation of wavefront aberration occurring due to driving of the liquid crystal device is controlled to be less than a permissible value, it is possible to avoid degradation of a beam spot shape on the to-be-scanned surface.

(24) In the optical scanning device of item (20):

an effective value of a driving voltage is separately changed for each of the stripe-like electrode patterns in such a manner that a phase difference curve with respect to a position (coordinate) in the direction of the arrangement of the stripe-like electrode patterns may be at least approximated by a polynomial having a quadratic order or more.

In this configuration, in addition to the effects and the advantages of the configuration of item (20), since it is possible to obtain a lens function obtained from phase modulation obtained by means of the liquid crystal device, it is possible to control convergent (or divergent) condition of a laser beam incident on the liquid crystal device.

(25) In the optical scanning device of any one of items (20) through (24):

an integrated circuit (IC) generating an eclectic signal driving the liquid crystal device is mounted on a substrate on which also an integrated circuit (IC) generating an electric signal driving a semiconductor laser emitting a laser beam is mounted.

In this configuration, in addition to the effects and the advantages of the configuration of items (20) through (24), since the liquid crystal device driving IC and the semiconductor laser driving IC are mounted on the common substrate, it is possible to reduce the number of components/parts as well as the costs therefor.

(26) In optical scanning device of any one of items (20) through (24):

an electric signal driving the liquid crystal device and an electric signal driving a semiconductor laser emitting a laser beam are generated by a common integrated circuit (IC).

In this configuration, in addition to the effects and the advantages of the configuration of items (20) through (24), since liquid crystal device and semiconductor laser driving signals are made to be generated from the common IC, it is possible to further reduce the number of components/parts as well as the costs therefor.

(27) In the optical scanning device of any one of items (20) through (23), (25) and (26):

a plurality of laser beams are used to scan a common to-be-scanned surface, and, by means of the liquid crystal device, a position of a laser spot of at least one laser beam is made changeable.

In this configuration, in addition to the effects and the advantages of the configuration of items (20) through (23), (25) and (26), as a result of disposing the liquid crystal device in the so-called 'multi-beam scanning device', it is possible to correct scan line separation in the multi-beam scanning device.

(28) In the optical scanning device any one of items (20) through (23), (25) and (26):

a plurality of laser beams are used to scan different to-be-scanned surfaces, and, by means of the liquid crystal device, a position of a laser spot of at least one laser beam which scans to-be-scanned surface is made changeable.

In this configuration, in addition to the effects and the advantages of the configuration of items (20) through (23), (25) and (26), by disposing the liquid crystal device in the so-called 'multi-station scanning device', it is possible to appropriately correct relative positions of scan lines among the respective stations.

(29) In the optical scanning device of any one of items (20) and (24) through (26):

by means of the liquid crystal device, a position (imaging position) of a beam waist of a laser beam in the vicinity of a to-be-scanned surface is made changeable.

In this configuration, in addition of the effects and the advantages of items (20) and (24) through (26), since it is possible to obtain a lens function from a phase modulation obtained by means of the liquid crystal device, it is possible to carry out beam waist position (focus position) adjustment.

(30) The optical scanning device of item (27) or (28), includes:

a detecting part configured to detect position of beam spots of the laser beam or beam spot separation on the to-be-scanned surface, wherein:

a beam spot position of at least one laser beam is corrected based on a detection result from the detecting part.

In this configuration, in addition to the effects and advantages of items (27) and (28), since beam spot position and/or beam spot separation are controlled based on the detection results therefor, it is possible to achieve high accuracy correction.

(31) The optical scanning device of item (29), includes:

a detecting part configured to detect a position (imaging position) of a beam waist of the laser beam in the vicinity of the to-be-scanned surface, wherein:

based on a detection result from the detecting part, the position of the beam waist is appropriately corrected.

In this configuration, in addition to the effects and the advantages of item (29), since beam waist position is controlled based on a detection result thereof, it is possible to achieve high accuracy correction.

(32) The optical scanning device of any one of items (27) through (29) includes:

a temperature detecting part configured to detect a temperature inside of the device, wherein:

based on a detection result from the temperature detecting part, at least one of a beam spot position on the to-be-scanned surface, beam spot separation and a beam waist position is corrected.

In this configuration, in addition to the effects and the advantages of the items (27) through (29), it is possible to recognize the environment (temperature) condition inside of the device with a relatively inexpensive detection device (temperature sensor), and, based on the detection results, it is possible to correct the beam spot position, the beam spot separation and/or the beam waist position.

(33) An image forming apparatus includes:

an image carrying body having photoconductivity;

a charging part electrically charging the image carrying body;

an optical scanning device forming an electrostatic latent image by scanning the electrically charged image carrying body with a laser beam;

a developing part visualizing with toner the electrostatic latent image on the image carrying body; and a transferring part transferring a thus-visualized toner image to a recording medium or to an intermediate transfer body, wherein:

as the optical scanning device, the optical scanning device of any one of items (20) through (32) is provided in the apparatus.

In this configuration, it is possible to provide an image forming apparatus by which an image can be output with a well-reduced shift of beam spot position, beam spot separation and/or scan line separation on the to-be-scanned surface.

(34) In the image forming apparatus of item (33):

based on a detection result of a detecting part configured to detect at least one of a position of the toner image visualized by the developing part or an area of the toner image, at least one of a beam spot position on the image carrying body and a beam waist position is corrected.

In this configuration, in addition to the effects and the advantages of item (33), it is possible to recognize beam spot characteristics (beam spot position and imaging state) in the optical scanning device from a detection result of a toner image position and/or area detection device, and thus it is possible to obtain a high quality image based thereon.

(35) An image forming apparatus includes:

a plurality of image carrying bodies provided side by side each having photoconductivity;

a charging part electrically charging each image carrying body;

an optical scanning device forming an electrostatic latent image by scanning each electrically charged image carrying body with a laser beam;

a developing part visualizing with toner of a respective color the electrostatic latent image produced on each image carrying body; and a transferring part transferring a thus-visualized toner image of the respective color to a recording medium or to an intermediate transfer body, on each other in a superposing manner in sequence, wherein:

as the optical scanning device, the optical scanning device of any one of items (20) through (32) is provided in the apparatus.

In this configuration, it is possible to provide an image forming apparatus in which shift in beam spot position, beam spot separation and/or scan line separation is well reduced, color drift in multi-color image is well reduced, and also, an image can be output with superior color reproducibility.

(36) In the image forming apparatus of item (35):

based on a detection result of a detecting part configured to detect at least one of a position of the toner image of each color visualized by the developing part or an area of the toner image, at least one of a beam spot position on each image carrying body and a beam waist position is corrected.

In this configuration, in addition to the effects and the advantages of the configuration of item (35), it is possible to recognize beam spot characteristics (beam spot position and imaging state) in the optical scanning device from a detection result of a toner position and/or area detecting device, and thus, based thereon, it is possible to obtain a high-quality output image with superior color reproducibility.

(37) In a method of driving a liquid crystal device in an optical scanning device provided with a laser-beam-phase-modulatable liquid crystal device:

the liquid crystal device has stripe-like electrode patterns arranged in one direction, the method includes the step of:

changing an effective value of a driving voltage separately for each of the stripe-like electrode patterns.

In this configuration, by controlling the voltages applied to the stripe-like electrode patterns of the liquid crystal device, it is possible to arbitrarily control a phase of a laser beam exiting from the liquid crystal device.

(38) In a method of driving a liquid crystal device in an optical scanning device provided with a laser-beam-phase-modulatable liquid crystal device:

the liquid crystal device has stripe-like electrode patterns arranged in one direction, wherein;

a phase difference obtained from driving the liquid crystal device is in proportion to a position (coordinate) in the direction of the arrangement of the stripe-like electrode patterns.

In this configuration, it is possible to change a phase difference to be obtained as a result of the liquid crystal device being driven linearly within an effective area of the liquid crystal device in a simple driving method.

(39) The method of driving the liquid crystal device of item (37) includes the step of:

separately changing an effective value of a driving voltage for each of the stripe-like electrode patterns in such a manner that a phase difference obtained from driving the liquid crystal device may be in proportion to a position (coordinate) in the direction of the arrangement of the stripe-like electrode patterns.

In this configuration, in addition to the effects and the advantages of the configuration of item (20), even if the driving voltage and the thus-obtained phase difference do not have a proportional relationship, it is possible to cause the phase difference to be obtained from the effective area of the liquid crystal device to be distributed linearly.

(40) The method of driving the liquid crystal device of item (37) includes the step of:

separately changing an effective value of a driving voltage for each of the stripe-like electrode patterns in such a manner that a difference (PV within an entrance beam diameter) between a maximum value and a minimum value of a curve obtained from removing a slope component from a curve obtained from approximating, by a polynomial having a quadratic order or more, a deviation between a transmission wavefront aberration of transmitted light obtained when the liquid crystal device is driven and the same obtained when the liquid crystal device is not driven may be equal to or less than $\lambda/4$ (where $\lambda$ denotes a laser beam wavelength).

In this configuration, in addition to the effects and the advantages of the configuration of item (37), since degradation of wavefront aberration occurring due to driving of the liquid crystal device is controlled to be less than a permissible value, it is possible to avoid degradation of a beam spot shape on the to-be-scanned surface.

(41) The method of driving the liquid crystal device of item (37) includes the step of:

separately changing an effective value of a driving voltage for each of the stripe-like electrode patterns in such a manner that a phase difference curve with respect to a position (coordinate) in the direction of the arrangement of the stripe-like electrode patterns may be at least approximated by a polynomial having a quadratic order or more.

In this configuration, in addition to the effects and the advantages of the configuration of item (37), since it is possible to obtain a lens function obtained from phase modulation by means of the liquid crystal device, it is possible to control convergent (or divergent) condition of a laser beam incident on the liquid crystal device.

Thus, in the liquid crystal device driving method in any one of items (37) through (41), it is possible to provide a liquid crystal device driving method by which wavefront can be controlled to a desired shape (phase modulation can be appropriately carried out).

BRIEF DESCRIPTION OF THE DRAWINGS

Other objects and further features of the present invention will become more apparent from the following detailed description when read in conjunction with the accompanying drawings:

FIGS. 14, 15 and 16 show optical data in embodiments of the second aspect of the present invention;

FIG. 17 illustrates an advantage of an embodiment of the second aspect of the present invention;

DETAILED DESCRIPTION OF THE PREFERRED EMBODIMENTS

Configurations and operations of the present invention will be described based on embodiments shown in the figures in details.

A first embodiment of a first aspect of the present invention is described.

First, an optical scanning device in which a sub-scan beam spot position is adjustable by means of a liquid crystal device is described.

Figure 1:
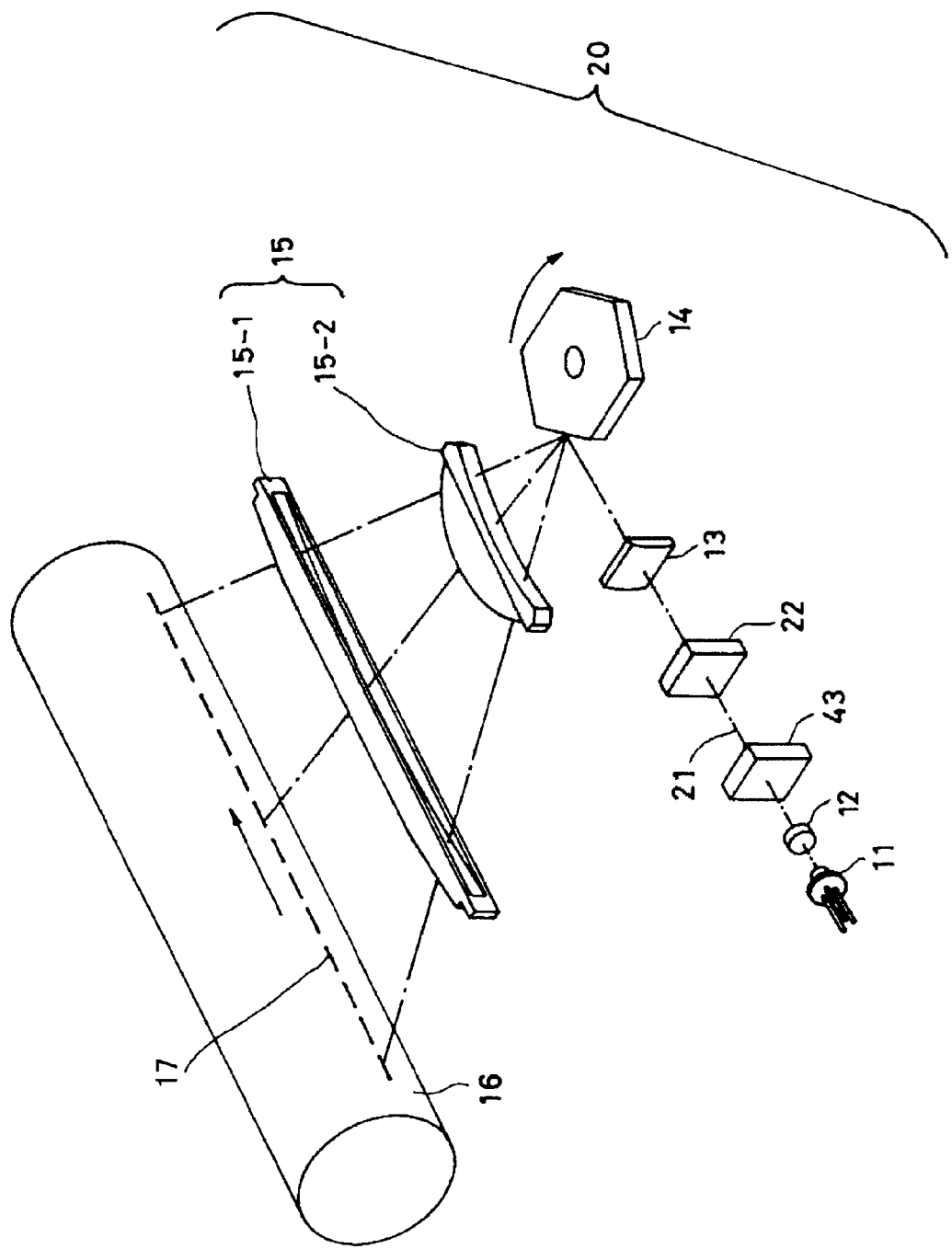
FIG. 1 shows a general configuration diagram of an optical scanning device according to one embodiment of a first aspect of the present invention.

FIG. 1 shows one example of an optical scanning device used as an exposing device in an image forming apparatus. As shown, the optical scanning device includes a light source 11, a coupling lens 12, a cylindrical lens 13, a polygon mirror 14 acting as a deflector, a scanning optical system including a first scanning lens 15-1, a second scanning lens 15-2, a to-be-scanned surface 16, a correction lens 22 and a liquid crystal device 43.

This optical scanning device is used for scanning the to-be-scanned surface with a laser beam emitted from the single light source (for example, a semiconductor laser) 11. However, it is also possible to apply the present invention to a multi-beam optical scanning device for simultaneously scanning with a plurality of laser beams emitted from a respective plurality of light sources (for example, a semiconductor array).

The laser beam 21 emitted from the semiconductor laser 11 and passing through the coupling lens 12 is imaged as a line image on a deflection reflective surface (imaged in a sub-scan direction and long in a main scan direction) of the polygon mirror 14 acting as the deflector by a function of the cylindrical lens 13. Then, the laser beam is deflected by the polygon mirror 14 and scans the to-be-scanned surface (photosensitive drum) 16 with a form of a beam spot to draw a scan line 17 thereon.

Such a device of scanning the to-be-scanned surface 16 with a light beam emitted from a light source with a form of a beam spot is called 'optical scanning device', hereinafter.

In the above-mentioned 'main scan direction' and 'sub-scan direction' mean, respectively, a direction in which the to-be-scanned surface is scanned by the beam spot and a direction perpendicular thereto, commonly. However, in the specification of the present application, directions corresponding to the main scan direction and the sub-scan direction (on the to-be-scanned surface), in various locations of a light path, are also referred to as a 'main scan direction' and a 'sub-scan direction', respectively, in a broad sense.

In many cases for such optical scanning devices, and, especially for multi-beam optical scanning devices, 'a light beam position correcting device' is provided, for the purpose of initial adjustment, or correcting environmental/aging variation which may occur after the shipment of the product.

A basic configuration or function of the light beam correcting device is as follows:

to rotate a returning mirror;
to shift/rotate a cylindrical lens;
to shift/rotate a prism;
to utilize an electro-optical device or AOM;

to rotate a parallel plane plate provided between the semiconductor laser and the coupling lens, or such, whereby a light path is deflected (that is, the laser beam is deflected by a slight angle). Therefore, such a device is called 'light path deflection device'. However, in this method, problems may occur such that, the device is large-sized, power consumption/heat generation/noise increases, or such.

Therefore, according to the first aspect of the present invention, as shown in FIG. 1, as the light path deflection device, a 'liquid crystal device' 43 which is advantageous in that it is small-sized, light-weighted, requires reduced power consumption, generates no noise nor heat, or such, is applied. By means of a function of the liquid crystal device of 'modulating phase', it is possible to change phase of a laser beam incident on the liquid crystal device 43. Further, it is possible to configure the liquid crystal device such that phase in the liquid crystal device may have a slope in the sub-scan direction in a liquid crystal layer by an electric signal externally given. Such a liquid crystal device can be used as the light path deflection device, that is, 'deflection device' for deflecting a laser beam by a slight angle (the above-mentioned configuration of item (7) in the Summary of the Invention). By applying the liquid crystal device thus acting as the deflection device as the liquid crystal device 43 shown in FIG. 1, it is possible to finally move a beam spot position on the to-be-scanned surface 16 (photosensitive drum surface) 16 in the sub-scan direction.

Next, beam waist position correction (upon assembly or initial adjustment) by means of the correction lens 22 in the present embodiment is described.

The laser light emitted by the semiconductor laser 11 undergoes coupling by means of the coupling lens 12 into a parallel beam, a weak divergent beam or a weak convergent beam for the purpose of adapting the laser beam for characteristics of a subsequent optical system. Even when positional adjustment between the semiconductor laser 11 and the coupling lens 12 is carried out at a high accuracy, and also, a parallelism between the laser beam emitted by the semiconductor laser 12 is adjusted optimally first (that is, according to the design requirements), a beam waist position in the vicinity of the to-be-scanned surface may be shifted at many cases due to influence of components/parts variation of optical systems assembled, assembling errors or such after the shipment of the product. Further, in a case where, as in the first embodiment, the liquid crystal device 43 having a cell structure is inserted, a lens effect may appear in the liquid crystal device 43 as a result of, due to influence of variation of pressure determined when the liquid crystal layer is sealed between two glass substrates, variation of a dimension of a spacer member provided for maintaining the liquid crystal layer in a fixed thickness or such, a central part of the liquid crystal device is deformed in a convex or concave manner. As a result, a beam waist shift may occur due to a lens function thus appearing in the liquid crystal device. As a device for correcting such a beam waist positional shift, the correction lens 22 may be applied.

In the optical scanning device 20 shown in FIG. 1, the correction lens 22 is disposed between the liquid crystal device 43 and the cylindrical lens 13. By the correction lens 22 and the cylindrical lens 13, the first optical system is configured (the above-mentioned configuration of item (2) in the Summary of the Invention). Further, as in the above-mentioned configuration of item (1) in the Summary of the Invention, the first optical system includes, at least, the optical system (lens or such) having a positive power in the sub-can direction and an optical device (lens or such) having a positive power in the main scan direction.

In the first embodiment of the first aspect, the above-mentioned optical device having a positive power in the sub-scan direction is the cylindrical lens 13 and has a function of producing a line image long in the main scan direction (imaged in the sub-scan direction) in the vicinity of the deflection reflective surface of the polygon mirror 14, as mentioned above On the other hand, the above-mentioned optical device having a positive power in the main scan direction is the correction lens 22. In a case of the optical scanning device for the image forming apparatus, the laser beam (beam spot) moves in the main scan direction and exposes the to-be-scanned surface (photosensitive body surface), and as a result, the expositing beam is longer in the main scan direction than the beam spot's main scan diameter in a static state. Accordingly, it is necessary to set the beam spot diameter in a static state smaller in the main scan direction than in the sub-scan direction. Therefore, it is preferable to correct the beam waist position in the main scan direction with a high priority by means of the 'lens having a positive power in the main scan direction'. Specifically, as a result of at least one optical device included in the first optical system (for example, the correction lens 22) being provided movably in the optical axis direction, it is possible to carry out the beam waist position adjustment upon assembly of the optical scanning device (the above-mentioned configuration of item (3) in the Summary of the Invention).

The correction lens 22 in the first embodiment of the first aspect has a first surface of a coaxial surface (rotationally symmetrical surface). By providing such a coaxial surface, it is easy to carry out working of the surface, and also, it is possible to ease mounting tolerance at a time of assembly to the optical scanning device (the above-mentioned configuration of item (5) in the Summary of the Invention). As described above, for the function of the correction lens 22, what is at least necessary is to carry out beam waist position correction in the main scan direction. For this purpose, the correction lens 22 should at least have a surface having a positive power in the main scan direction.

By adding the correction lens 22, the following advantages can be obtained:

[1] By moving the correction lens 22 in the optical axis direction, beam waist position can be adjusted for the entire optical scanning device, and thus, component/part tolerance/mounting tolerance of other optical devices can be eased;

[2] it is possible to obtain a stable, small-diameter beam spot; and

[3] it is possible to appropriately shape the beam.

Thus, by adding the liquid crystal device (deflection device) 43 and the correction lens 22, it is possible to achieve high-accuracy adjustment of scan line separation and reduction of the beam spot diameter.

Next, beam waist correction against temperature fluctuation is described.

Figure 5:
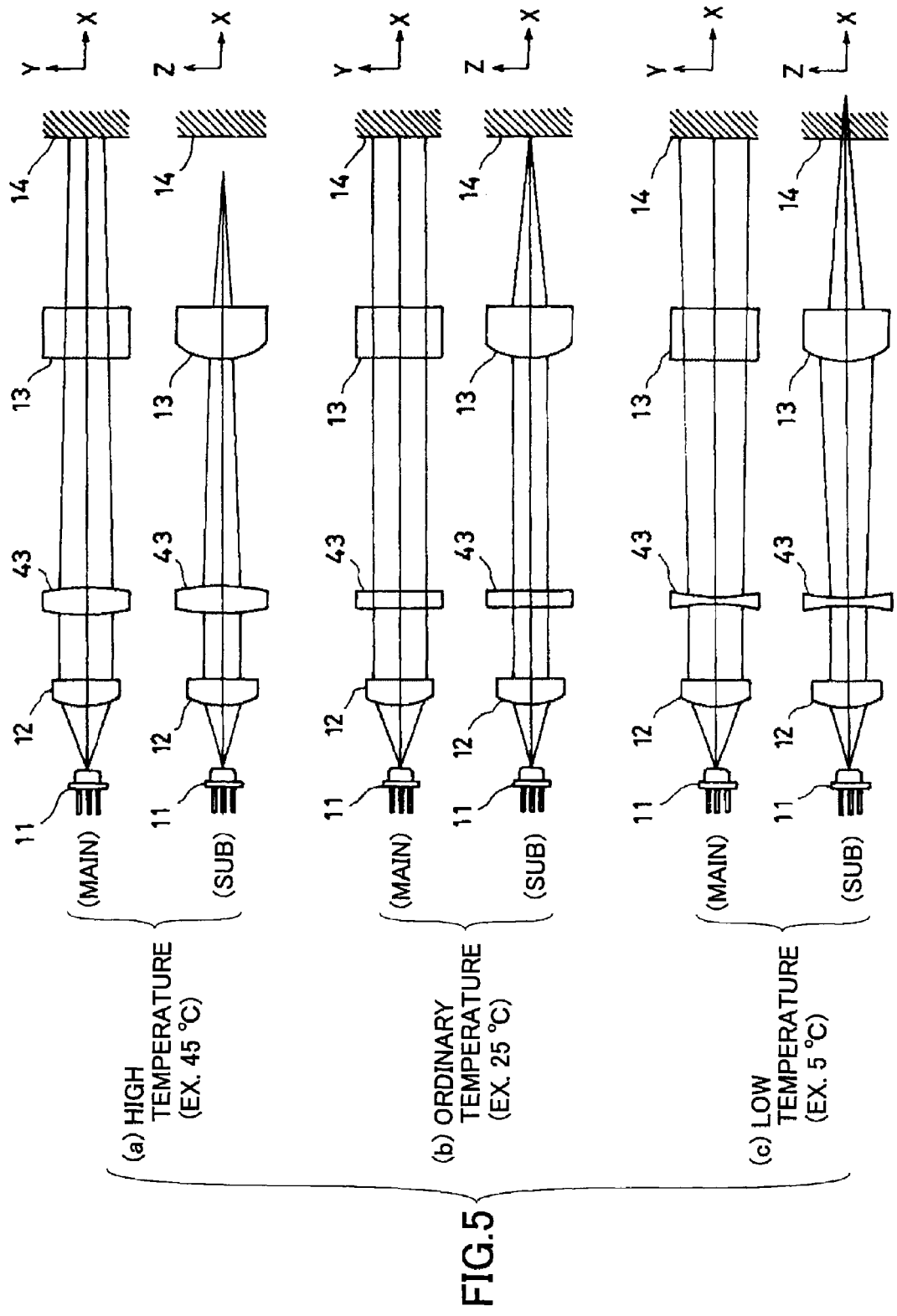
FIG. 5 illustrates a light path in a case where no correction lens is added in a pre-polygon mirror optical system in an optical scanning device.
Figure 6:
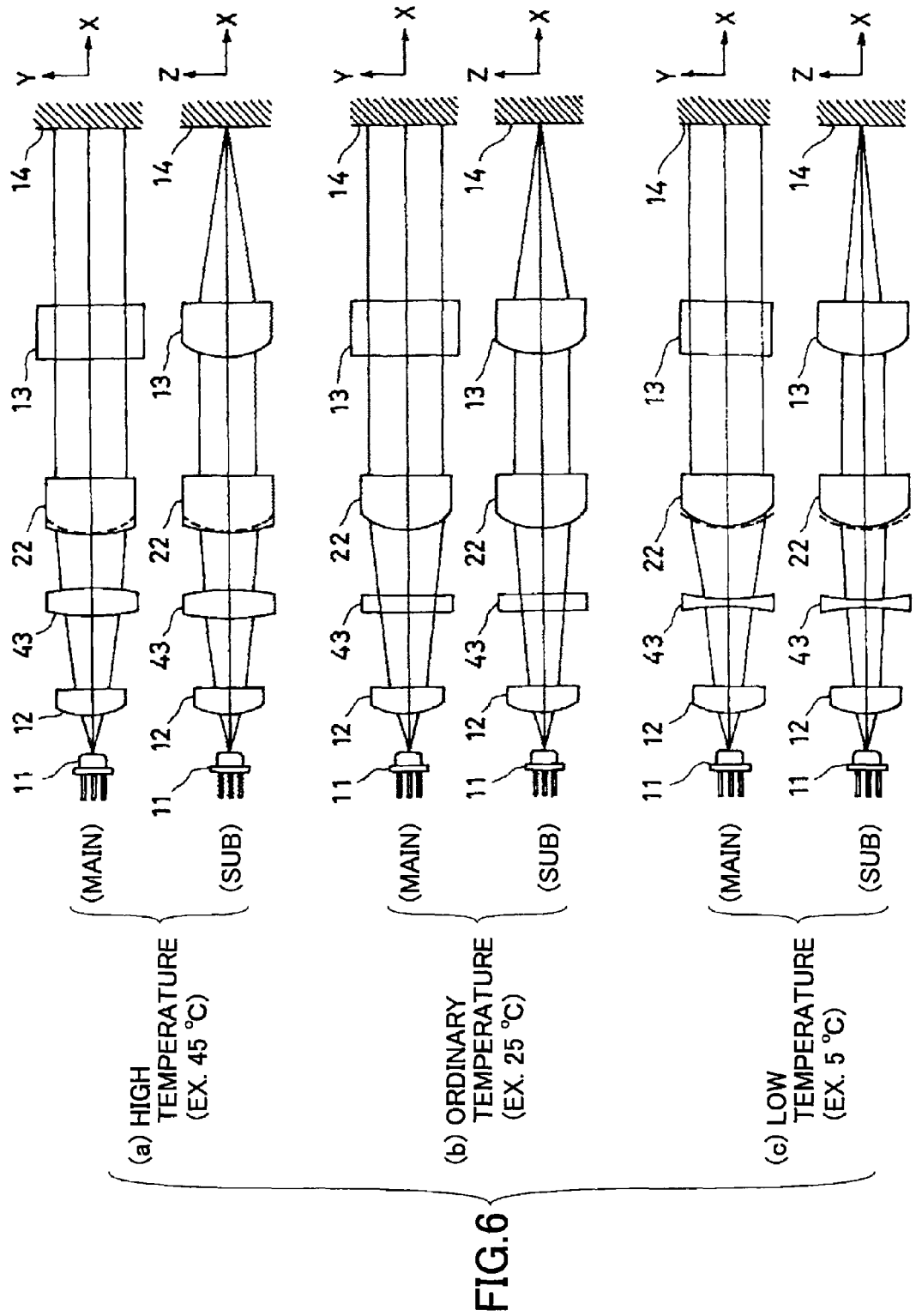
FIG. 6 illustrates a light path in a case where a correction lens is added in the pre-polygon mirror optical system in the optical scanning device.

With reference to FIGS. 5 and 6 showing a light path in front of the polygon mirror in the optical scanning device, behavior of the beam waist position in response to the temperature in the vicinity of the liquid crystal device is studied. In FIGS. 5 and 6, the X direction is a direction along the light path (optical axis); the Y direction is the main scan (corresponding) direction; and the Z direction is the sub-scan (corresponding) direction. Further, in the figures, (MAIN) shows a sectional view of the pre-polygon mirror optical system in the main scan direction (main scan sectional view) while (SUB) shows a sectional view of the pre-polygon mirror optical system in the sub-scan direction (sub-scan sectional view).

First, a case of the related art where no correction lens is provided is described. FIG. 5 shows this case. In a case of an ordinary temperature shown in FIG. 5, (b), the laser beam transformed into a parallel beam by the coupling lens 12 passes through the liquid crystal device 43, and is incident on the cylindrical lens 12 in a state of the parallel beam. Accordingly, the laser beam incident on the polygon mirror 14 is the parallel beam in the main scan direction, while the sub-scan direction is affected by the cylindrical lens 13 so that the incident beam is imaged into a line image (long in the main scan direction).

However, as described in the Summary of the Invention above, the liquid crystal device 43 has the cell structure in which the liquid crystal layer on the order of several through tens of μm is sealed by the two glass substrates. Therefore, when the temperature in the vicinity of the liquid crystal device 43b in the optical scanning device increases (FIG. 5, (a)), the central part of the liquid crystal device 43 may protrude, and thus, may have a lens function (positive power). If so, the laser beam incident on the polygon mirror 14 becomes a convergent beam in the main scan direction, while, in the sub-scan direction, a line image is produced at a position located on the side of the cylindrical lens 13 with respect to the polygon mirror 14. As a result, a beam waist position in the vicinity of the to-be-scanned surface 16 is shifted toward the polygon mirror 14 both in the main and sub-scan directions.

On the other hand, when the temperature decreases around the liquid crystal device 43 (FIG. 5, (c)), since the liquid crystal device 43 thus has a lens function of a negative power in this case, contrary to the case of FIG. 5, (a), the beam waist position in the vicinity of the to-be-scanned surface 16 is shifted to go away from the polygon mirror 14.

Next, a case of the first aspect of the present invention, in which the correction lens (resinous) 22 is added, is described with reference to FIG. 6. The correction lens 22 is made of resin thus having a large coefficient of thermal expansion, and has a positive power.

In a case of an ordinary temperature (FIG. 6, (b)), by means of the coupling lens 12, the laser beam is coupled to be a weak divergent beam. This laser beam is transformed into a parallel beam both in the main and sub-scan directions by the function of the correction lens 22 having the positive power. After that, the laser beam is incident on the cylindrical lens 13. Accordingly, the laser beam incident on the polygon mirror 14 is a parallel beam in the main scan direction while it is imaged in the sub-scan direction by the function of the cylindrical lens 13 so that it is imaged as a line image (long in the main scan direction).

When the temperature around the liquid crystal device 43 and the correction lens 22 increases (FIG. 6, (a)), the liquid crystal device 43 has a positive power, and thus, the divergent degree of the laser beam emitted from the liquid crystal device 43 is reduced (to close to a parallel beam). However, on the other hand, a curvature radius of the incident surface of the correction lens 22 (having the positive power in the incident surface) increases along with the temperature rise. As a result, the positive power of the correction lens 22 is reduced. As a result, it is possible to obtain the laser beam exiting from the correction lens 22 in a form of a parallel beam the same as that in the case of the ordinary temperature. Accordingly, the characteristic (parallelism of the light beam) of the laser beam incident on the polygon mirror 14 can be made the same as that in the case of the ordinary temperature, and thus, it is possible to avoid a beam waist positional shift in the vicinity of the to-be-scanned surface 16. That is, when the temperature increases, the effect of 'the positive power occurring in the liquid crystal device 43' and the effect of 'the reduction of the positive power of the correction lens 22' are canceled out by one another, the beam waist positional shift in the vicinity of the to-be-scanned surface 16 is avoided accordingly, and thus, a stable, reduced-diameter beam spot can be obtained (the above-mentioned configuration of item (4) in the Summary of the Invention).

On the other hand, when the temperature around the liquid crystal device 43 and the correction lens 22 decreases (FIG. 6, (c)), the liquid crystal device 43 has a lens function of a negative power while the positive power of the correction lens 22 increases. As a result, the effects of both are also cancelled out by one another, and thus, it is possible to avoid a beam waist positional shift in the vicinity of the to-be-scanned surface 16.

To apply resin as material of the correction lens 22 provides another advantage. That is, it is possible to produce it at a low cost by applying a mass-production manner with the use of a molding die. In a case of applying the molding die, it is easy to produce an aspherical shape. On the other hand, in a case where glass were applied as the material, it would be necessary to grind/polish the correction lens in a machining manner one by one, and thus, it might not be advantageous for mass production.

The beam waist position correction (at a time of assembly or initial adjustment) by means of the correction lens 22 in the optical scanning device according to the first embodiment of the first aspect of the present invention described above is described further specifically with reference to specific optical data also with reference to FIG. 1.

In this case, an oscillation wavelength of the semiconductor laser 11 is 655 nm; and the focal length fCOL of the coupling lens is 15 mm. It is noted that the first and second surfaces of the coupling lens 12 are coaxial aspherical surfaces, and although not shown in specific numerical data, wavefront aberration from the coupling lens 12 is well corrected. A light beam exiting from the coupling lens is assumed as being a divergent beam, and is naturally focused at a position away from the second surface of the coupling lens 12 by 189.8 mm to the side of the light emitting point side (opposite to the to-be-scanned surface).

The laser beam exiting from the coupling lens 12 undergoes beam shaping by means of an aperture not shown, passes through the liquid crystal device 43, and then, is incident on the correction lens 22. A distance between the second surface of the coupling lens 12 and the aperture is 10.9 mm; a distance between the aperture and the liquid crystal device 43 is 1.0 mm; and a distance between the liquid crystal device 43 and the first surface of the correction lens 22 is 24 mm. The aperture has a rectangular shape of 3.54 mm×1.44 mm in the main scan direction×the sub-scan direction, respectively.

Next, Table 1 below shows optical data from the correction lens 22 through the to-be-scanned surface 16. In Table 1, Rm denotes a curvature radius in the main scan direction; Rs denotes a curvature radius in the sub-scan direction; and N denotes a refractive index for an operation wavelength. The surface numbers 1 and 2 are given to the entrance side and the exit side of the correction lens 22, respectively; the surface numbers 3 and 4 are given to the entrance side and the exit side of the cylindrical lens 13, respectively; the surface number 5 is given to the deflection reflective surface of the polygon mirror 14; the surface numbers 6 and 7 are given to the entrance side and the exit side of the first scanning lens 15-1, respectively; the surface numbers 8 and 9 are given to the entrance side and the exit side of the second scanning lens 15-2, respectively; and the surface number 10 is given to the to-be-scanned surface 16. It is noted that an angle formed between an entrance angle and an exit angle on the polygon mirror 14 of the laser beam reaching a position of image height=0 is 60°. Further, in Table 1, the surface asterisked (*) is an aspherical surface.

TABLE 1

| SURFACE NUMBER | Rm [mm] | Rs [mm] | X [mm] | N | NOTE |
|---|---|---|---|---|---|
| 1 | +120 | +120 | 3.0 | 1.527 | CORRECTION LENS 22 (RESINOUS) |
| 2 | ∞ | ∞ | 13.0 | | CORRECTION LENS 22 (RESINOUS) |
| 3 | ∞ | +64.5 | 3.0 | 1.514 | CYLINDRICAL LENS 13 |
| 4 | ∞ | ∞ | 125.8 | | CYLINDRICAL LENS 13 |
| 5 | ∞ | ∞ | 87.9 | (reflection) | POLYGON MIRROR 14 |
| 6* | −312.597 | ← | 31.4 | 1.527 | FIRST SCANNING LENS 15-1 |
| 7* | −82.951 | ← | 126.4 | | FIRST SCANNING LENS 15-1 |
| 8* | −500.0 | −47.68 | 3.5 | 1.527 | SECOND SCANNING LENS 15-2 |
| 9* | −1000.0 | −23.38 | 126.4 | | SECOND SCANNING LENS 15-2 |
| 10 | ∞ | ∞ | — | | PHOTO-SENSITIVE BODY (TO-BE-SCANNED SURFACE) 16 |

When the correction lens 22 is moved in the optical axis direction, the main scan beam waist position in the vicinity of the to-be-scanned surface 16 moves linearly with respect to the movement amount of the correction lens 22 as shown below in Table 2. Accordingly, main scan beam waist positional adjustment can be carried out in this way at a high accuracy, and thus, a stable, small-diameter beam spot can be ensured. There, the correction lens 22 is moved in a direction to close to the polygon mirror 14. The minus sign "−" attached to the main scan waist position change amount means that the beam waist position moves toward the side of the polygon mirror. Further, also the sub-scan beam waist position changes along with the movement of the correction lens 22 as shown. However, when it is necessary to correct it, it becomes possible to carry out correction of the sub-scan beam waist position separately by providing a configuration such that the cylindrical lens 13 is movable in the optical axis direction.

TABLE 2

| CORRECTION LENS MOVEMENT AMOUNT [mm] | BEAM WAIST POSITION CHANGE AMOUNT [mm] | |
|---|---|---|
| | MAIN SCAN DIRECTION | SUB-SCAN DIRECTION |
| 0.0 | 0.00 | 0.00 |
| +0.5 | −0.46 | −0.11 |
| +1.0 | −0.92 | −0.21 |
| +2.0 | −1.83 | −0.42 |
| +4.0 | −3.63 | −0.83 |

The first surface (the surface number 1) of the correction lens 22 has a spherical shape as shown in Table 1. However, thereby, the wavefront aberration may be degraded. In order to avoid it, an aspherical shape may be added thereto (the above-mentioned configuration of item (6) in the Summary of the Invention). In this case, by shaping with the use of a molding die, it is possible to apply a mass production manner at a low cost to manufacture the correction lens 22 even when it thus has an aspherical shape.

Beam waist position correction against temperature change is described next.

By the influence of heat sources in the optical scanning device such as a polygon motor driving the polygon mirror 14 or such, the temperature inside of the optical scanning device may substantially change. Change of the beam waist position occurring when the temperature inside of the optical scanning device increases from 25° C. to 45° C. is mentioned below. In this study, it is assumed that only the temperature around the liquid crystal device 43 and the correction lens 22 changes.

As mentioned above, the liquid crystal device 43 has the cell structure in which the liquid crystal layer is sealed by the two glass substrates, the central part protrudes along with temperature rise, and thus, the positive power lens function occurs. For example, experimentally, in a case of a liquid crystal device in which two glass substrates each of 16×16 [mm] (with a thickness of 0.3 [mm]) were used to seal a liquid crystal layer of tens of μm in film thickness, transmitted wavefront aberration equivalent to $\lambda/0.4$ ($\lambda$=655 [nm]) occurred in response to the temperature rise by 20° C. (from 25° C. through 45° C.). By this influence, when the correction lens 22 was not added, the main scan beam waist position shifted toward the polygon mirror side. It is noted that, for a case where the correction lens 22 was not added, the laser beam 21 is coupled to an approximately parallel beam by means of the coupling lens 12. Further, the aperture was set to have a rectangular shape of a dimension of 4.0 [nm]×1.64 [nm] in the main and sub-scan directions, respectively.

Table 3 below shows, in a comparison manner, the beam waist position at the temperature of 25° C. around a middle image height is taken as a reference, and a change amount of the beam waist position at 45° C. in comparison to the case where the correction lens mentioned below was added.

Beam waist position correction in a case where the correction lens 22 is added is discussed. The coefficient of linear expansion of the correction lens 22 (resinous) is 7.0E-05 [1/° C.] (where E-05 denotes×$10^{-5}$, for example); and the curvature radius R of the first surface (coaxial surface) thereof is R=120 [mm]. Therefore, along with the temperature rise (temperature difference: 20° C.), the curvature radius R of the first surface changes as follows:

$$R=120\times(1+7.0E\text{-}05\times20)=120.168 \text{ [nm]}$$

As a result, the positive power of the correction lens 22 decreases. That is, by the effect of this correction lens 22, the main scan beam waist position should shift away from the polygon mirror 14.

That is, although the liquid crystal device 43 comes to have the lens function along with the temperature rise as mentioned above, the power changes of both the liquid crystal device 43 and the correction lens 22 cancel out by one another, and thus, the main scan beam waist positional shift can be reduced accordingly.

TABLE 3

| EXISTENCE/ABSENCE | BEAM WAIST POSITIONAL SHIFT [mm] UPON TEMPERATURE RISE FROM 25° C. THROUGH 45° C. | |
|---|---|---|
| OF CORRECTION LENS | MAIN SCAN DIRECTION | SUB-SCAN DIRECTION |
| ABSENCE | −1.29 | −0.30 |
| EXISTENCE | +0.02 | 0.00 |

Next, a second embodiment of the first aspect of the present invention is described.

The second embodiment of the first aspect of the present invention relates to one example of a multi-beam optical scanning device.

Although the single beam optical scanning device has been described as the first embodiment above in which the single laser beam is used for scanning, a multi-beam optical scanning device in which a plurality of laser beams are used simultaneously for scanning has recently taken root as an optical scanning device satisfying a demand for high speed printing or a high printing density in a laser printer or a digital copier.

Figure 2:
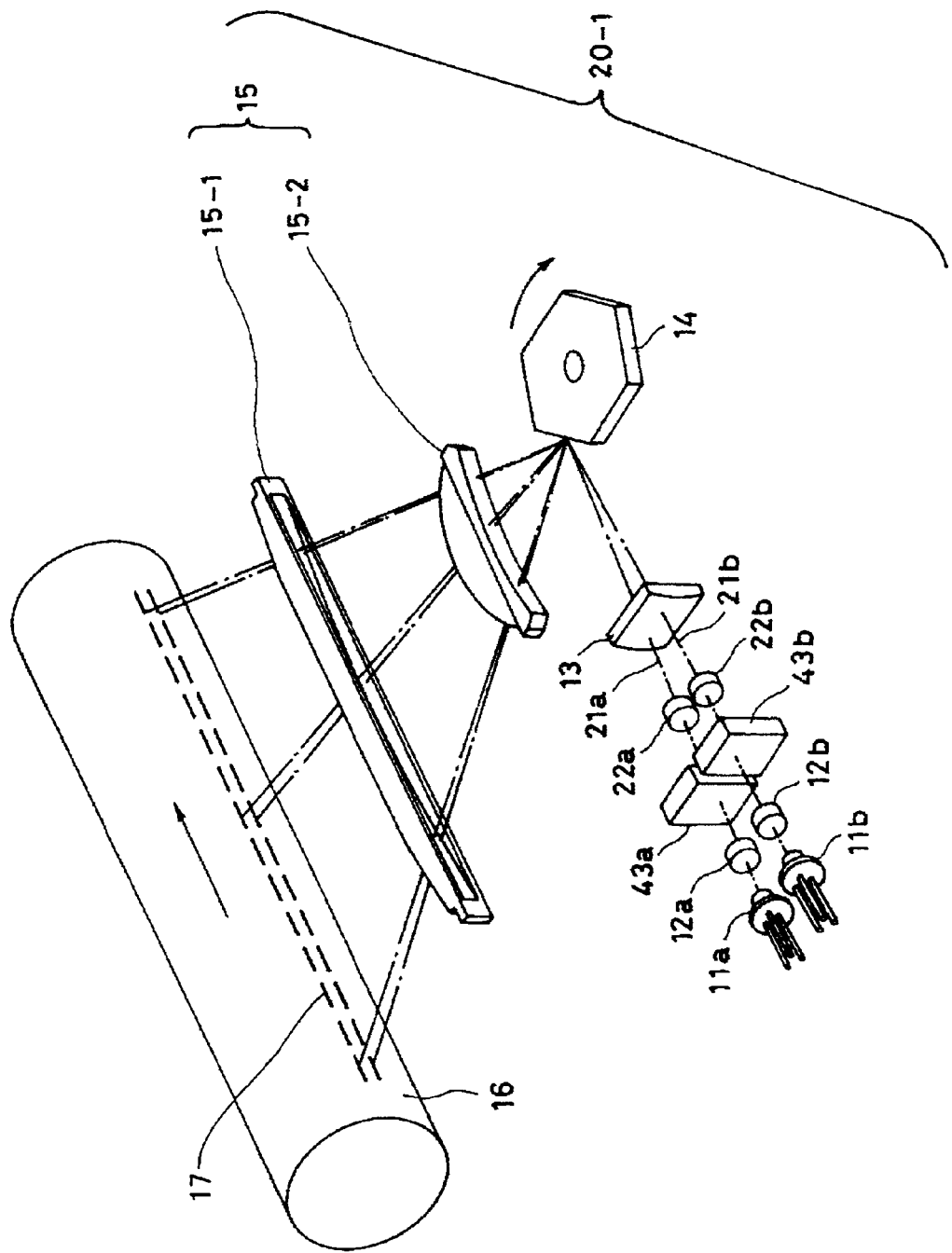
FIG. 2 shows a general configuration diagram of a multi-beam scanning device according to another embodiment of the first aspect of the present invention.

FIG. 2 shows a specific example thereof, and illustrates a multi-beam optical scanning device for applying two laser beams simultaneously for scanning. As shown, the multi-beam scanning device in the second embodiment includes light sources 11a, 11b, coupling lenses 12a, 12b, cylindrical lens 13, a polygon mirror 14 acting as a deflector, a first scanning lens 15-1 and a second scanning lens 15-2, a to-be-scanned surface 16 (for example, a photosensitive drum), correction lenses 22a, 22b and liquid crystal devices 43a, 43b.

Two laser beams 21a, 21b emitted by the two semiconductor lasers 11a, 11b acting as a multi-beam light source, and passing through the coupling lenses 12a, 12b, respectively, are imaged as line images (each imaged in the sub-scan direction and long in the main scan direction) on a deflection reflective surface of the polygon mirror acting as the deflector by means of a function of the common cylindrical lens 13, and then, are applied to the to-be-scanned surface (photosensitive drum) 16 for scanning it to draw respective scan lines 17 on the to-be-scanned surface 16 after passing through the scanning optical systems (first and second scanning lenses) 15. In this multi-beam optical scanning device 20-1, the two laser beams 21a, 21b are led to the common to-be-scanned surface (photosensitive drum) 16 (the above-mentioned configuration of item (8) in the Summary of the Invention).

In this multi-beam optical scanning device for applying the plurality of laser beams to the common to-be-scanned surface for scanning it, by driving/controlling one or both the liquid crystal devices 43a, 43b each having a deflection function and disposed in at least one light path of the laser beams, it is possible to correct separation (scan line separation) among the plurality of beams on the to-be-scanned surface to a predetermined value. Thereby, it is possible to provide a multi-beam optical scanning device by which it is possible to apply a plurality of beams for scanning with maintaining scan line separation at a high accuracy.

When this multi-beam optical scanning device is applied as an exposing device in an image forming apparatus, it is possible to respond to a request of an operator (user) to switch a scan line density (between one for high-speed printing and the other for high-density recording).

It is not necessary to provide the two liquid crystal devices 43a and 42b in respective light paths of all the two laser beams 21a and 21b as in the configuration shown in FIG. 2, and the number of the liquid crystal devices to be actually provided may be reduced depending on each particular situation.

In the configuration of FIG. 2, the two laser beams 21a, 21b intersect one another in the vicinity of the deflection reflective surface of the polygon mirror 14 as shown. By applying such a configuration, it is possible to avoid occurrence of difference in optical characteristics (imaging positions, magnifications or such) between the two laser beams otherwise occurring due to difference of a specific reflection point on the polygon mirror 14.

A third embodiment of the first aspect of the present invention is described next.

Unlike the above-described multi-beam optical scanning device in the second embodiment of the first aspect, it is also possible to apply a configuration in which a plurality of laser beams emitted from a plurality of light sources respectively are led to a plurality of different to-be-scanned surfaces respectively (the above-mentioned configuration of item (9) in the Summary of the Invention).

Figure 3:
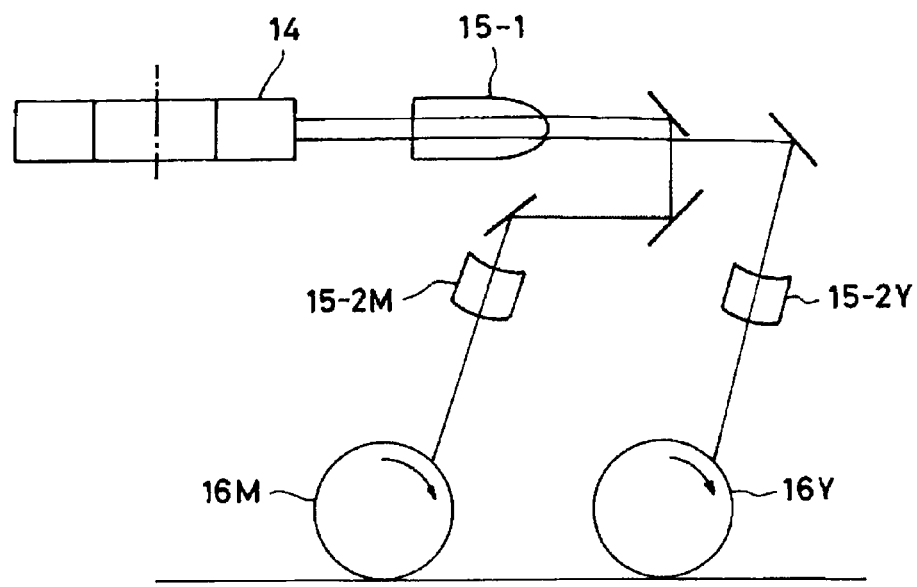
FIG. 3 shows a further another embodiment of the first aspect of the present invention in which an optical layout (sub-scan sectional view) from a polygon mirror through a to-be-scanned surface of a multi-beam optical scanning device.

With reference to FIG. 3, as one example thereof, a multi-beam optical scanning device in the third embodiment of the first aspect of the present invention is described next in detail. FIG. 3 shows an optical layout (sub-scan sectional view) from a polygon mirror 14 through to-be-scanned surfaces (for example, photosensitive drums) 16Y, 16M in the multi-beam optical scanning device. In FIG. 3, two laser beams emitted from two light sources not shown are reflected and thus deflected by the polygon mirror 14, then pass through a common first scanning lens 15-1, pass through respective different second scanning lenses 15-2Y, 15-2M, and then, irradiate different to-be-scanned surfaces (photosensitive drums) 16Y, 16M, respectively.

In a light path from the light sources through the polygon mirror 14, although not shown, a coupling lens(es) for coupling light beams emitted from the light sources and a first optical system leading the thus-coupled light beams to the polygon mirror 14 are disposed. The first optical system at least includes a surface having a positive power in the sub-scan direction and also a surface having a positive power in the main scan direction. Further, in at least one of light paths of the two laser beams emitted from the light sources, a liquid crystal device (not shown) having a phase modulation function is disposed. The photosensitive drums 16Y, 16M are rotated in directions of arrows (corresponding to the sub-scan direction) as shown. By deflecting the light path of the laser beam with the use of the liquid crystal device, it is possible to correct 'relative' positional relationship of scan lines (sub-scan directional positions of laser beam irradiation) on the two photosensitive drums 16Y and 16M.

FIG. 3 shows only the optical system disposed on the right side of the polygon mirror 14. By disposing the same optical system also on the left side of the polygon mirror 14 in addition symmetrically, and applying total four laser beams by means of the single polygon mirror 14 for scanning the four photosensitive drums to produce thereon respective latent images of yellow (Y), magenta (M), cyan (C) and black (Bk), it is possible to configure an exposing device in a tandem type color image forming apparatus, and it is possible to obtain a printed output image having well-reduced color drift among the respective photosensitive drums (to-be-scanned surfaces).

An image forming apparatus in a fourth embodiment of the first aspect of the present invention is described next.

Figure 4:
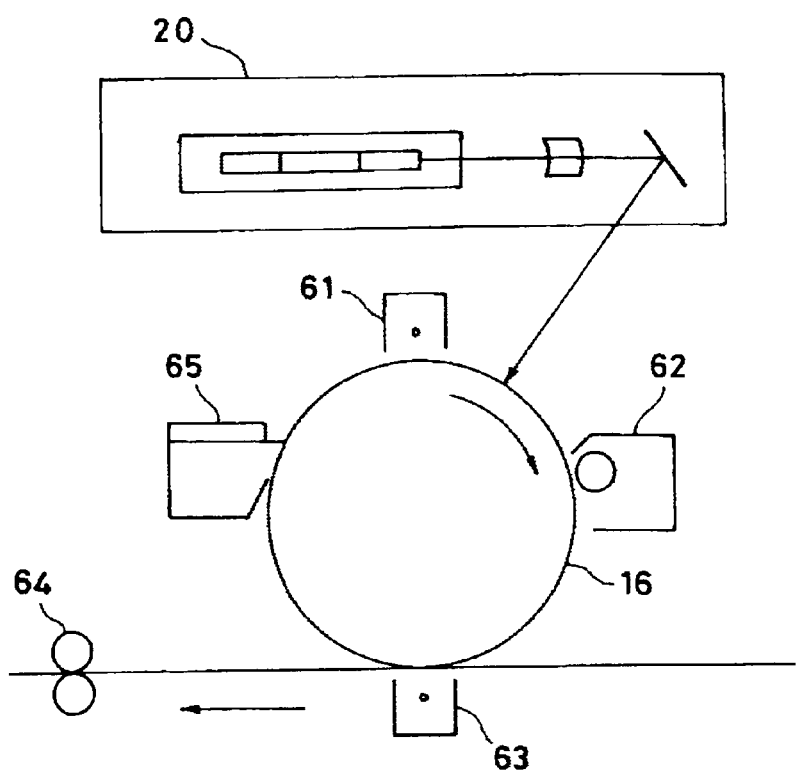
FIG. 4 shows a general configuration diagram of an image forming apparatus according to a further another embodiment of the first aspect of the present invention.

FIG. 4 shows a general sectional view of the image forming apparatus in the fourth embodiment of the first aspect of the present invention. This image forming apparatus includes an optical scanning device 20, a charger 61, a developer 62, a transfer unit 36, a fixing unit 64, an image carrying body (for example, a photosensitive drum) 16 and a cleaning unit 65. In this configuration, optical writing is carried out to the photosensitive drum 16 from the optical scanning device 20 acting as an expositing device, and according to an electrophotographic method, an electrostatic latent image is produced on the photosensitive body (drum) 16.

In further detail, a basic principle of image forming by this image forming apparatus is well known, the photosensitive drum 16 is uniformly electrically charged by the charger 61 first, an electronic potential thereon is lowered in response to an exposure distribution produced by the optical scanning device 20, and thus, the electrostatic latent image is produced on the photosensitive drum 16. The thus-produced electrostatic latent image on the photopositive drum 16 is developed by the developer 62, toner is thus caused to adhere thereto, and therewith, the latent image is visualized in a form of a toner image. The thus-obtained toner image on the photopositive drum 16 is then transferred to a recording medium (for example, a recording paper) by the transfer unit 63, and then, is fused and fixed to the recording paper by the fixing unit 64. The cleaning unit 65 removes residual toner from the photosensitive drum 16 after the toner image is thus transferred therefrom.

In the configuration of FIG. 4, the toner image produced on the photosensitive drum 16 is directly transferred to the recording paper. However, other than this way, another configuration may be applied in which the toner image produced on the photosensitive drum 16 is once transferred to an intermediate transfer body (an intermediate transfer belt, an intermediate transfer drum or such), and then, from the intermediate transfer body, the toner image is finally transferred to the recording paper. When the intermediate transfer body is thus used, by providing respective developer of a plurality of colors (for example, yellow, magenta, cyan and black developers) for the common photosensitive drum 16, it is possible to configure a color image forming apparatus in a so-called single-drum-intermediate-transfer type. Furthermore, it is also possible to configure a tandem type color image forming apparatus by disposing four image forming units (for example, for the four color components, i.e., yellow, magenta, cyan and black), each configured as shown in FIG. 4, side by side in a direction in which the recording medium (or the intimidate transfer body) is conveyed.

By applying, as the optical scanning device 20 of the image forming apparatus (or the color image forming apparatus), the optical scanning device (first embodiment) or the multi-beam optical scanning device (second embodiment) according to the first aspect of the present invention, the following advantages, as described above, are obtained. That is, it is possible to achieve reduction of a beam spot diameter, and also, it is possible to carry out beam spot positional adjustment or beam pitch adjustment at a high accuracy. Furthermore, it is possible to carry out beam spot diameter correction at a time of initial adjustment, also it is possible to reduce fluctuation of a beam spot diameter otherwise occurring due to temperature fluctuation, and thus, it is possible to obtain a high quality output image.

By using the optical scanning device and the image forming apparatus according to the first aspect of the present invention, as described above, it is possible to cause a single component/part to have many functions, i.e., a temperature compensation function, a beam spot stabilization by means of initial adjustment, beam spot diameter stabilization by applying a coaxial configuration, beam spot positional adjustment, scan line pitch adjustment, ghost avoidance, and incident angle reduction on a polygon mirror in a multi-beam manner. Also, it is possible to achieve cost reduction by means of reduction in the number of required parts/components, and to avoid degradation of optical characteristics otherwise occurring due to component/part error since no extra component/part is required as mentioned above. As a result, it is possible to totally improve the optical characteristics of the machine.

Thus, the optical scanning device or the multi-beam optical scanning device according to the first aspect of the present invention can be used as a laser writing optical system (exposing device) of an image forming apparatus (or a color image forming apparatus) such as a laser printer, a digital copier, a laser facsimile machine, a laser plotter, or such, and it is possible to achieve an image forming apparatus (or a color image forming apparatus) from which a high quality output image can be obtained. Furthermore, it is also possible to use the optical scanning device or the multi-beam optical scanning device according to the first aspect of the present invention in an image display apparatus in a laser scanning type, a measurement apparatus in a laser scanning type or such.

An optical scanning device and an image forming apparatus in embodiments of a second aspect of the present invention are described next.

Figure 7:
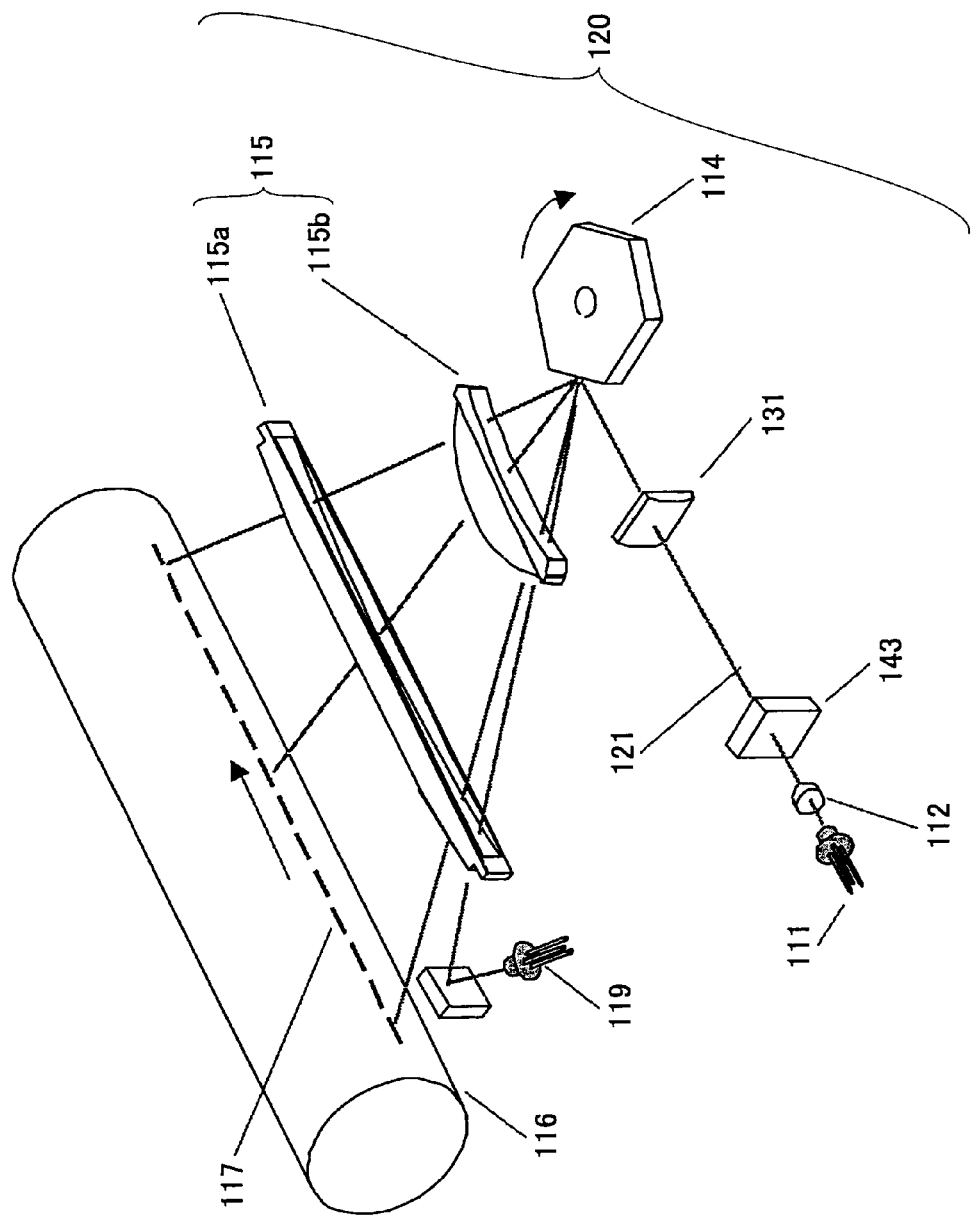
FIG. 7 shows a perspective view of an optical scanning device in an embodiment of a second aspect of the present invention.

FIG. 7 shows an optical scanning device 120 in a fifth or a sixth embodiment of the second aspect of the present invention. As shown, the optical scanning device 120 includes a light source unit 118 including a semiconductor laser 111, a coupling lens 112 and a liquid crystal device; a cylindrical lens 113, a polygon mirror 114 acting as an optical deflector; and an optical scanning system 115 including a first scanning lens 115a and a second scanning lens 115b.

Figure 8:
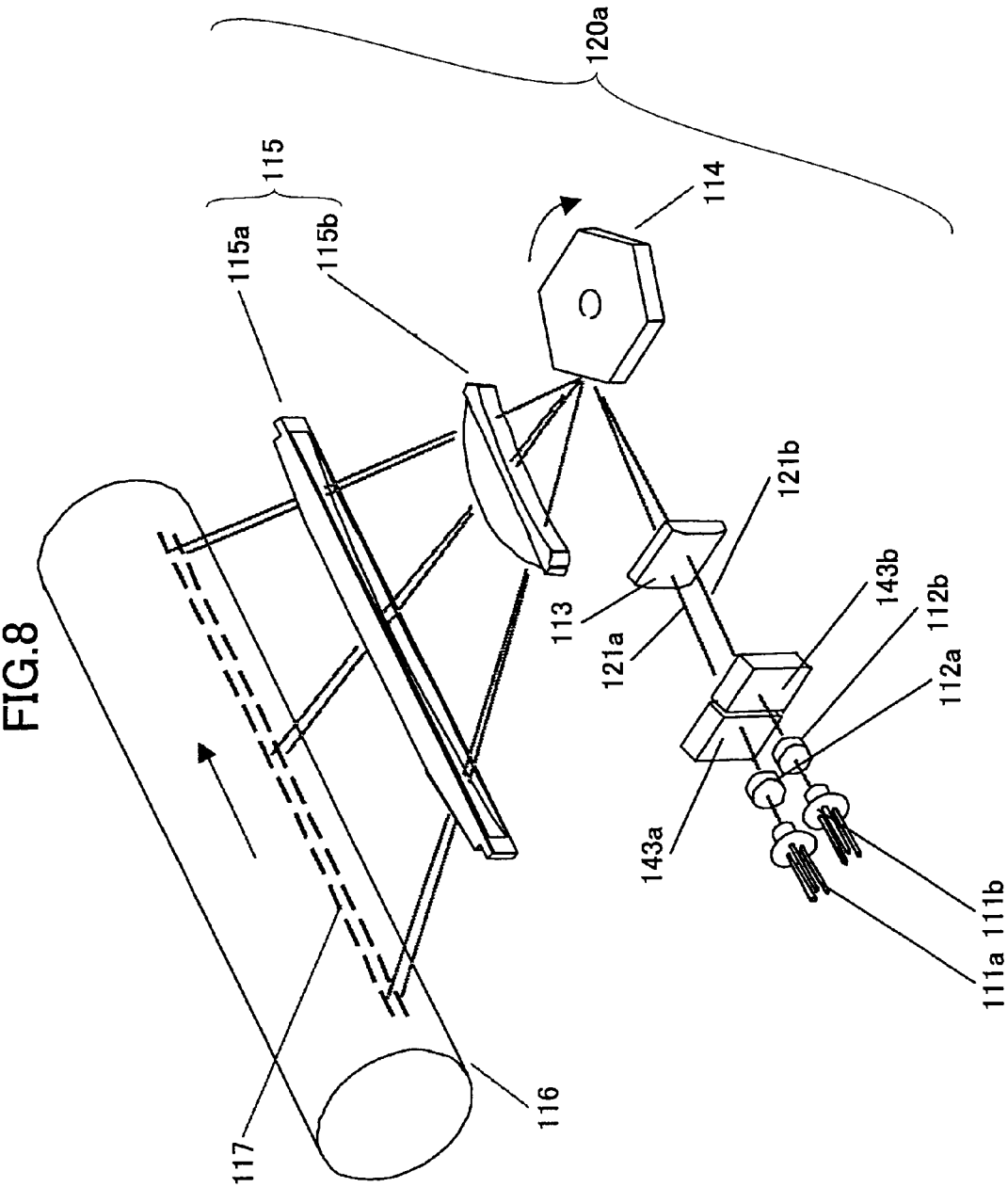
FIG. 8 shows a perspective view of an optical scanning device in another embodiment of the second aspect of the present invention.

This optical scanning device 120 is used for scanning a to-be-scanned surface 116 with a single laser beam 121 emitted from the light source including the semiconductor laser 111 and the coupling lens 112. The light source including the semiconductor laser 111 and the coupling lens 112 is included in the light source unit 118 shown in FIG. 13. It is also possible to apply the second aspect of the present invention to a multi-beam optical scanning device as shown in FIG. 8 in which a plurality of laser beams emitted from a plurality of light sources respectively (for example, a semiconductor laser array) are simultaneously applied for scanning the to-be-scanned surface 116.

In the configuration of FIG. 7, the laser beam 121 emitted by the semiconductor laser 111 is transformed into an approximately parallel beam by means of the coupling lens 112, and is imaged only in a sub-scan direction in a form of a line image long in a main scan direction on a deflection reflective surface of the polygon mirror 114 acting as the deflector by a function of the cylindrical lens 113. As a result of the polygon mirror being rotated at a uniform velocity, the laser beam 121 is deflected at a uniform angular velocity by the deflection reflective surface thereof. The thus-deflected laser beam 121 is then imaged as a beam spot on the to-be-scanned surface 116 which is a photosensitive body (drum), by means of the scanning optical system 115, and also, by means of an fθ function of the scanning optical system 115, the to-be-scanned surface 116 is scanned by the laser beam 121 at a uniform velocity. By this scanning operation by means of the laser beam 121, an image is written on the to-be-scanned surface 116. A writing start timing is determined based on a synchronization detection signal obtained as a result of the laser beam being incident on a synchronization detection sensor 119.

Figure 13:
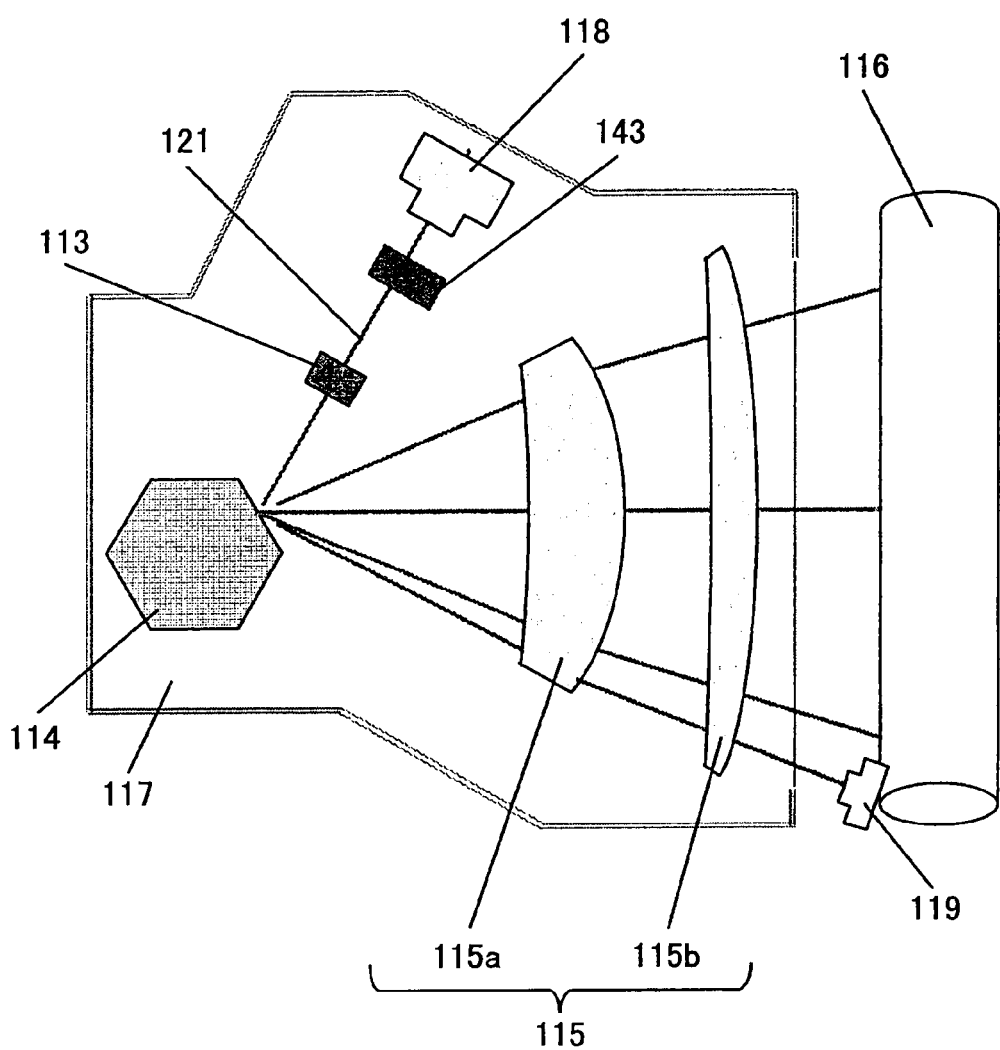
FIG. 13 shows an optical scanning device according to an embodiment of the second aspect of the present invention.

Generally speaking, as shown in FIG. 13, the respective optical components are accommodated by an optical housing 117.

In many cases for such optical scanning devices, and, especially for multi-beam optical scanning devices, 'a light beam position correcting device' is provided, for the purpose of initial adjustment, or correcting beam spot position fluctuation otherwise occurring due to environmental/aging variation mainly after the shipment.

As the light beam correcting device, a light path deflection device for deflecting a laser beam by a slight angle is used. The light path slight angle deflection method in the related art has a step:

to rotate a returning mirror;
to shift/rotate a cylindrical lens;
to shift/rotate a prism;
to utilize an electro-optical device or AOM;
to rotate a parallel plane plate provided between the semiconductor laser and the coupling lens, or such, whereby a light path is deflected (that is, the laser beam is deflected by a slight angle). Therefore, such a device is called 'light path deflection device' as mentioned above. However, in this method, problems may occur such that, the device is large-sized in total, power consumption/heat generation/noise increases, or such.

Therefore, according to the second aspect of the present invention, as shown in FIG. 7, as the light path deflection device, a 'liquid crystal device' 143 which is advantageous in that it can be made small-sized, light-weighted, requires reduced power consumption, generates no noise nor heat, or such, is applied.

By means of a function of the liquid crystal device of 'modulating phase', it is possible to change phase of a laser beam incident on the liquid crystal device 143. Specifically, by applying an electric signal externally to the liquid crystal device, it is possible to change liquid crystal layer phase. As a result, it is possible to configure the liquid crystal device such that phase in the liquid crystal device may have a slope in the sub-scan direction in the liquid crystal layer by the electric signal externally given. Such a liquid crystal device can be used as the light path deflection device, that is, 'deflection device' for deflecting a laser beam by a slight angle in the sub-scan direction. By applying the liquid crystal device thus acting as the deflection device as the liquid crystal device 143 shown in FIG. 7, it is possible to appropriately shift a beam spot position on the to-be-scanned surface 116 (photosensitive drum surface) 116 in the sub-scan direction.

A fifth embodiment of the second aspect of the present invention is described next.

Figure 10:
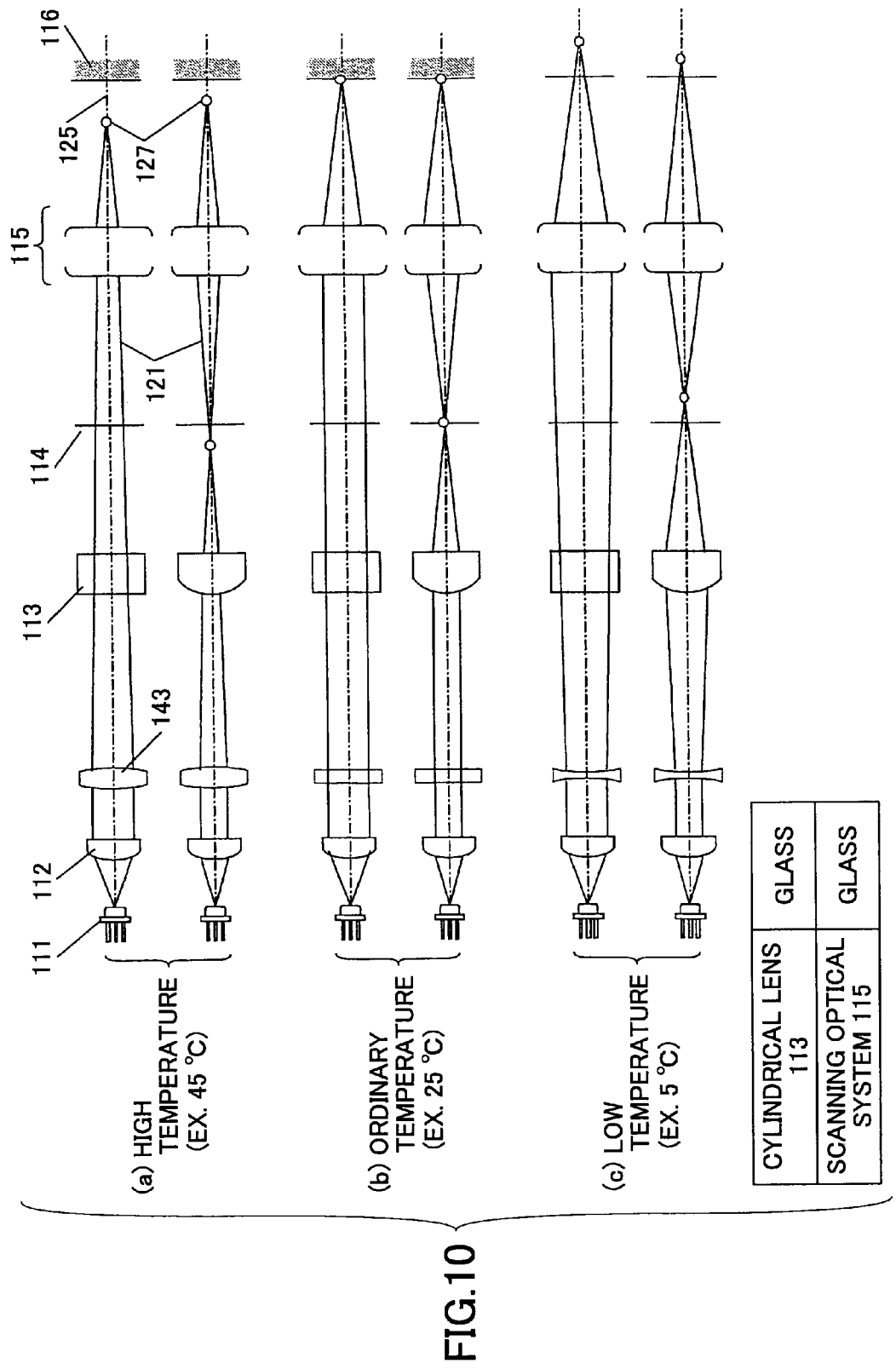
FIG. 10 shows a schematic diagram of an optical scanning device in a common configuration as a comparison example.
Figure 11:
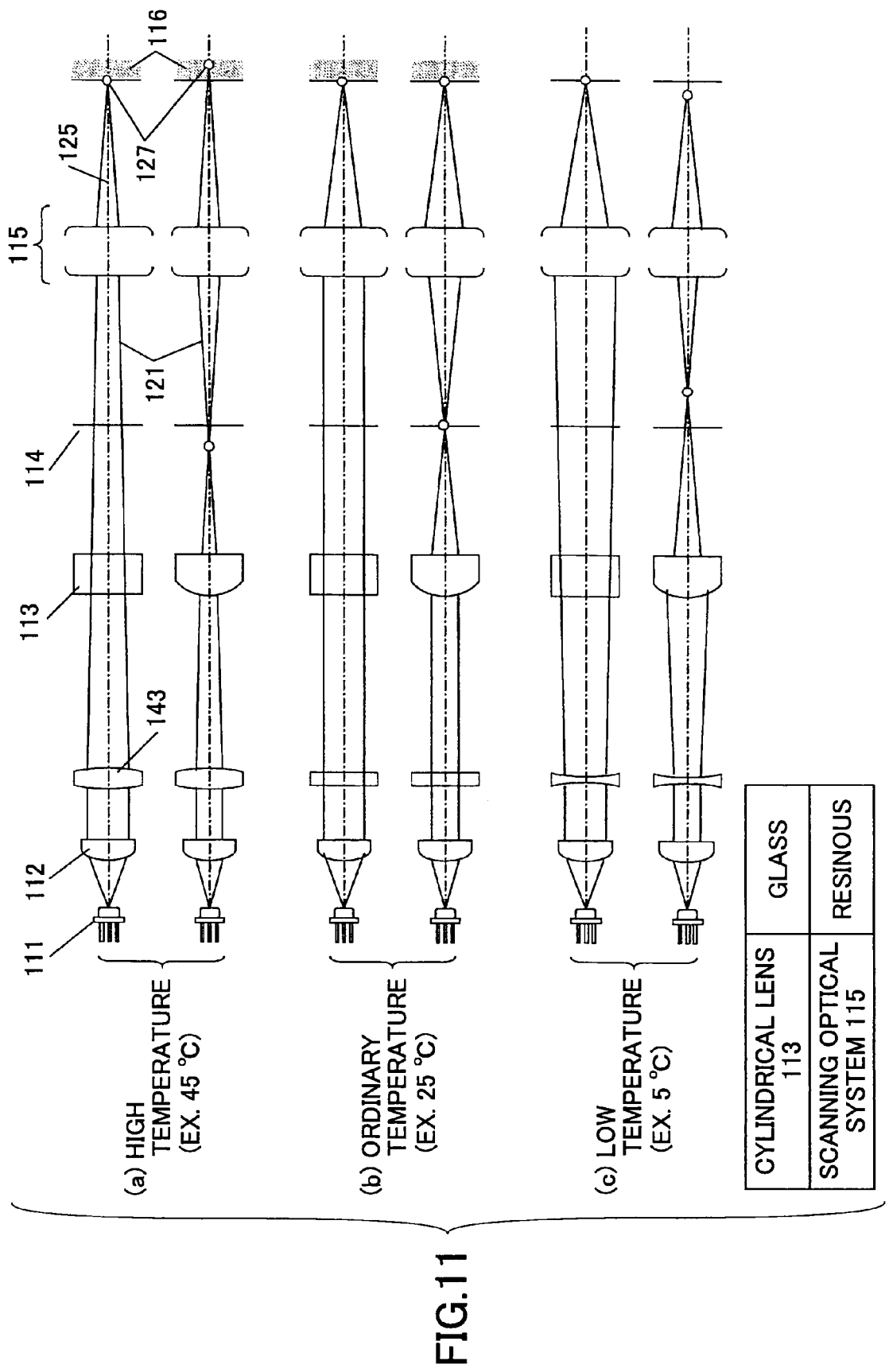
FIG. 11 shows a schematic diagram of an embodiment of the second aspect of the present invention.
Figure 12:
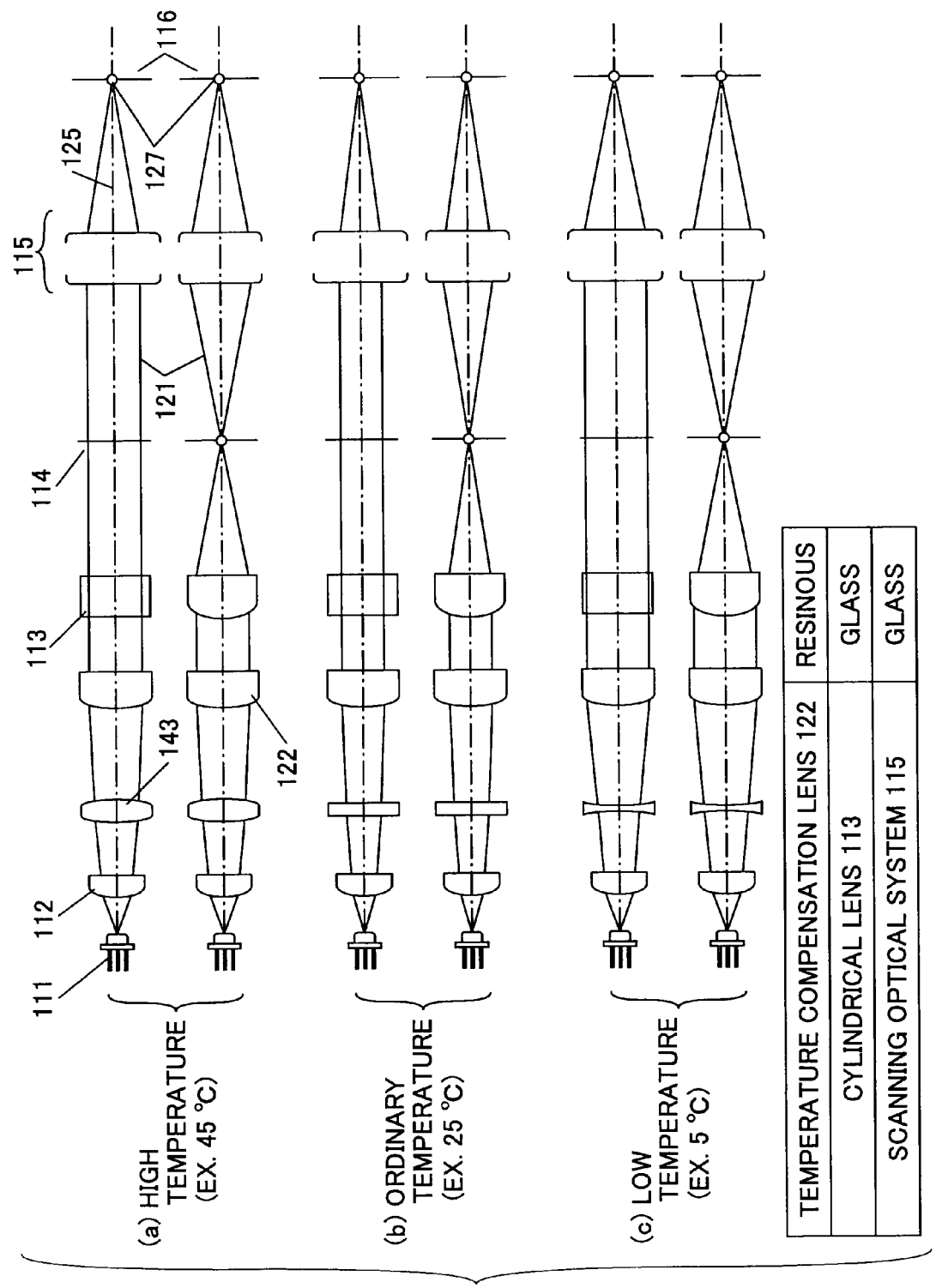
FIG. 12 shows a schematic diagram of another embodiment of the second aspect of the present invention.

With reference to FIGS. 10 through 12, change in a beam waist position occurring due to change in a temperature of a light path of the laser beam 121 from the semiconductor laser 111 through the to-be-scanned surface 116 and, in particular, change in a temperature inside of the optical housing 117 (ambient temperature) is described.

FIGS. 10 through 12 show schematic views each in a case where components disposed on the light path which the laser beam 121 passes through from the semiconductor laser 111 through the to-be-scanned surface 116 in the optical scanning device 120 in the fifth embodiment are arranged linearly along an optical axis 125 shown.

In FIGS. 10 through 12, for respective parts/components, the common reference numerals are given. That is, a laser beam 121 emitted from the semiconductor laser 111 is then emitted from the coupling lens 112, passes through the liquid crystal device 143, passes through the cylindrical lens 113, is deflected by the polygon mirror 114, passes through the scanning optical system 115, and is then imaged on the to-be-scanned surface 116 in a form of a beam spot 127.

Each of FIGS. 10 through 12, (a), (b) and (c) respectively show difference in focal points depending on the ambient temperatures inside of the optical housing. A light path schematic view at the top of each of FIGS. 10 through 12, (a), (b) and (c) shows a light path in the main scan direction, while the bottom side light path schematic view shows a light path in the sub-scan direction. Each of FIGS. 10 through 12 schematically shows the light path of the laser beam reflected by the polygon mirror 114 in a form of being unfolded for the purpose of description. That is, for example, from among the light paths of the laser beam 121 deflected by the polygon mirror 114, each figure shows the light path and the optical devices, which light path reaches the middle image height, linearly. That is, the light path schematic views shown in FIGS. 10 through 12 only schematically show change in the diameter of the laser beam 121 (the laser beam width) occurring along with deformation of the resinous lens occurring due to temperature change or change in the refractive index, which factor is necessary to illustrate the embodiment of the present invention, and does not show change in the laser beam width occurring along with deformation of the glass lens, change in the reflective index of the same, change in separation among the optical devices or such, which factor is not necessary to illustrate the present embodiment. Furthermore, the laser beam width is shown in a magnified manner appropriately (change in the magnification for each view), and thus, it is not possible to compare them relatively.

FIG. 10 shows the light path schematic view for a case where, for the purpose of comparison, all of the optical devices inside of the optical housing, that is, the cylindrical lens 113 and the scanning optical system 115 are made of glass.

FIG. 11 shows the light path schematic view for a case where, for the purpose of illustrating the present embodiment, all of the optical devices inside of the optical housing, that is, the cylindrical lens 113 and the scanning optical system 115 are made of resin.

FIG. 12 shows the light path schematic view for a case where, for the purpose of also illustrating the present embodiment, all of the optical devices inside of the optical housing, that is, the cylindrical lens 113 and the scanning optical system 115 are made of resin, and also, a resinous temperature correction lens 122 is further inserted.

Further, in FIGS. 11 and 12 for illustrating the embodiment of the second aspect of the present invention, states in which the beam waist positions are ideally corrected are shown.

Before illustrating the fifth embodiment of the second aspect of the present invention and the advantages thereof, factors which originate from temperature fluctuation in the present embodiment are described with reference to FIG. 13. As shown in FIG. 13, in the optical scanning device 120, the light source unit 118, the liquid crystal device 143, the cylindrical lens 113, the polygon mirror (deflector) 114 and the scanning optical system is enclosed by the optical housing 117. The light source unit 118 includes the semiconductor laser 111 and the coupling lens 112.

The polygon mirror 114 is mounted to a polygon motor not shown, and is driven and rotated thereby at a rotation speed of tens of thousands of rpm. At this time, by influence of heat generated by an IC provided to drive the polygon motor, heat generated due to friction between the polygon mirror and the surrounding air or such, the temperature inside of the optical housing 117 increases. Further, in a case where the optical scanning device 120 is mounted in a laser printer applying an electrophotographic process, an external heat source such as a fixing unit provided for fixing a toner image to a recording paper may also affect the temperature inside of the optical housing 117.

With reference to FIG. 10, influence of the above-mentioned heat inside of the optical housing 117 is described. In the configuration of FIG. 10, at least the optical devices (the cylindrical lens 113 and the scanning optical system 115) having positive power is made of glass thus having small temperature fluctuations in the coefficient of thermal expansion and also in the refractive index.

In a case of FIG. 10 (b) in which the ambient temperature is the ordinary temperature of 25° C., the laser beam 121 transformed into a parallel beam by the coupling lens 112 passes through the liquid crystal device 113, and is incident on the cylindrical lens in the state of the parallel beam. Accordingly, the laser beam 121 then incident on a deflection reflective surface of the polygon mirror 114 is a parallel beam in the main scan direction, is imaged in the sub-scan direction by a function of the cylindrical lens 113, and thus, is imaged in a form of a line image long in the main scan direction. Further, the scanning optical system 115 images the laser beam 121 transformed into the parallel beam by the function of the coupling lens 112 in the main scan direction on the to-be-scanned surface 116 (photosensitive drum surface), while, as to the sub-scan direction, since the deflection reflective surface of the polygon mirror 114 and the to-be-scanned surface 116 are conjugate, the scanning optical system 115 images the line image imaged by the function of the cylindrical lens 113 on the deflection reflective surface then also on the to-be-scanned surface 116. Therefore, when the ambient temperature is the ordinary temperature, the laser beam 121 is imaged on the to-be-scanned surface both in the main and sub-scan directions. As a result, no beam waist positional shift (that is, a deviation from the to-be-scanned surface) occurs.

The liquid crystal device 143 has a cell structure in which a liquid crystal layer on the order of several through tens of μm is sealed by two glass substrates, and as a result, when the ambient temperature inside of the optical housing 117 increases to a high temperature (for example, 45° C.), a central part of the liquid crystal device 143 protrudes so as to generate a lens function (positive power). In this case, as shown in FIG. 10, (a), in response to the appearance of the lens function in the liquid crystal device 143, the laser beam 121 incident on the polygon mirror 114 becomes a weak convergent beam in the main scan direction, while, the laser beam 121 becomes a line image in the sub-scan direction formed away from the polygon mirror 114 to the side of the cylindrical lens 113. On the other hand, the scanning optical system 115 including an optical lens made of glass having a small temperature fluctuation in each of the coefficient of thermal expansion and the refractive index is hardly affected by the above-mentioned temperature rise up to 45° C. As a result, the beam waist position once shifted as mentioned above is maintained also in the vicinity of the to-be-scanned surface 116. Specifically, the beam waist position is shifted from the to-be-scanned surface toward the polygon mirror 114 in each of the main and the sub-scan directions. Accordingly, a beam spot diameter on the to-be-scanned surface 116 increases.

In contrast thereto, FIG. 10, (c) shows a case where the temperature inside of the optical housing 117 falls to a low temperature (for example, 5° C.). In this case, contrary to the above-mentioned case of temperature rise, the liquid crystal device 143 has a lens function of negative power. As a result, the beam waist position in the vicinity of the to-be-scanned surface shifts from the to-be-scanned surface in a direction of going away from the polygon mirror 114. As a result, the beam waist position in the vicinity of the to-be-scanned surface 116 is shifted to go away from the polygon mirror 114 either in the main or in the sub-scan direction. As a result, the beam spot diameter on the to-be-scanned surface also increases.

Next, for a case where the scanning optical system 115 is configured by resin having a relatively large temperature fluctuation in each of the coefficient of thermal expansion and the refractive index, description is made with reference to FIG. 11.

FIG. 11, (b) shows a case where the ambient temperature is the ordinary temperature (for example, 25° C.), and, the same as in the case of FIG. 10, (b), the laser beam 121 transformed into a parallel beam by the function of the coupling lens 112 is imaged on the to-be-scanned surface (photosensitive drum) 116 in each of the main and sub-scan directions by the functions of the cylindrical lens 113 and the scanning optical system 115.

FIG. 11, (a) shows a case where the temperature inside of the optical housing 117 becomes a high temperature (for example, 45° C.). In this case, the liquid crystal device 143 has a lens function of positive power, and thus, the laser beam 121 emitted from the liquid crystal device 143 becomes a 'weak convergent beam' in each of the main and sub-scan directions. On the other hand, a curvature radius of each of the resinous first scanning lens 115a and the resinous second scanning lens 115b (having positive power) of the scanning optical system 115 increases along with the temperature rise. As a result, the positive power of the entire scanning optical system 115 is weakened accordingly.

Thus, when the temperature inside of the optical housing 117 increases to the high temperature, the effects of the positive power generated in the liquid crystal device 143 and the weakening of the positive power in the entire scanning optical system 115 are cancelled out by each other. As a result, a beam waist shift otherwise occurring in the vicinity of the to-be-scanned surface 116 is reduced, and thus, it is possible to obtain a stable small-diameter beam spot on the to-be-scanned surface 116.

Similarly, FIG. 5, (c) shows a case where the inside of the optical housing 117 becomes a low temperature (for example, 5° C.). In this case, the liquid crystal device 143 has a lens function of negative power, while the positive power of the entire scanning optical system 115 is strengthened. As a result, both effects are also cancelled out by each other, and thus, it is possible to reduce a beam waist shift otherwise occurring in the vicinity of the to-be-scanned surface 116.

In the configuration of FIG. 11, beam waist position correction is carried out only for the main scan direction. The reason therefor will be described later.

The resinous scanning lenses of the scanning optical system 115 can be manufactured in large quantities at low costs with the use of molding dies. This is because it is easy to produce aspherical shapes by means of the molding dies. On the other hand, the glass lenses of the scanning optical system 115 shown in FIG. 10 should be grinded and polished one by one in a machining process, and thus, they may not be advantageous for mass production.

A sixth embodiment of the second aspect of the present invention is described next, as another embodiment of the second aspect of the present invention.

Figure 18:
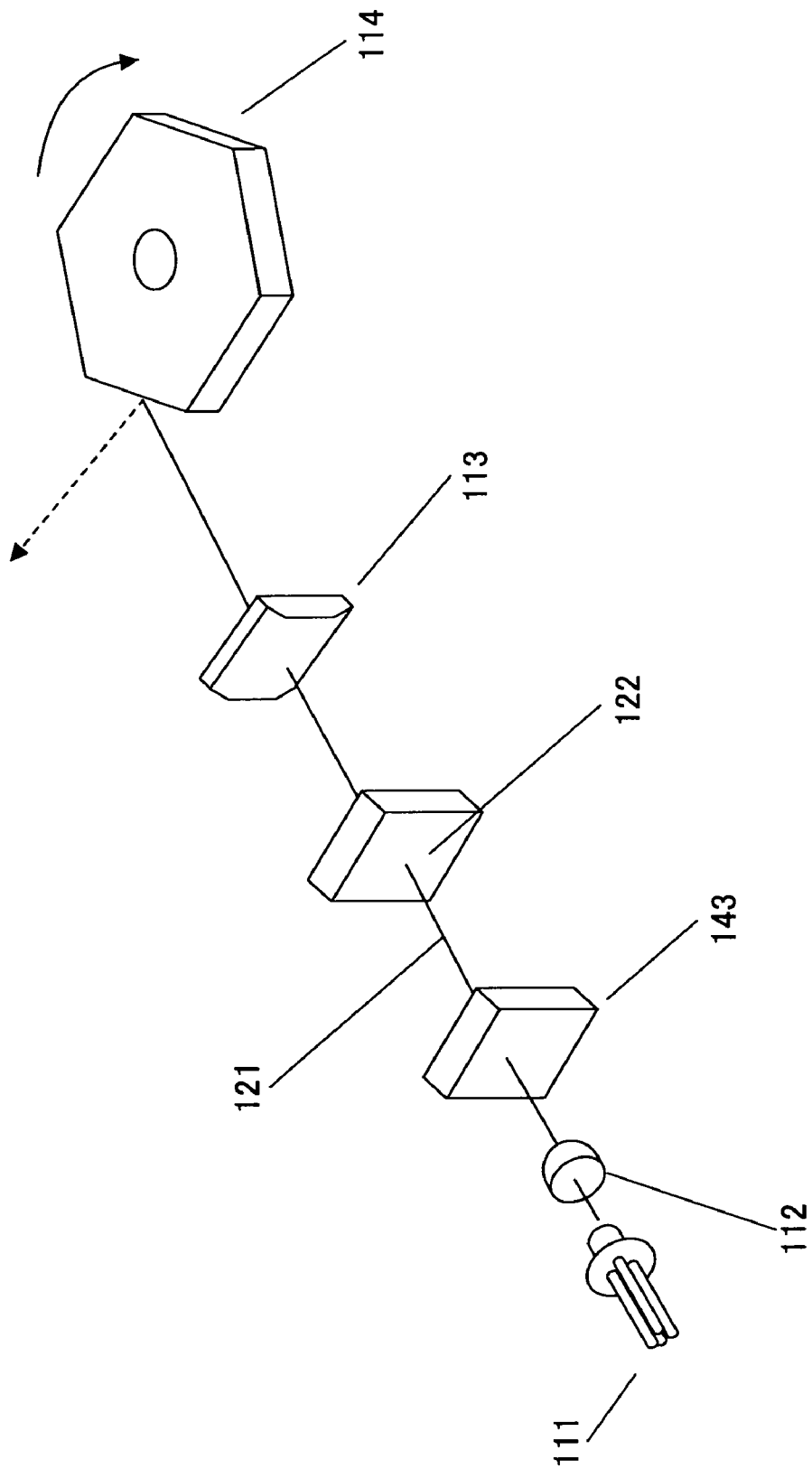
FIG. 18 shows a configuration example of an optical scanning device in an embodiment of the second aspect of the present invention.

In this sixth embodiment, as shown in FIG. 12, the resinous temperature correction lens 122 is inserted between the glass cylindrical lens 113 and the scanning optical system 115. Different from the pre-polygon mirror configuration shown in FIG. 7, the temperature correction lens 122 is used between the liquid crystal device 143 and the cylindrical lens 113 in the optical scanning device 120 in the sixth embodiment, as shown in FIG. 18.

In FIG. 12, between the coupling lens 112 and the polygon mirror 114, the resinous temperature correction lens 122 having a positive power surface in an entrance side (left side in FIG. 12) and the glass cylindrical lens 113 are disposed. In order to further improve the correction effect, a temperature correction optical system having three or more optical devices may be provided. Further, instead of the above-mentioned combination of the temperature correction lens 122 and the cylindrical lens 113, a single resinous lens having positive power in each of the main and the sub-scan directions may be provided.

Unlike the configurations shown in FIGS. 10 and 11, the laser beam 121 emitted from the semiconductor laser 111 is coupled into a weak divergent beam by means of the coupling lens 112, then passes through the liquid crystal device 143, and then, is transformed into a parallel beam by a function of the temperature correction lens 122 having positive power, in the sixth embodiment shown in FIG. 12. The laser beam thus transformed into the parallel beam is incident on the cylindrical lens 113, and behavior of the laser beam 121 occurring after that is the same as that in the configuration of FIG. 10. That is, by the functions of the cylindrical lens 113 and the scanning optical system 115, the laser beam 121 is imaged on the to-be-scanned surface 117 in both main and sub-scan directions (in a case of the ordinary ambient temperature, for example, 25° C.)

When the inside of the optical housing 117 becomes at a high temperature (for example, 45° C.), as shown in FIG. 12, (a), while positive power is generated in the liquid crystal device 143 as mentioned above, the positive power of the temperature correction lens 122 is reduced as its curvature radius increases as in the above-mentioned case of the scanning lenses 115a, 115b of the configuration of FIG. 10. As a result, both effects are cancelled out, and thus, it is possible to correct a beam waist shift with respect to the to-be-scanned surface.

When the inside of the optical housing 117 becomes at a low temperature (for example, 5° C.), as shown in FIG. 12, (c), contrary to the above-mentioned case of FIG. 12, (a), while negative power is generated in the liquid crystal device 143 as mentioned above, the positive power of the temperature correction lens 122 increases. As a result, both effects are also cancelled out, and thus, it is possible to correct a beam waist shift similarly.

Other than the above-described fifth and sixth embodiments of the second aspect of the present invention, a configuration may be applied in which an optical device provided between the scanning optical system 115 and the coupling lens 112 is made of resin. In this case, by adding an aspherical coefficient to a surface having power of the resinous optical device, it becomes possible to control wavefront aberration and stabilize the beam spot shape. Even the aspherical coefficient is thus added, it is possible to easily manufacture the resinous lens in a large quantity with the use of a molding die.

Generally speaking, when a resinous lens is manufactured with the use of a molding die, it may be difficult to maintain surface accuracy of an optical surface (entrance surface or exist surface) or internal refractive index in a satisfactory condition, that is, to satisfy design requirements, by influence of variation in molding condition, cooling condition at a time of the product being removed from the die, or such. If the surface accuracy of the optical surface or such could not be kept in a calculated value, a beam waist positional shift may occur at a time of assembly of the optical scanning device, and thus the beam spot diameter may increase accordingly. In order to avoid such an increase of the beam spot diameter, the optical device provided between the coupling lens 112 and the deflector 114 may include a plurality of optical devices, and, one thereof may be a resinous lens having a rotationally symmetrical surface having positive power.

Thus, the resinous lens may be configured to act as a temperature correction lens, and also, be movable in the optical axis direction. By moving and adjusting the above-mentioned temperature correction lens if necessary at a time of assembling adjustment of the optical scanning device, it is possible to correct a beam waist positional shift otherwise occurring due to molding variation of the above-mentioned temperature correction lens. By configuring the positive power surface to be rotationally symmetrical as mentioned above, it is possible to prevent optical performance from being degraded even when the temperature correction lens is unexpectedly rotated about the optical axis due to assembly error or such upon the above-mentioned movement adjustment process.

Upon the beam waist positional adjustment described above, as shown in numerical example shown in FIG. 15, it is preferable to correct the sub-scan beam waist position with higher priority. In order to correct the sub-scan beam waist position, the cylindrical lens 113 having power only in the sub-scan direction should be configured as being movable.

As described above, the temperature inside of the optical housing 117 changes due to a heat source existing inside of the optical scanning device 120 such as the polygon motor driving the polygon mirror, an external heat source such as a fixing unit or such. A beam waist change occurring when the temperature inside of the optical housing 117 changes from 25° C. through 45° C. is discussed next with reference to numerical examples shown in FIGS. 14 through 16. In this discussion, it is assumed that temperature change occurs in the light source unit 118, the liquid crystal device 143, the cylindrical lens 113, the polygon mirror 114, the first scanning lens 115a and the second scanning lens 115b.

The numerical examples assume the following conditions. That is, in the configuration of FIG. 7, with the use of the configuration of FIG. 10, the oscillation wavelength of the semiconductor laser 111 is 655 nm; the focal length fcol of the coupling lens 112 is 15 mm (when the optical scanning device's internal temperature is 25° C.); the first and second surfaces of the coupling lens 112 are coaxial and aspherical; and, although no numerical values are indicated, wavefront aberration from the coupling lens 112 is well corrected.

A light beam emitted from the coupling lens 112 is coupled into a parallel beam. The laser beam emitted from the coupling lens 112 is shaped by an aperture not shown, then passes through the liquid crystal device 143, and then, is incident on the temperature correction lens 122. A distance between the second surface (surface on the side of beam exit) of the coupling lens 112 and the aperture is 10 mm; a distance between the aperture and the liquid crystal device 143 is 8.3 mm; and a distance between the liquid crystal device 143 and the first surface of the cylindrical lens 113 is 29 mm.

In this configuration, optical system data from the coupling lens 112 through the to-be-scanned surface 116 is shown in FIG. 14. The cylindrical lens 113, the first scanning lens 115a and the second scanning lens 115b are made of glass and coefficient of linear expansion ($\alpha$) thereof is 7.5E-06 (1/° C.) (where E-06 denotes $\times 10^{-6}$, for example). In FIG. 14, (b), Rm denotes a curvature radius in the main scan direction; Rs denotes a curvature radius in the sub-scan direction; and N denotes a refractive index at an operation wavelength. The surface numbers 3 and 4 are given to the entrance side and the exit side of the cylindrical lens 113, respectively; the surface number 5 is given to the deflection reflective surface of the polygon mirror 114; the surface numbers 6 and 7 are given to the entrance side and the exit side of the first scanning lens 115a, respectively; the surface numbers 8 and 9 are given to the entrance side and the exit side of the second scanning lens 115b, respectively; and the surface number 10 is given to the to-be-scanned surface 116. It is noted that an angle formed between an entrance angle and an exit angle on the polygon mirror 114 of the laser beam reaching a position of image height=0 is 60°.

As described above, the liquid crystal device 143 has the cell structure in which the liquid crystal layer is sealed by the two glass substrates, and has a lens function of positive power as a result of protruding at a central part along with temperature rise. For example, experimentally, in a case of a liquid crystal device in which a liquid crystal layer of tens of μm is sealed by two glass substrates of 16×16 mm (with thickness of 0.5 mm) each, the following behavior was observed. That is, due to temperature rise by 20° C. (increase from 25° C. through 45° C.), a flat entrance (or exit) surface of the liquid crystal device at 25° C. became a surface shape corresponding to R=80,000 mm at 45° C. (that is, a spherical surface of λ/0.8 (λ=655 nm) calculated in transmitted wavefront aberration).

Under this influence, the beam waist position shifts to the side of the polygon mirror, and this beam waist positional shift cannot be corrected in a case where the cylindrical lens 113 and the scanning optical system 115 (the first scanning lens 115a and the second scanning lens 115b) are made of glass and thus coefficient of thermal expansion thereof is small.

Thus, in the configuration of FIG. 10, the beam waist positional shift occurring when the temperature rise occurs from 25° C. through 45° C. was −1.17 mm (the minus sign indicates a shift to approach the polygon mirror 114) in the main scan direction and −0.36 mm in the sub-scan direction, as shown in FIG. 17 (the configuration (A)).

Next, a case where the optical scanning system 115 is made of resin having relatively large temperature fluctuation of the coefficient of thermal expansion and refractive index, that is, the configuration of FIG. 11 is described. In this case, the curvature radius of each optical surface and the refractive index of each optical device change as shown in numerical data of FIG. 15, along with temperature change. Since the basic configuration of FIG. 15 is the same as that of FIG. 14, (a), specific description thereof is omitted. Further, since the arrangement of the optical devices is the same as that of FIG. 10, specific description thereof is omitted.

In the above-mentioned configuration, due to change in the curvature radius (aspherical coefficient) of each optical surface and change in the refractive index, the positive power of the scanning optical system 115 decreases. This results in the beam waist position shifting in a direction of going away from the polygon mirror 114. This function is cancelled out by the positive power generated in the liquid crystal device 143 (the transmitted wavefront aberration of λ/0.8 as mentioned above), and thus, the beam waist positional shift can be corrected.

In the embodiment according to the second aspect of the present invention, that is, when the configuration of FIG. 11 is applied, the beam waist positional shift occurring when the temperature inside of the optical housing 117 changes from 25° C. to 45° C., is −0.06 mm (the minus (−) sign indicating a direction of approaching the polygon mirror 114) in the main scan direction and +0.87 mm (the plus (+) sign indicating a direction of going away from the polygon mirror 114) in the sub-scan direction, as shown in FIG. 17 (the configuration (B)). Thus, it is clear that the beam waist positional shift in the main scan direction is corrected.

However, as to the beam waist position in the sub-scan direction, in comparison to the beam waist positional shift caused by the liquid crystal device 143, the correction made by the optical scanning device 115 is too much. As a result, the beam waist positional correction cannot be carried out satisfactorily. In such a case, it is possible to provide a configuration such that, by controlling the refractive index distribution in the liquid crystal device by means of phase modulation, a lens function may be made to occur, and thereby, the beam waist position shift in the sub-scan direction may be corrected. Thus, in the configuration of FIG. 11, as mentioned above, the beam waist correction in the main scan direction can be carried out.

In an optical scanning device for an image forming apparatus, since exposure of a photosensitive body surface is carried out in such a manner that a beam spot moves in the main scan direction, a beam spot diameter in the main scan direction is larger than that of a static state. Therefore, it is necessary to set the beam spot diameter of a static state so that the beam spot diameter may be smaller in the main scan direction than that in the sub-scan direction. Accordingly, it is preferable to reduce the beam spot positional shift with a higher priority for the main scan direction.

Next, an example is discussed in which, in the configuration of FIG. 7, the configuration of FIG. 12 is applied. That is, the resinous temperature correction lens 122 is provided in addition to the glass cylindrical lens 113 and the scanning optical system 115 (the first scanning lens 115a and the second scanning lens 115b) and the optical system is configured according to numerical data shown in FIG. 16.

In the configuration FIG. 12, the laser beam emitted from the coupling lens 112 is shaped by the aperture not shown, passes through the liquid crystal device 143, and then, is incident on the correction lens 122. A distance between the second surface of the coupling lens 112 and the aperture is 10 mm; a distance between the aperture and the liquid crystal device 143 is 8.3 mm; and a distance between the liquid crystal device 143 and the first surface of the cylindrical lens 113 is 13 mm. The laser beam emitted by the semiconductor laser 111 and coupled by the coupling lens 112 is one transformed in a weak divergent state, and this divergent beam is one naturally focusing to the side of the light emitting point (opposite to the to-be-scanned surface) with respective to the second surface of the coupling lens 112 at a point away therefrom by 228.0 mm.

According to the above-described mechanism, even when positive or negative power occurs in the liquid crystal device 143 along with temperature change inside of the optical housing 117, this is cancelled out by power change in the temperature correction lens 122. As a result, the beam waist positional shift is corrected. In the configuration of FIG. 12, when temperature change occurs from 25° C. to 45° C., the beam waist positional shift occurs by −0.01 mm in the main scanning direction and +0.11 mm in the sub-scan direction, as shown in FIG. 17 (the configuration (C)). Thus, in comparison among the configurations (A), (B) and (C), that is, FIGS. 10, 11 and 12 for the actual beam waist positional shift correction results shown in FIG. 17, it can be seen that the configuration (C), that is, the configuration of FIG. 12 is advantageous in that the correction is achieved in both main and sub-scan directions.

FIG. 17 shows in a collecting manner the actual beam waist positional shift amounts occurring when the temperature inside of the optical housing 117 from 25° C. to 45° C. for the respective configurations described above with reference to FIGS. 10 through 12. Therefrom, it can be seen that, as a result of making, of resin, at least one of optical devices disposed in the light path between the light source and the to-be-scanned surface having positive power, it is possible to correct beam waist positional shift in the main scan direction and/or the sub-scan direction along with temperature change inside of the optical housing.

The embodiments of the second aspect of the present invention have been described above for a single beam optical scanning device applying a single laser beam for scanning. Recently, a demand for improving a printing speed or a printing density increases. As an optical scanning device satisfying this demand, a multi-beam optical scanning device applying a plurality of laser beams simultaneously for scanning has taken a main part. Next, an embodiment of the second aspect of the present invention for a multi-beam type optical scanning device is described.

FIG. 8 shows a perspective view of a multi-beam optical scanning device 120a simultaneously applying two laser beams for scanning, in a seventh embodiment of the second aspect of the present invention. In FIG. 8, two laser beams 121a and 121b emitted by two semiconductor lasers 111a and 111b, and passing through respective coupling lenses 112a and 112b are condensed, onto a deflection reflective surface of a polygon mirror 114 acting as a deflector, only in the sub-scan direction by a function of a common cylindrical lens 113, as being imaged in a form of respective line images long in the main scan direction on the deflection reflective surface of the polygon mirror 114. Then, as a result of being deflected by the polygon mirror 114, the laser beams 121a and 121b are applied to a common to-be-scanned surface 116 which is a surface of a photosensitive drum, in a form of respective beam spots for scanning the to-be-scanned surface 116. In this multi-beam optical scanning device 120a, as shown, a configuration is made such that the two laser beams 121a and 121b may be led to the common to-be-scanned surface (surface of the photosensitive body) 116.

In the multi-beam optical scanning device applying the plurality of laser beams for scanning the common to-be-scanned surface, by driving and controlling a liquid crystal device disposed in at least one light path of the laser beams and having a deflection function, it is possible to correct separation among the plurality of beams applied to the to-be-scanned surface into a predetermined value. Thereby, it is possible to provide a multi-beam optical scanning device by which scan line separation is maintained in a predetermined condition at a high accuracy when the plurality of beams are used simultaneously for scanning.

When the above-mentioned multi-beam optical scanning device in the seventh embodiment of the present invention is applied as an exposing device in an image forming apparatus, it is possible to reduce in design the required number of revolutions of the polygon mirror for outputting a predetermined number of sheets of printed matters in comparison to a case of applying a single-beam optical scanning device. As a result, it is possible to reduce heat generation, noise and power consumption, and thus, to achieve energy saving. Furthermore, since, by means of the deflection function of the liquid crystal device, it is possible to correct beam waist positional shift from the to-be-scanned surface, it is possible to maintain scan line separation at a high accuracy, and thus, to obtain a high-quality output image with well-reduced beam waist positional shift and reduced beam spot diameter degradation.

Further, when the above-mentioned multi-beam optical scanning device is used as a device carrying out an exposing process in an image forming apparatus producing an image by carrying out an electrophotographic process, it is possible to respond to an operator's (user's) request to switch a scan density so as to switch between a high speed mode and a high density mode. Furthermore, unlike the configuration of FIG. 8 in which the liquid crystal devices are disposed on all the light paths of the laser beams (in this example, two laser beams), the number of the liquid crystal devices actually used may be reduced depending on each particular situation.

Figure 9:
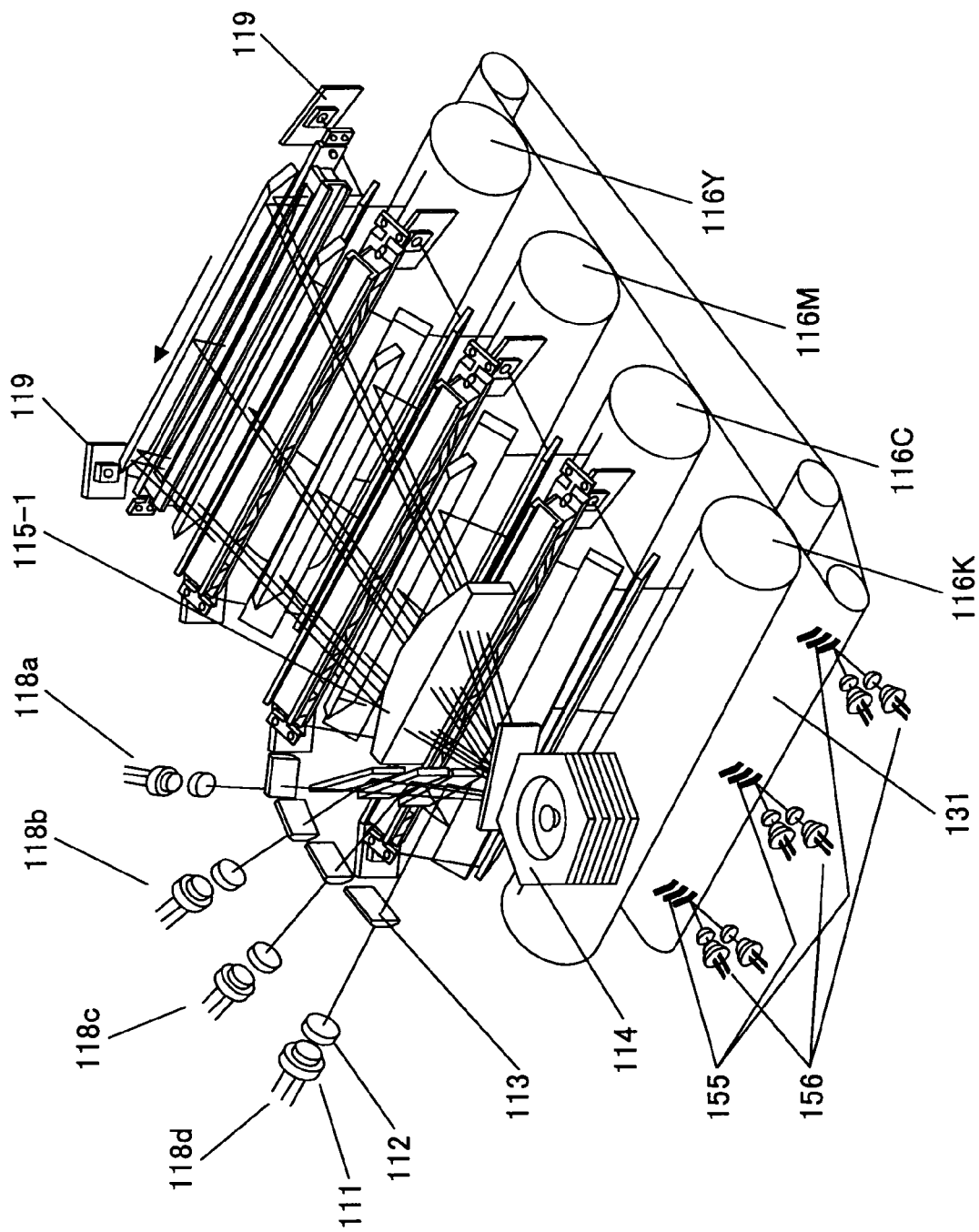
FIG. 9 shows a perspective view of an image forming apparatus in an embodiment of the second aspect of the present invention.

Different from the above-mentioned multi-beam optical scanning device in the seventh embodiment of the present invention, it is also possible to apply a configuration as shown in FIG. 9 in which a plurality of laser beams emitted from a plurality of light sources are led to mutually-different to-be-scanned surfaces, respectively.

FIG. 9 shows a four drum tandem type image forming apparatus applying an electrophotographic process in an eighth embodiment of the second aspect of the present invention. In this apparatus, as a device carrying out an exposing process, the optical scanning device according to any one embodiment of the second aspect of the present invention described above is used. As shown in FIG. 9, this apparatus includes four photosensitive drums 116Y, 116M, 116C and 116K, and corresponding four light source parts 122a, 122b, 122c and 122d. Each light source part has a semiconductor laser 111 and a coupling lens 112. Each laser beam passing through the respective coupling lens 112 then passes through a respective cylindrical lens 113 separately, and is imaged in the vicinity of a deflection reflective surface of a common polygon mirror 114 in a form of a line image. After that, each laser beam is reflected and thus deflected by the polygon mirror 114, is imaged on a surface of the respective photosensitive drum as a beam spot by means of a first scanning lens 115a and a second scanning lens 115b which are provided in common for the respective laser beams, and also, is used for scanning the surface of the respective one of the photosensitive drums.

With reference to FIG. 9, the four drum tandem type image forming apparatus according to the eight embodiment of the second aspect of the present invention is described in detail. This apparatus applies the electrophotographic process as mentioned above, and this electrophotographic process includes respective processes of electric charging, exposure, developing, transferring, fixing, cleaning and so forth. Thereamong, description of processes, which are well-known in the technical field of image forming technology, and has no direct relevance to the second aspect of the present invention is omitted.

In this tandem type image forming apparatus such as a full color copier, for respective colors, i.e., cyan (C), magenta (M), yellow (Y) and black (K), the four photosensitive drums 116Y, 116M, 116C and 116K are disposed side by side along a conveyance surface of a transfer belt 131; each laser beam is applied to the respective one of these photosensitive drums by means of the optical scanning device for scanning it so that an electrostatic latent image is formed on a circumferential surface of the respective one of the photosensitive drums; the electrostatic latent image is then visualized by toner of a respective color; and a thus-obtained toner image is then transferred to a recording paper (sheet) conveyed by the transfer belt 131 in sequence for the respective colors, and thereby, a multi-color image is produced on the recording paper. Accordingly, if shifts corresponding to the sub-scan direction occur in the scanning positions separately for the respective colors, degradation in image quality, color drift or such may occur.

In order to avoid such color drift, in the configuration of FIG. 9, color drift detection sensors 156 are provided for detecting color drift. Predetermined toner marks (color drift detection toner images 155) for the respective colors (respective photosensitive bodies) are produced between output papers (not shown) conveyed on the transfer belt 131; the thus-produced toner marks are detected by the color drift detection sensors 156; and thus, color drift can be recognized quantitatively. Based on this detecting result, liquid crystal devices, such as the liquid crystal device 143 described above, not shown, are controlled, and thus, the color drift can be positively corrected thanks to the above-mentioned deflection function of the liquid crystal devices.

As mentioned above, since it is possible to obtain an output image with well-reduced color drift, it is possible to reduce the number of timings (frequencies) of detecting color drift among the respective photosensitive bodies (photosensitive drums), and thus, it is possible to reduce a toner amount required for forming the color drift detection toner images (toner marks), and thus, to reduce consumption of the toner. Further, since beam waist positional shift (that is, beam spot diameter fluctuation as a result) is well reduced, it is possible to maintain a quality of output images at a high level.

A third aspect of the present invention is described next.

Figure 19:
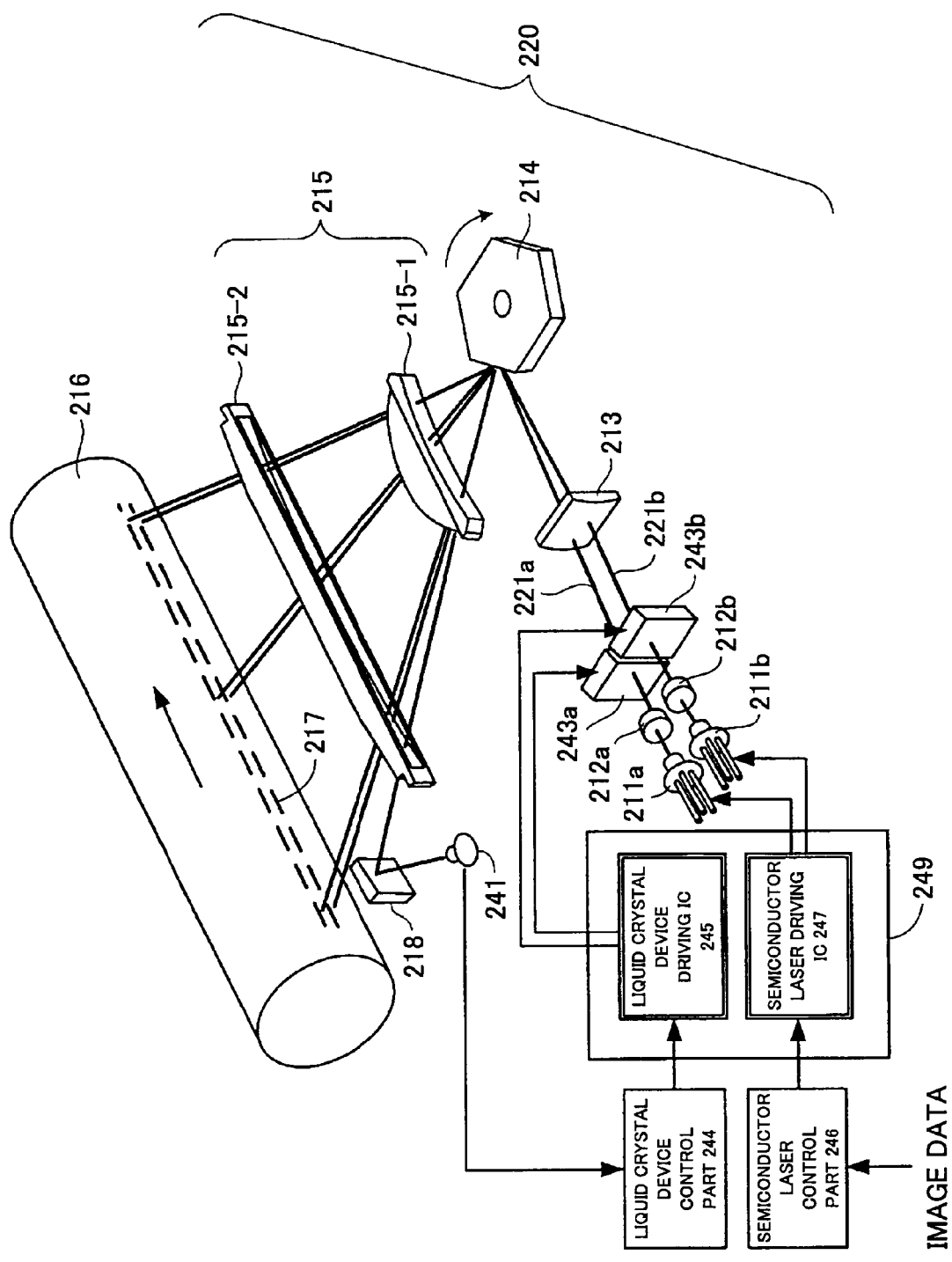
FIG. 19 shows a general configuration diagram of an embodiment of a third aspect of the present invention.

FIG. 19 shows a general configuration of a ninth embodiment of the third aspect of the present invention, which is used as an optical writing unit or such in an image forming apparatus. Although this optical scanning device is a two-beam scanning device simultaneously applying two laser beams for scanning, it is possible to expand it to a multi-beam scanning device simultaneously applying more than two laser beams for scanning.

The laser beams 221*a* and 221*b* emitted from two semiconductor lasers 211*a* and 211*b* and passing through respective coupling lenses 212*a* and 212*b* are then imaged as respective line images on a deflection reflective surface (imaged in the sub-scan direction and long in the main scan direction) of a polygon mirror 214 acting as a deflector by a function of a cylindrical lens 213. Then, the laser beams are deflected by the polygon mirror 214 and scans a to-be-scanned surface 216 (image carrying body: a photosensitive drum) with a form of beam spots to draw respective scan lines 217 thereon by a function of a scanning optical system 215 (a first scanning lens 215-1 and a second scanning lens 215-2).

Such a device 220 of scanning the to-be-scanned surface 216 with light beams emitted from light sources with a form of beam spots is called 'optical scanning device'.

In the above-mentioned 'main scan direction' and 'sub-scan direction' mean, respectively, a direction in which the to-be-scanned surface is scanned by the beam spot and a direction perpendicular thereto, commonly. However, in the specification of the present application, as mentioned above, directions corresponding to the main scan direction and the sub-scan direction (on the to-be-scanned surface), in a location of a light path, are also referred to as a 'main scan direction' and a 'sub-scan direction', respectively, in a broad sense.

The two semiconductor lasers 211*a* and 211*b* are controlled by a semiconductor laser control part 246 according to given image data, modulated by a semiconductor laser driving IC, and, in this condition, the two laser beams 221*a* and 221*b* are applied to the photosensitive drum 216 for scanning it.

In the configuration of FIG. 19, the two laser beams 221*a*, 221*b* intersect one another in the vicinity of the deflection reflective surface of the polygon mirror 214 as shown. By applying such a configuration, it is possible to avoid occurrence of difference in optical characteristics (imaging positions, magnifications or such) between the two laser beams otherwise occurring due to difference of particular reflection points on the polygon mirror 14.

In many cases for such multi-beam scanning devices, 'a light beam position correcting device' is provided, for the purpose of initial adjustment, or correcting environmental/aging variation.

The light beam correcting device is basically configured:
to rotate a returning mirror;
to shift/rotate a cylindrical lens;
to shift/rotate a prism;
to utilize an electro-optical device or AOM;
to rotate a parallel plane plate provided between the semiconductor laser and the coupling lens, or such, whereby a light path is deflected (that is, the laser beam is deflected by a slight angle). Therefore, such a device is called 'light path deflection device'. However, in this method, problems may occur such that, the device is large-sized, power consumption/heat generation/noise increases, or such.

Therefore, according to the third aspect of the present invention, as shown in FIG. 19, as the light path deflection device, 'liquid crystal devices' 243*a*, 243*b* which are advantageous in that they are small-sized, light-weighted, require reduced power consumption, generate no noise nor heat, or such, are applied.

In the optical scanning device 220 shown in FIG. 19, at a position optically equivalent to a surface of the photosensitive drum 216 acting as the to-be-scanned surface, a beam pitch detection sensor 241 also acting as a synchronization detection sensor is provided, and therewith, it is possible to detect a beam scanning start position for the main scan direction and a beam pitch (scan line separation in the sub-scan direction) on the photosensitive drum 216. A difference between the thus-obtained detection result of the beam pitch and a desired scan line separation is calculated by a liquid crystal device control part 244, and, the liquid crystal devices 243*a* and 243*b* are driven based on correction data prepared for correcting or eliminating the thus-calculated difference.

In addition to the beam pitch detection sensor 241 for detecting the beam spot position (scan line start position) and the scan line separation, a temperature sensor may be provided (not shown) for detecting a temperature inside of the apparatus. In this case, previously a relationship between a temperature change in the apparatus which is a main cause of scan line separation change and an actual scan line separation change should be obtained by means of a simulation, an actual experiment or such; a correction table should be produced based on the thus-obtained relationship; with the use of the correction table, the liquid crystal devices 243*a* and 243*b* should be driven and controlled; and thus, scan line separation correction should be carried out.

Further, similarly, as described later for 'beam waist positional correction by means of a liquid crystal device', beam waist position fluctuation may be corrected based on the detection result from the temperature detection sensor. Also in this case, a relationship between a temperature change and an actual beam waist positional shift (imaging position) occurring thereby should be obtained previously.

When the liquid crystal devices 243*a* and 242*b* are thus used for initial adjustment of scan line separation, correction for environmental variation or aging variation, or scan line density switching (between 600 dpi and 1200 dpi, for example), they should be disposed in such a manner that a direction of light path deflection may correspond to the sub-scan direction (or, at least a direction including a component of the sub-scan direction).

Numerical data of the optical scanning device 220 shown in FIG. 19 is mentioned next. For example, a focal length of the cylindrical lens 213 is determined as focal=130 [mm]; a sub-scan magnification of the optical system subsequent to the deflector 214 (that is, the scanning optical system 215 including the first scanning lens 215-1 and the second scanning lens 215-2) is determines as mz=1.1 [times]; and a light path deflection angle available by means of the liquid crystal devices 243a and 243b in the sub-scan direction is determined as β=±2.0 [min.]. Then, a beam spot positional change amount (adjustable range) Δz in the sub-scan direction on the to-be-scanned surface of the photosensitive drum 216 is obtained as follows:

$$\Delta z = mz \times \text{focal} \times \tan\beta$$
$$= 1.1 \times 130 \times \tan(\pm 2.0 \text{ min.})$$
$$= \pm 0.083 \text{ [mm]}$$
$$= \pm 83 \text{ [μm]}$$

By applying the main scan direction to the direction of light path deflection, it is possible to change the beam spot position on the to-be-scanned surface of the photosensitive drum 216 in the main scan direction.

Operation principle of the liquid crystal device will now be described.

First, a configuration of the liquid crystal device is described.

Figure 20:
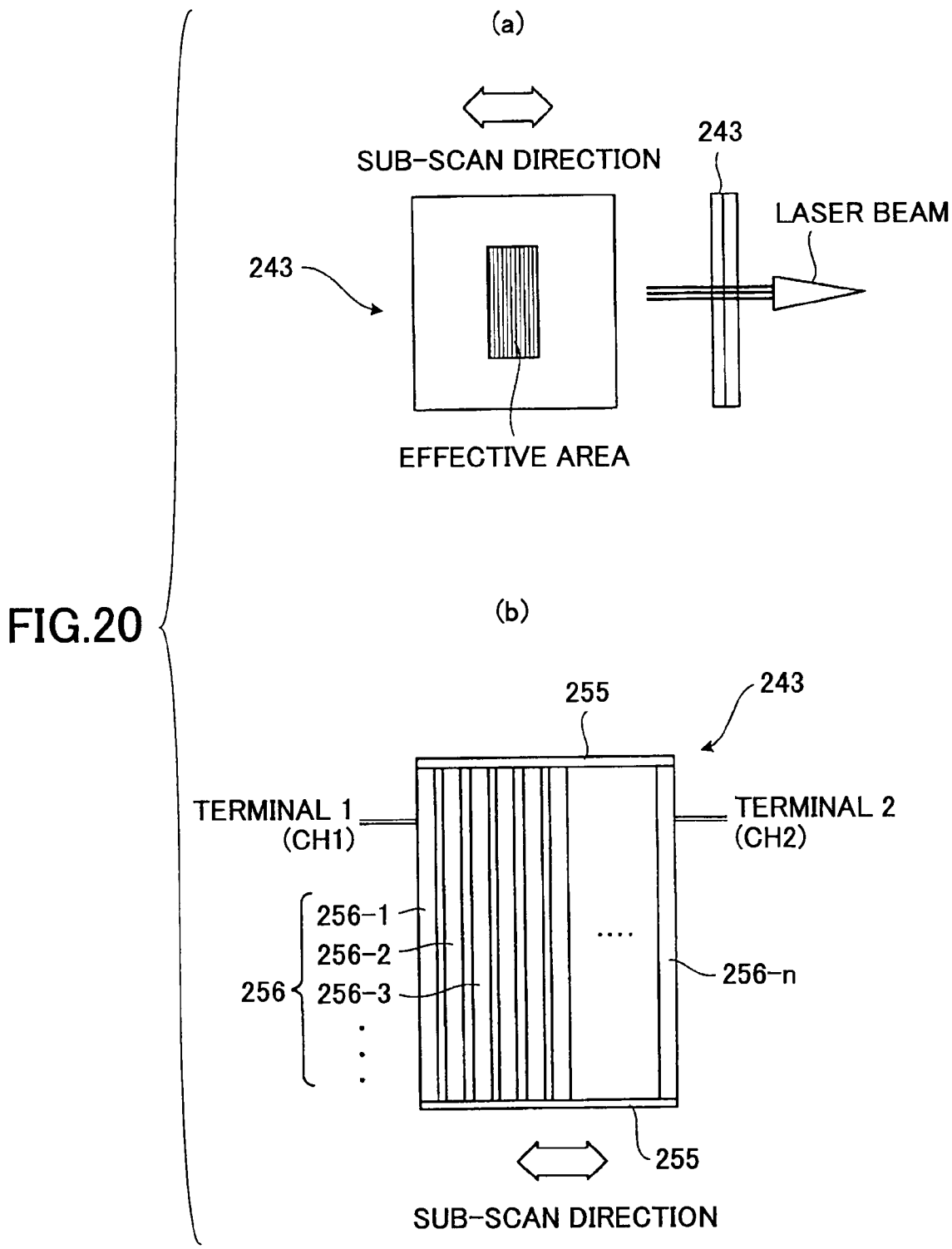
FIG. 20 illustrates a configuration of a liquid crystal device according to the third aspect of the present invention.
Figure 21:
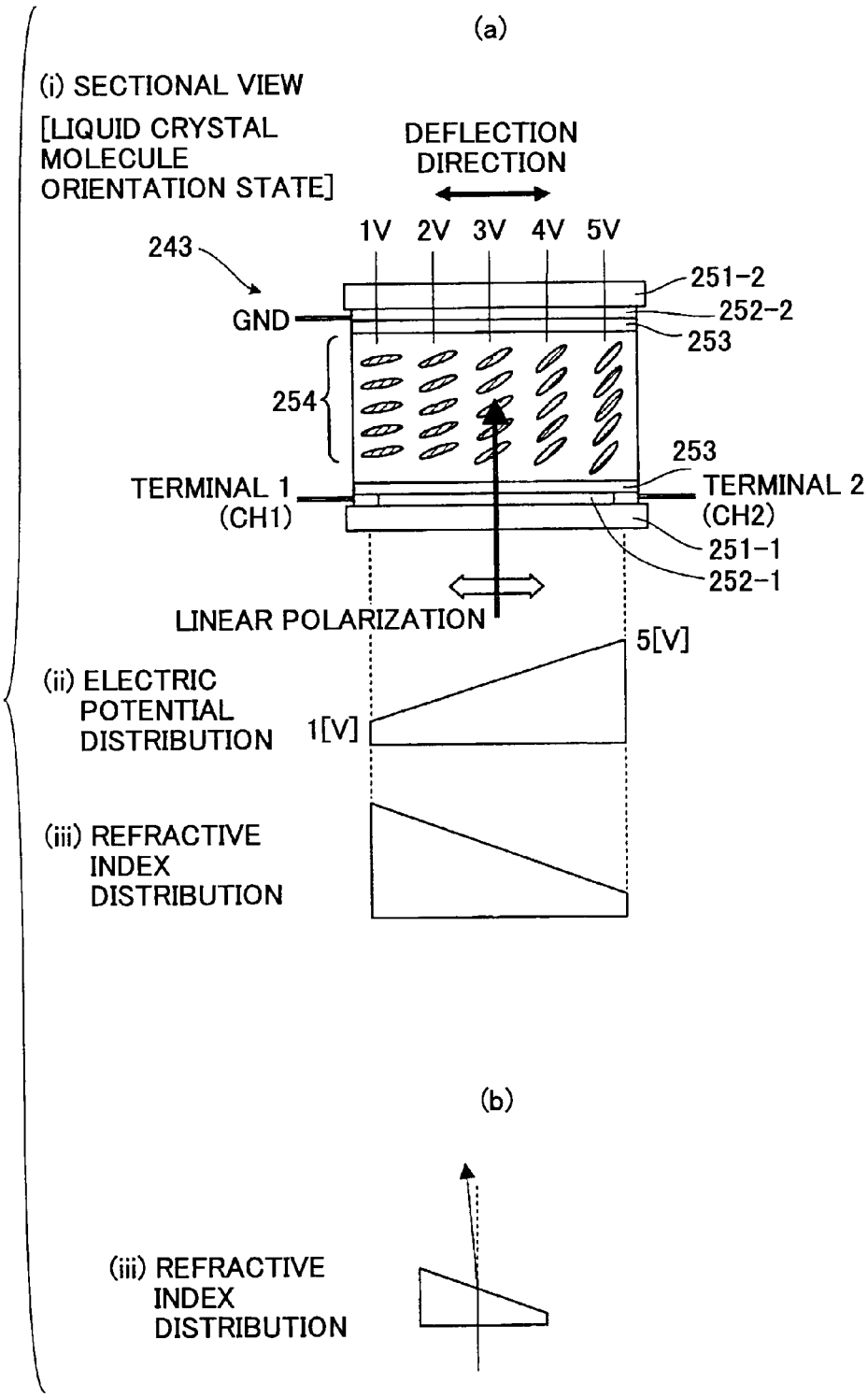
FIG. 21 shows (a) a sectional configuration, liquid crystal molecule orientation state and an electric potential distribution and a refractive index distribution within a liquid crystal layer in an effective area of the liquid crystal device in the third aspect of the present invention; and (b) a manner of laser beam light path deflection by means of the liquid crystal device having a refractive index distribution in a uniform slope.

FIG. 20, (a) and (b) and FIG. 21, (a), (i) schematically show a configuration of the liquid crystal device. FIG. 20, (a) shows an outline shape and the liquid crystal device 243, and FIG. 21, (i) shows a sectional view of the liquid crystal device 243 and orientation state of liquid crystal molecules.

As shown in FIG. 21, (a), (i), in the liquid crystal device 243, a liquid crystal layer 254 having a thickness of on the order of several through tens of μm is sandwiched by two glass substrates 251-1 and 251-2 via transparent electrode 252-1, 252-2 and an orientation film 253. In this figure, the bottom transparent electrode 252-1 (on the side of laser beam entrance) has electrode patterns 256 (256-1, 256-2, 256-n) arranged at equal intervals (in the right and left direction), as shown in FIG. 20, (b), while the top transparent electrode (on the side of laser beam exit) 252-2 has an electrode pattern uniform throughout the whole area.

FIG. 20, (b) is a view of the transparent electrode 252-1 within an effective area taken from the entrance side. As shown, in the transparent electrode 252-1, the transparent patterns 256 are arranged at equal intervals like stripes, and, each stripe-liked transparent electrode 256-1, 256-2, ..., or 256-n is electrically connected to a pair of resistance members 255.

The right and left direction in FIG. 20, (b) corresponds to a direction in which the laser beam is deflected in its light path, and, in a case of correcting scan line separation among the plurality of laser beams, this direction corresponds to the sub-scan direction.

At the right and left ends of the stripe-like electrode patterns 256-1 through 256-n, two terminals (a terminal 1 and a terminal 2) are provided, and a driving signal (ordinarily, a rectangular wave voltage on the order of several kHz). By applying different voltages to the terminals 1 and 2 (CH1, CH2), it is possible to generate a linear electric potential distribution (with a uniform slope) with a resistance R of the resistance member 255 as a proportional constant of the uniform slope, inside of the liquid crystal layer. It is possible to change a tilt angle $\phi$ of the liquid crystal molecules of the liquid crystal layer 254 according to this electric potential distribution.

Next, change in refractive index with respect to extraordinary light, along with orientation of the liquid crystal molecules is described.

Figure 23:
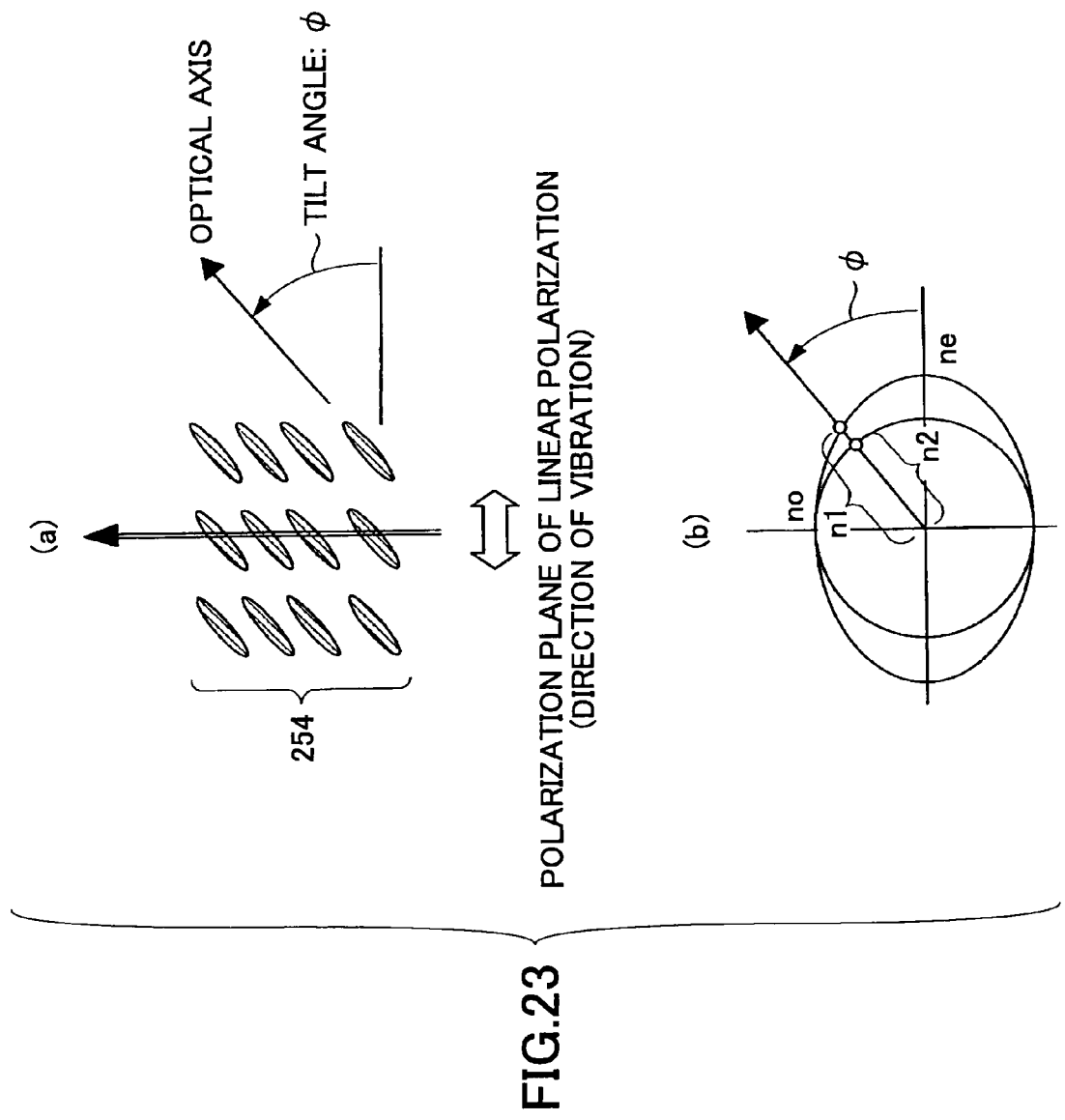
FIG. 23 shows (a) a manner of tilt of the liquid crystal molecules (optical axes) by means of a voltage applied to the liquid crystal device; and (b) a refractive index distribution of liquid crystal (uni-axial crystal)

FIG. 23, (a) shows a state of tilt (of optical axes) of the liquid crystal molecules caused by change in the applied voltage, while FIG. 23, (b) shows a refractive index of a liquid crystal (uni-axial crystal). In FIG. 23, (b), n1 denotes a refractive index with respect to a linear polarization having a polarization plane shown in FIG. 23, (a), while n2 denotes a refractive index with respect to linear polarization having a polarization plane perpendicular to the polarization plane shown in FIG. 23, (a).

In FIG. 23, (a), a case where a linear polarization vibrating in a direction shown by an arrow (⇔) is applied to the liquid crystal layer 254 having a major axis of the liquid crystal inclines by a tilt angle $\phi$ is discussed. When this liquid crystal molecular is regarded as a uni-axial crystal, the liquid crystal layer having the major axis of the liquid crystal molecules (that is, the optical axis of the uni-axial crystal) inclined by the tilt angle $\phi$ has a refractive index of extraordinary light. That is, in FIG. 23, (b), a distance n1 between 'a cross point between 'an ellipse having a major axis radius ne and a minor axis radius no' and 'a straight line with a slope of the angle $\phi$' and the 'origin'' indicates the above-mentioned refractive index of extraordinary light. Accordingly, by changing the tilt angle $\phi$ of the liquid crystal molecules by applying a voltage to the liquid crystal layer 254, it is possible to control the refractive index n1 with respect to extraordinary light.

When the vibration direction of the linear polarization is perpendicular to that of the above-mentioned case (that is, in a case where the linear polarization vibrates in a direction perpendicular to the figure), the refractive index is determined by a circle of a radius no in FIG. 23, (b), and, in this case, the refractive index has a fixed value (n2=no) without regard to the tilt angle $\phi$ of the liquid crystal molecules.

The refractive index for a case where a uniform electric potential slope is generated in the liquid crystal layer is described next.

For example, a case where the driving signal (driving voltage) of CH1=1.0 [V] and CH2=5.0 [V] is applied to the terminal 1 and the terminal 2 of the liquid crystal device 243 is discussed with reference to FIG. 21, (a). Since the driving voltage is ordinarily of a rectangular wave or a sine wave on the order of several kHz, it is actually expressed by an effective value thereof. By changing the amplitude thereof, it is possible to change the effective value. Further, in the optical scanning device 220 shown in FIG. 19, the liquid crystal device driving IC 245 outputs the driving voltage to the terminal 1 and the terminal 2 of the liquid crystal devices 243 (243a, 243b).

As described above for the configuration of the liquid crystal device, the stripe-like transparent electrodes 256 are connected to the uniform resistances (255), and as a result, when CH=1.0 [V] and CH2=5.0 [V] are applied to the terminal 1 and the terminal 2, an electric potential distribution of a uniform slope as shown in FIG. 21, (ii) appears between the terminal 1 and the terminal 2. Although, this electric potential distribution is, strictly speaking, a step like one corresponding to the respective stripes, it is possible to regard it as a substantially linear uniform slop by providing a sufficiently large number of the stripes. According to this electric potential slope, the orientation state (tilt angle $\phi$) of the liquid crystal molecules in the liquid crystal layer 254 changes continuously. As a result, in the liquid crystal layer 254, a refractive index distribution shown in FIG. 21, (*iii*) occurs, with respect to the linear polarization vibrating in the direction of the arrow (⇔). By this refractive index distribution, phase of an incident beam is modulated, and, as shown in FIG. 21, (*b*), it is possible to deflect the light path accordingly.

Control of phase modulation by the liquid crystal device is described next.

First, phase modulation by the liquid crystal device is described.

As described above briefly for the operation principle of the liquid crystal device, it is possible to change the refractive index with respect to the incident laser beam and to modulate its phase (control its wavefront shape) by applying the driving voltage to the liquid crystal device 243. Here, the phase modulation of the liquid crystal device is described supplementarily with reference to FIG. 24 below.

Figure 24:
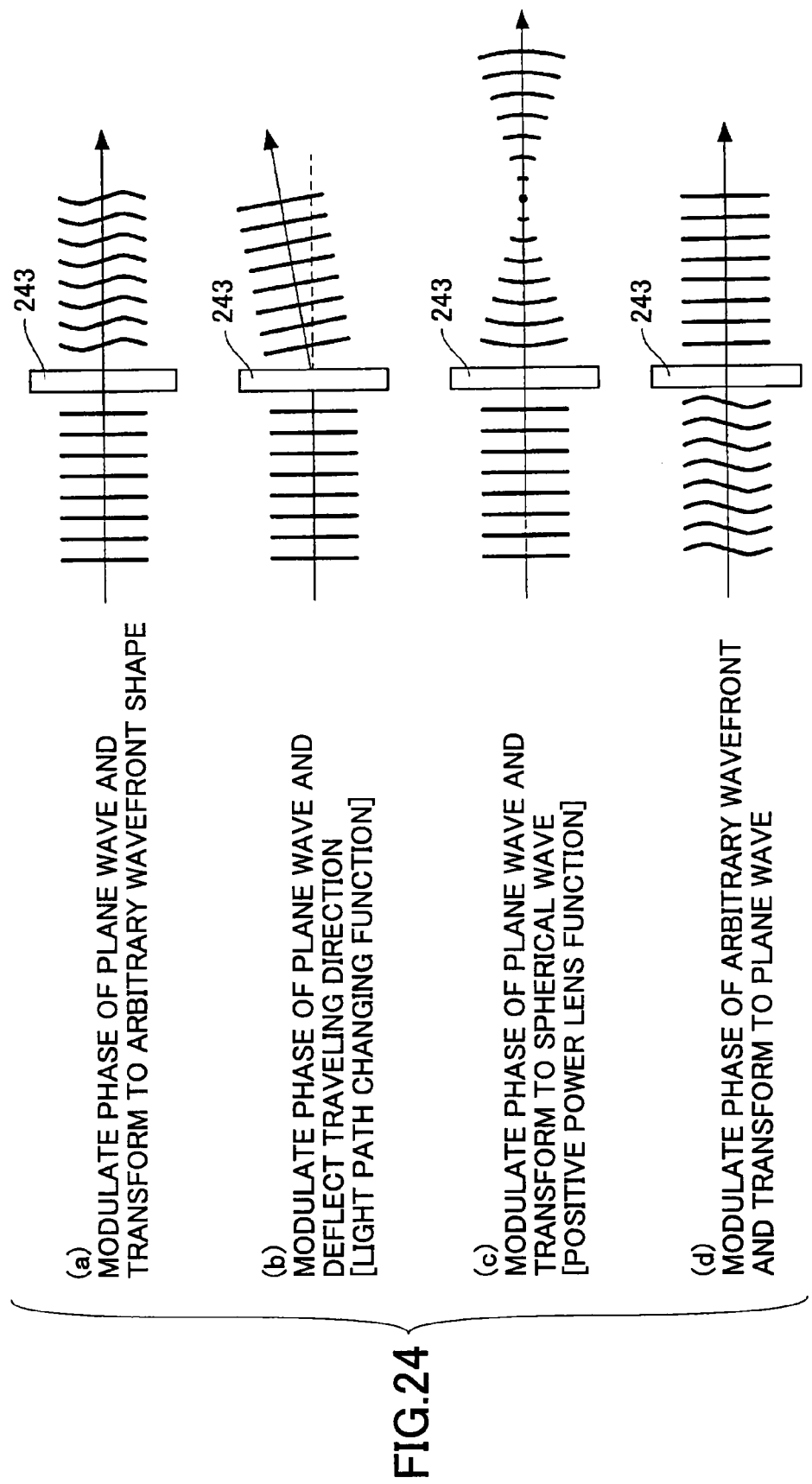
FIG. 24 shows a manner of modulation of phase (wavefront) by means of the liquid crystal device.

FIG. 24, (*a*) shows an example in which, by modulating phase of incident beam having a wavefront of a plane shape, this is transformed into a wavefront having a desired shape. In order to achieve such phase modulation for a desired wavefront shape, a configuration should be employed in which voltages applied to the respective stripe-like electrode patterns should be controlled separately, as described below for 'refractive index obtained when voltages applied to the stripe-like electrode patterns respectively are separately controlled'.

FIG. 24, (*b*) shows an example in which, by modulating phase of an incident beam having a plane-shaped wavefront, a progress direction of the plane wave is deflected. In this case, the liquid crystal device 243 acts as a deflection device.

FIG. 24, (*c*) shows an example in which, by means of the liquid crystal device 243, phase of an incident beam having a plane wavefront is modulated, and thereby, the plane wave is transformed into a spherical wave. In this case, the liquid crystal device 243 acts as a lens having positive power.

FIG. 24, (*d*) shows a case where, contrary to the case of FIG. 24, (*a*), by the liquid crystal device 243, an incident beam having a certain shape of wavefront is transformed into a plane wave, as a result of phase of the incident beam being modulated.

Thus, it is possible to modulate phase of an incident laser beam in various ways as a result of the liquid crystal device 243 being appropriately driven and controlled.

The above-mentioned refractive index obtained when voltages applied to the stripe-like electrode patterns respectively are separately controlled is described.

Figure 22:
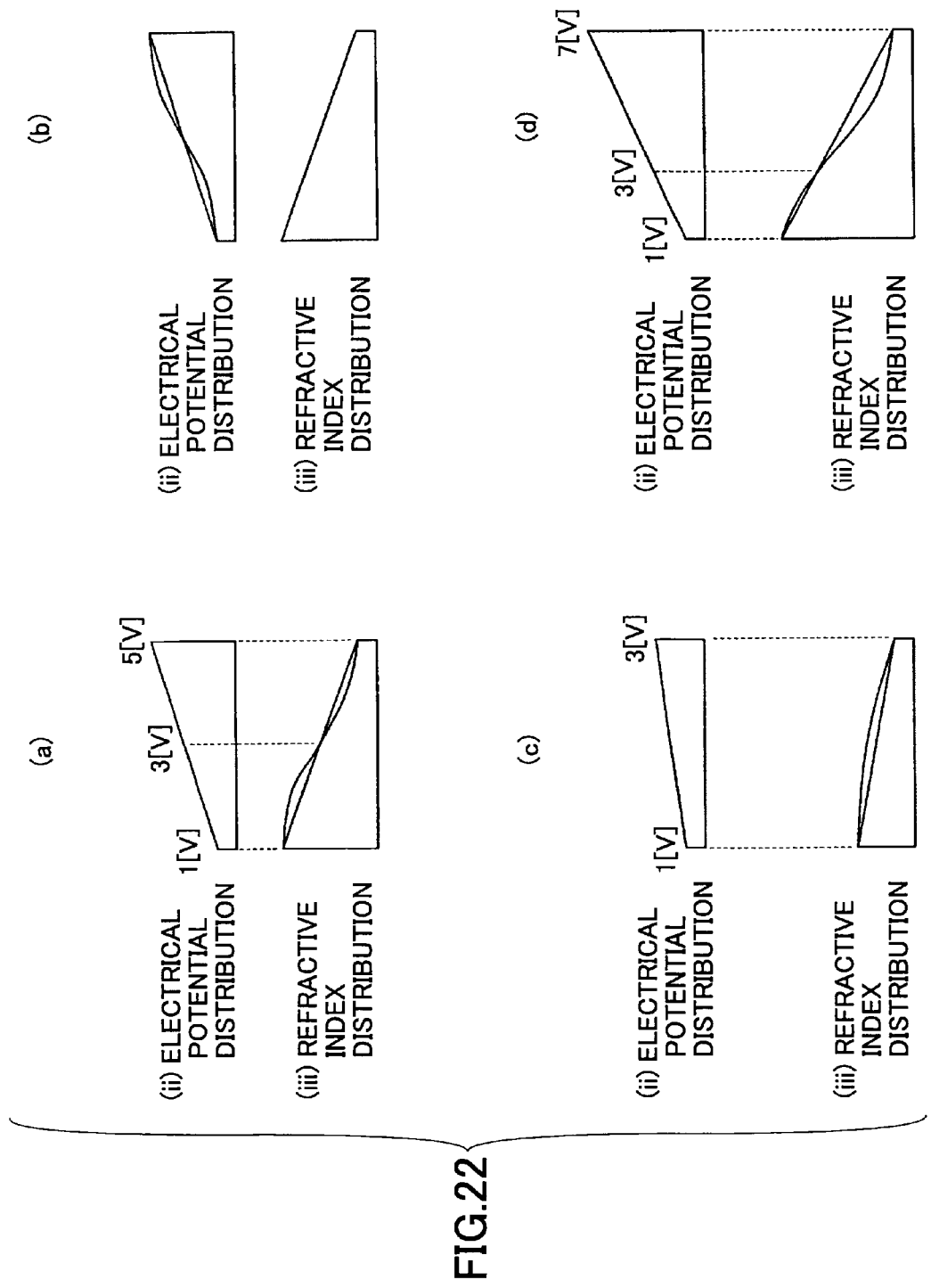
FIG. 22 shows electric potential distributions and relative index destitutions in the effective area of the liquid crystal device.

FIG. 22, (*a*) through (*d*) show diagrams corresponding to the electric potential distribution shown in FIG. 21, (*a*), (*ii*) and the refractive index distribution shown in FIG. 21, (*a*), (*iii*). FIG. 22, (*a*) shows a case where the refractive index is not in proportion to the electric potential distribution; FIG. 22, (*b*) shows a case where, as a result of voltages being applied separately to the respective stripes, the electric potential distribution is thus changed, and as a result, the refractive index distribution is corrected to have a linear characteristic (uniform slope); FIG. 22, (*c*) shows a case where CH1=1 [V] and CH2=3 [V], and the refractive index has positive power; and FIG. 22, (*d*) shows a case where CH1=1 [V] and CH2=7 [V], and the refractive index has negative power at a central part.

It is noted that, from an effect that 'the applied voltage and the orientation angle φ of the liquid crystal molecules are not in proportion to each other' and an effect that 'the orientation angle φ and the refractive index are not in proportion to each other', there is a possibility that the refractive index distribution cannot practically be regarded to have a uniform slope, as shown in FIG. 22, (*a*), (*iii*), even when a uniform electric potential slope is applied to the liquid crystal layer as a result of the respective stripe-like electrode patterns 256 being connected with the uniform resistance 255 as shown in FIG. 20, (*b*).

FIG. 22, (*c*) shows an example of applying the voltage in another manner to the liquid crystal device and shows a problematic situation caused by the above-mentioned phenomenon. This is a case where CH=1.0 [V] and CH2=3.0 [V] are applied to the terminal 1 and the terminal 2 of the liquid crystal device 243, as shown. In this case, an electric potential slope from 1.0 [V] through 3.0 [V] is applied to the arrangement direction of the electrode patterns within the effective area, and, in response thereto, as shown in FIG. 22, (*c*), (*iii*), the refractive index distribution has, in addition to a slope component, a curvature component. This curvature component gives a spherical aberration component to transmitted wavefront aberration of a laser beam. Thus, a lens function (positive power) is generated in the liquid crystal device 243. If such a liquid crystal device is used as the light path deflection device in the optical scanning device, a beam waist positional shift (focus error) occurs in the vicinity of the to-be-scanned surface, and thus, a beam spot shape on the to-be-scanned surface is degraded.

FIG. 22, (*d*) shows an example showing another problematic situation. In this case, CH1=1.0 [V] and CH2=7.0 [V] are applied to the terminals 1 and 2 of the liquid crystal device 243. According to the electric potential distribution shown in FIG. 22, (*d*), (*ii*), the refractive index distribution shown in FIG. 22, (*d*), (*iii*) is generated. Thus, in this case, negative power occurs in the entirety of the effective area as shown.

In order to avoid such problematic situations, as shown in FIG. 22, (*b*), (*ii*) and (*iii*), the voltages applied to the respective stripe-like electrode patterns 256-1 through 256-*n* are separately (individually) controlled, so that the refractive index distribution (that is, phase distribution) may have a uniform slope.

In this case, it is not necessary to provide the resistance members 255 connecting among the respective stripe-like electrode patterns 256 shown in FIG. 20, (*b*), and instead, a configuration is applied in which driving voltages output from the liquid crystal device driving IC 245 are input to the respective particular electric patterns 256.

When the liquid crystal devices are manufactured in a large quantity, it may be difficult to manage to control a manufacturing process so strictly that the refractive index distribution may have a uniform slope, due to possible variation in the orientation properties of the liquid crystal molecules, variation in the liquid crystal layer thickness, the electric properties of the transparent electrodes or such. Therefore, to separately control the voltages applied to the respective stripe-like electrode patterns so as to cause the refractive index distribution (phase distribution) of the liquid crystal layer to have a uniform slope can improve the 'linearity' in the refractive index distribution finally obtained, at least in comparison to the case where, as shown in FIG. 22, (*a*), (*c*) and (*d*), the stripe-like electrode patterns are merely connected by the uniform resistances and the voltages are applied to the electrode patterns at the both ends.

In the case where the voltages applied to the respective stripe-like electrode patterns are controlled separately, a curve of the phase difference obtained with respect to the voltages applied to the respective stripe-like electrode patterns should be obtained for a target light path deflection angle previously by means of a design or an experiment. Then, based on a correction table produced based on the thus-obtained curve of the phase difference, control amounts of the driving voltages should be determined.

Furthermore, it is also possible to determine control amounts of the driving voltages by using a correction table produced based on a simulation or an experiment result, for the purpose of correcting wavefront aberration degradation occurring due to expansion/shrinkage of the liquid crystal device due to expansion/shrinkage of the liquid crystal layer in response to temperature change mentioned above.

A requirement for the transmitted wavefront aberration occurring in the liquid crystal device is described next.

In an optical scanning device applied in an image forming apparatus such as a laser printer, a digital copier or such which is industrially manufactured in each manufacturer currently, it is necessary to maintain a beam spot shape in the vicinity of a to-be-scanned surface (photosensitive body surface) for the purpose of ensuring an output image quality. For this purpose, it is required to control the wavefront aberration occurring in an optical system of the optical scanning device as precisely as possible.

However, the transmitted wavefront aberration on the order of $\lambda/10$ for example may occur even during a non-driven condition of the liquid crystal device due to variation in profile irregularity of a grass substrate surface, pressure management variation upon sealing the liquid crystal layer, or such.

In order to remove influence of the transmitted wavefront aberration, positional adjustment between a semiconductor laser and a corresponding coupling lens (that is, so-called 'optical axis/collimate adjustment') should be carried out in a condition in which the liquid crystal device is disposed on the light path.

On the other hand, when the liquid crystal device is driven, as shown in FIG. 22, (*a*), the refractive index distribution may not have a uniform slope even when a uniform electric potential slope is applied to the effective area of the liquid crystal device, and, actually, it may have a curved slope. Due to such a refractive index distribution, wavefront aberration may occur in a laser beam emitted from the liquid crystal device.

As described above, it is possible to achieve a uniform slope of the refractive index distribution by appropriately controlling the voltages applied to the respective stripe-like electrode patterns 256-1 through 256-*n* as shown in FIG. 22, (*b*). However, due to an influence of variation in respective components, a variation occurring in an assembly process or such, the applied voltages and the phase difference obtained therefrom may not have a proportional relationship, and thus, still there is a possibility that the wavefront aberration (spherical aberration component) occurs.

It is preferable to completely remove the influence of wavefront aberration (spherical aberration) occurring when the liquid crystal device is driven. However, it is also possible to minimize the influence of wavefront aberration on the beam spot shape as a result of, generally speaking, controlling PV in the incident beam diameter of the above-mentioned transmitted wavefront aberration within $\lambda/4$ (where $\lambda$ denotes a wavelength of the laser beam), preferably, within $\lambda/8$, in an optical scanning device manufactured in each manufacturer currently.

The above-mentioned 'transmitted wavefront aberration' should be calculated as follows. That is, the difference between 'the transmitted wavefront aberration of the transmitted laser beam when the liquid crystal device is driven' and 'the transmitted wavefront aberration when the liquid crystal device is not driven' is obtained. Then, a slope component is removed from thus-obtained difference curve, and after that, the curve is approximated by a polynomial having a quadratic or a further higher order', in order to remove a high-frequency component due to a noise or such occurring when the transmitted wavefront aberration is measured by means of an interferometer. Then, the difference (PV in the incident beam diameter) between the maximum value and the minimum value of the thus-finally-obtained approximated curve should be regarded as the final 'transmitted wavefront aberration'. The effective value of the driving voltage should be controlled separately for each of the stripe-like electrode patterns in such a manner that the thus-obtained PV in the incident beam diameter may become within $\lambda/4$, preferably, within $\lambda/8$.

Specific example thereof is described next with reference to FIG. 25.

Figure 25:
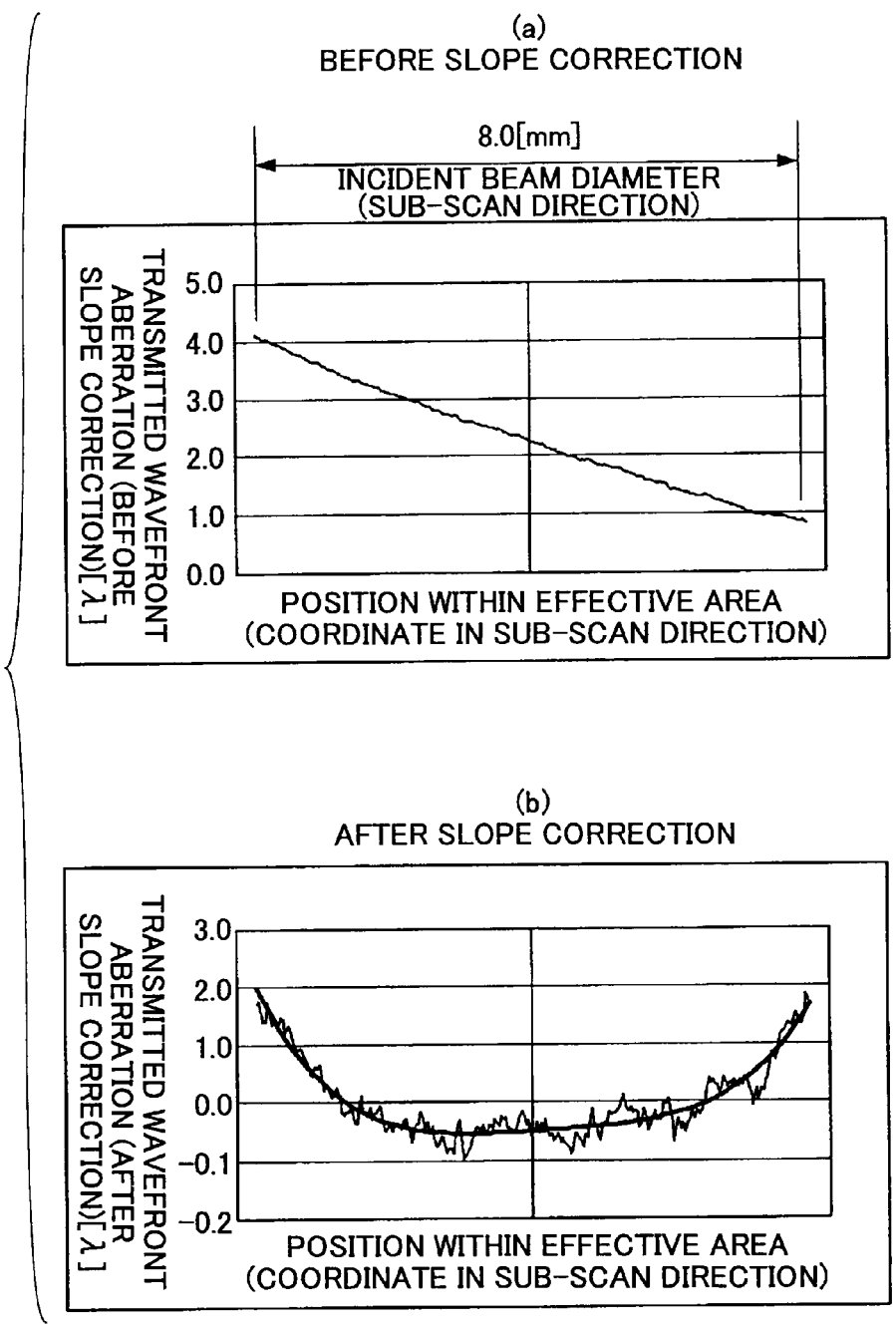
FIG. 25 shows transmitted wavefront aberration with respect to a position within the effective area before and after correction by means of the liquid crystal device.

FIG. 25, (*a*) shows a measurement result of the transmitted wavefront aberration for a case where CH1=1.0 [V] and CH2=3.0 [V] are applied to the terminals 1 and 2 of the liquid crystal device 243, and this result is obtained as a result of the transmitted wavefront aberration obtained in the non-driven state being removed. The horizontal axis denotes a position in the incident beam diameter (coordinate in the sub-scan direction). In the present example, the laser beam having the overall width in the sub-scan direction of 8.0 [mm] was applied to the liquid crystal device. The vertical axis denotes transmitted wavefront aberration, and the result shown in FIG. 25, (*a*) shows that a difference between the maximum value and the minimum value thereof is approximately $3.2\lambda$ ($\lambda$=655 nm). In a case where phase modulation is made in this manner, a light path deflection angle $\beta$ is obtained by the following formula:

$$\beta = \tan^{-1}(3.2 \times 655 \text{ [nm]}/8.0 \text{ [nm]}) = 0.9 \text{ [min.]}$$

FIG. 25, (*b*) shows a first curve obtained from removing a slope component from the curve shown in FIG. 25, (*a*), and a second curve obtained from approximating the first curve by a quartic polynomial. From this result, it can be seen that, in this driving condition, the transmitted wavefront aberration (corresponding to positive power) on the order of $0.25\lambda$ (=$\lambda/4$) occurs in PV. When this liquid crystal device is applied to the optical system of the optical scanning device, a fluctuation of the beam waist position (focus position) in the vicinity of the to-be-scanned surface occurs due to the above-mentioned transmitted wavefront aberration, and thereby, the beam spot shape may be degraded.

Beam waist position correction by mean of the liquid crystal device in the third aspect of the present invention is described next.

The liquid crystal device 243 according to the third aspect of the present invention is used, not only as a light path deflection device but also as a device for changing a convergent (or divergent) state of an exit beam, as a result of the respective stripe-like electrode patterns 256 being separately controlled.

Figure 26:
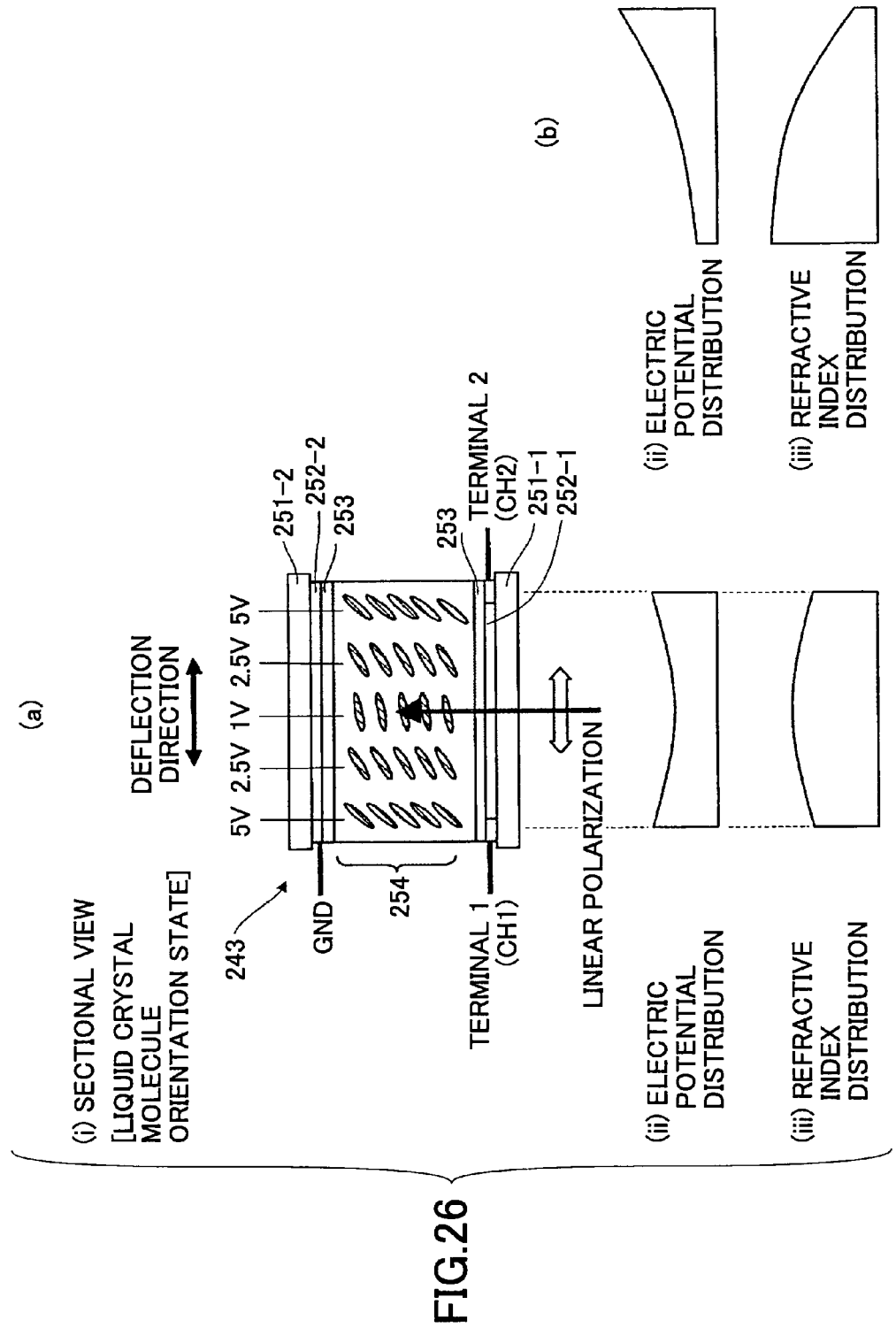
FIG. 26 shows a sectional configuration and a liquid crystal molecule orientation state of the liquid crystal device according to the third aspect of the present invention; and an electric potential distribution and a refractive index distribution within a liquid crystal layer in an effective area of the liquid crystal device in the third aspect of the present invention.

In this case, as shown in FIG. 26, (*a*), (*iii*), the electronic potential distribution (ii) should be controlled in such a manner that the refractive index distribution may exhibit a curve which can be approximated at least by a polynomial having a quadratic or a further higher order.

By providing the liquid crystal device 243 controllable as described above in the optical system of the optical scanning device 220, it is possible to adjust the beam waist position (focus position) in the vicinity of the to-be-scanned surface of the photosensitive drum 216. Thereby, it is possible to correct degradation in the beam spot shape occurring due to the beam waist position (focus position) such as that described above with reference to FIG. 25.

In this case, a beam waist position detection sensor for detecting the beam waist position should be disposed in the vicinity of the to-be-scanning surface, and, based on the detection result, the liquid crystal device 243 should be driven and controlled.

As shown in FIG. 26, (b), it is also possible to achieve simultaneously, in an arbitrary way, both the function of deflecting the exit beam and the function of changing the convergent (or divergent) state of the exit beam, by controlling the electric potential distribution as shown in FIG. 26, (b), (ii), and thus controlling the refractive index distribution in the liquid crystal device 243 as shown in FIG. 26, (b), (iii), so as to generate both a slope component and a spherical aberration component in the transmitted wavefront of the laser beam, as shown.

The liquid crystal device driving IC is described next.

First, a configuration of the liquid crystal device driving IC is described.

As shown in FIG. 19, the semiconductor lasers 211a and 211b are driven and modulated by the semiconductor laser driving IC 247 via the semiconductor laser control part 246 based on given image data, and thus, apply the two respective laser beams 221a and 221b to the to-be-scanned surface of the photosensitive drum 216 for scanning it. On the other hand, the beam pitch detection sensor 241 is disposed at a position optically equivalent to the surface of the photosensitive drum 216, and therewith, it is possible to detect scan line separation on the to-be-scanned surface of the photosensitive drum 216. The liquid crystal device control part 244 calculates a difference between the detection result of the beam pitch detection sensor 241 and a desired scan line separation, and, based on correction data calculated for correcting the deference, the liquid crystal device driving IC 245 drives the liquid crystal devices 243a and 243b.

By mounting the above-mentioned liquid crystal device driving IC 245 and the semiconductor laser driving IC 247 on a common circuit substrate 249, it is possible to reduce the totally required number of components, and thus, to achieve a cost reduction. Furthermore, as another embodiment shown in FIG. 27, by providing a configuration such that a common IC 248 (liquid crystal device and semiconductor laser driving IC) may have both the functions of driving the liquid crystal devices and driving the semiconductor lasers, it is possible to achieve a further cost reduction for the totally required components.

The above-mentioned configuration of mounting a liquid crystal device driving IC and a semiconductor laser driving IC on a common circuit substrate may also be applied to any other embodiments described above according to the above-described first aspect and second aspect of the present invention.

Also, the above-mentioned configuration such that a common IC (liquid crystal device and semiconductor laser driving IC) may be provided to have both the functions of driving the liquid crystal devices and driving the semiconductor lasers may also be applied to any other embodiments described above according to the above-described first aspect and second aspect of the present invention.

Next, application of the third aspect of the present invention to an image forming apparatus is described.

First, an example of applying an optical scanning device according to the third aspect of the present invention described.

Figure 27:
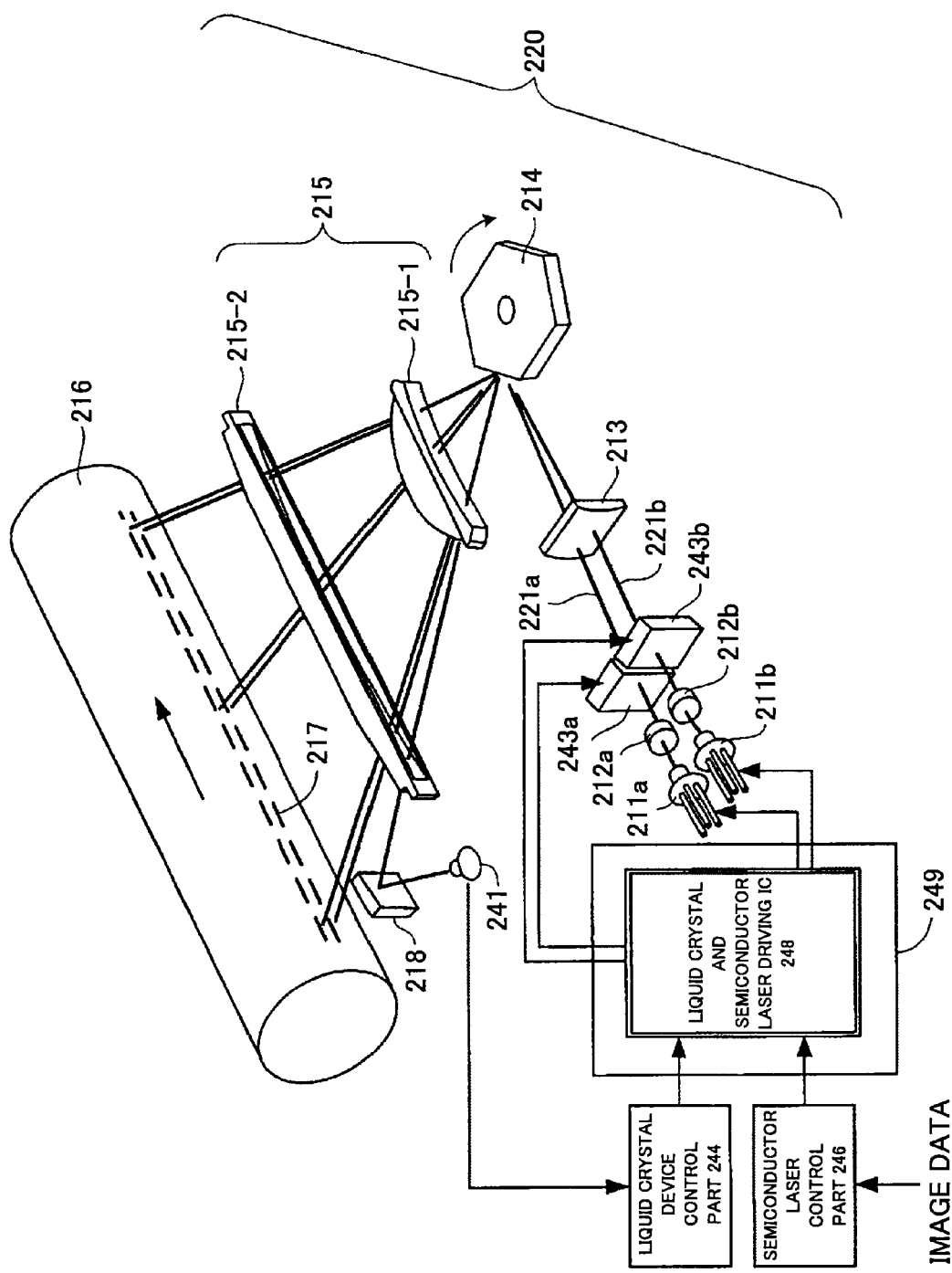
FIG. 27 shows a general configuration diagram of an optical scanning device in another embodiment of the third aspect of the present invention.
Figure 29:
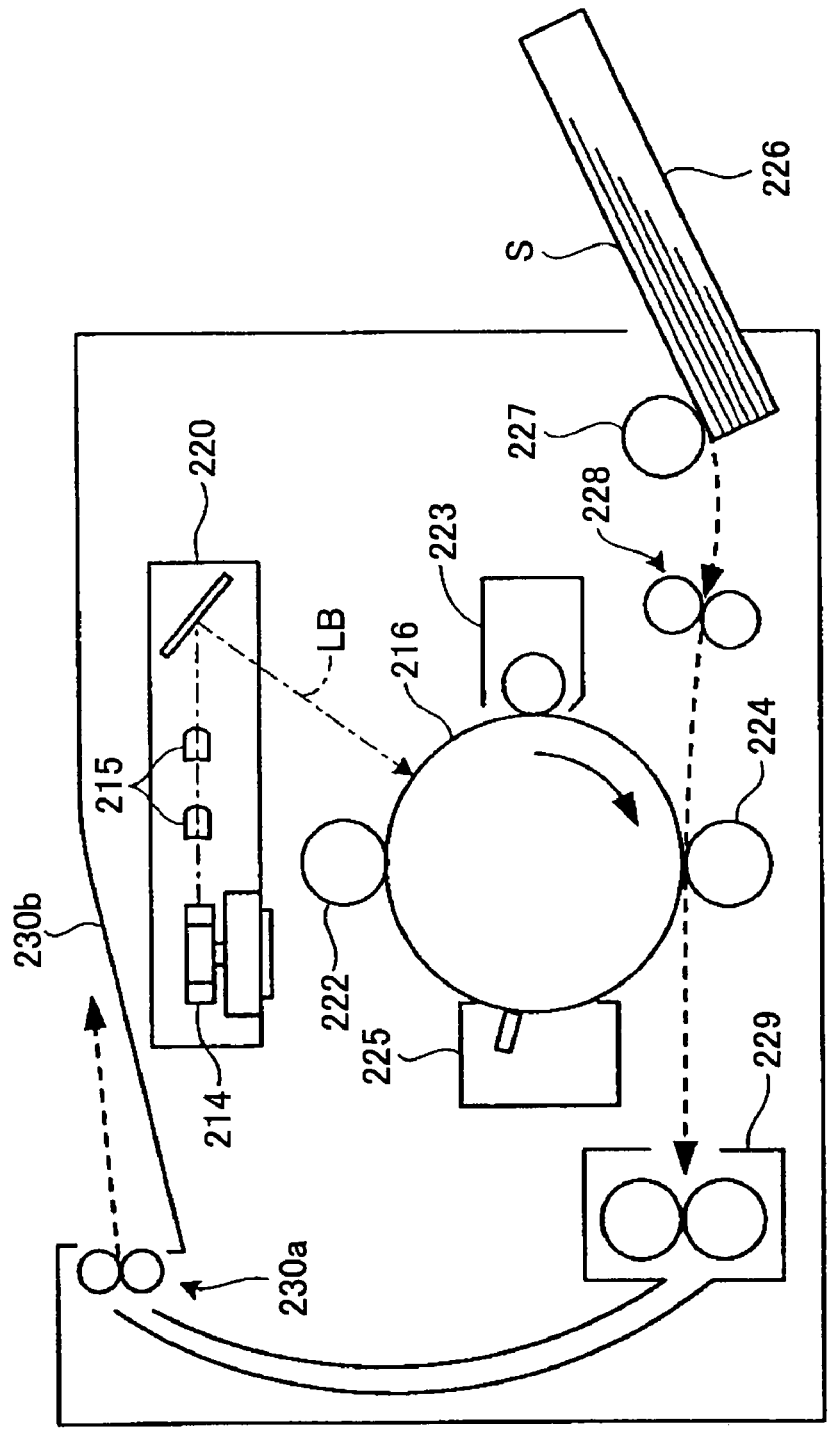
FIG. 29 shows a general configuration diagram of an image forming apparatus applying an electrophotographic process according to the third aspect of the present invention.

FIG. 29 roughly shows an example of an image forming apparatus according to the third aspect of the present invention utilizing an electrophotographic process. This image forming apparatus has a photoconductive photosensitive drum 216 acting as an image carrying body. Around the photosensitive drum 216, a charging roller 224 as an electric charging device, a developing device 223, a transfer roller 224 acting as a transferring device, and a cleaning device 225 are disposed. Instead of the charging roller 222, it is possible to employ a corona charger, a charging brush or such as the electric charging device. Further, as an optical writing device for producing a latent image on the electrically charged photosensitive drum 216 corresponding to give image information, the optical scanning device 220 for carrying out optical scanning is provided. This optical scanning device 220 carries out exposing operation by means of optical writing on the photosensitive drum 216 between the charging roller 222 and the developing device 223. As this optical scanning device 220, the optical scanning device configured as shown in FIG. 19 or 27 is used. Further, as shown in FIG. 29, the image forming apparatus further includes a paper feeding cassette 226, a paper feeding roller 227, a registration roller pair 228, a fixing device 229, a paper ejecting roller pair 230a and a paper ejecting tray 230b. In this machine, a recording paper S used as a recording material is handled as described below.

When image forming is carried out in this machine, the photosensitive drum 216 is rotated clockwise at a uniform velocity, the surface thereof is uniformly eclectically charged by the charring roller 222, and an electrostatic latent image is produced thereon as a result of a laser beam LB of the optical scanning device 220 being applied to the surface of the photosensitive drum 216 whereby the surface of the photosensitive drum 216 is exposed. This electrostatic latent image is visualized as a result of being developed by the developing device 223, and thus, a toner image is produced on the surface of the photosensitive drum 216.

The paper feeding cassette 226 is detachable from the body of the image forming apparatus. In a state in which the paper feeding cassette 226 in which the recording paper sheets S are held is loaded in the image forming apparatus body as shown, the top sheet S is fed from the cassette 226 by means of the paper feeding roller 227, and the movement top of the thus-fed recording paper S is nipped by the registration roller pair 228. The registration roller pair 227 feeds the recording paper S to a nip part between the transfer roller 224 and the photosensitive drum 216, in such a manner that a timing of feeding the recording paper S may be adjusted in response to a movement of the toner image on the photosensitive drum 216 to a transfer position. The thus-fed recording paper S is placed on the toner image on the photosensitive drum 216 at the transfer part, and has the toner image transferred thereto in an electrostatic transfer manner by a function of the transfer roller 224. The recording paper S thus having the toner image transferred thereto is sent to the fixing device 229, the toner image is fixed to the recording paper S by the fixing device 229, the recording paper S passes through a conveyance path, and then, the recording paper S is ejected to the paper ejecting tray 230b by means of the paper ejecting roller pair 230a. On the other hand, the surface of the photosensitive drum 216 from which the toner image is thus transferred is cleaned by the cleaning device 225, and thus, residual toner or paper dust is removed therefrom.

In the image forming apparatus applied the electrophotographic process, when the optical scanning device 220 configured as shown in FIG. 19 or 27 is used, as described above, it is possible to change the beam spot position on the photosensitive drum 216 as is necessary. Therefore, it is possible to obtain therefrom a high-quality output image. Further, in a case of a multi-beam scanning device in which a plurality of beams are simultaneously used for scanning, it is possible to achieve an improvement of a printing speed or a printing density.

When the above-mentioned image forming apparatus is applied as a printer or a digital copier as a practical use, the beam spot separation (mainly separation in the sub-scan direction, i.e., the scan line separation) may shift, due to vibration applied during the shipment of the product from the factory, due to a restriction of a location at which the product is actually installed for a user, or such, even after a strict adjustment has been carried out in an adjustment process before the shipment. Furthermore, due to aging at the user's location, ambient temperature environment at the location, machine temperature rise due to continuous printing operation of the machine or such, the scan line separation may shift.

In such a case, by detecting by means of the beam pitch detection sensor 241 acting as a system for detecting the scan line separation (beam pitch in the sub-scan direction) in the image forming apparatus, the scan line separation shift occurring as mentioned above is detected, and, based on the detection result, the liquid crystal devices 243a and 243b are driven so that the scan line separation shift is corrected.

In a case where the above-mentioned image forming apparatus is applied to a composite machine which is used both as a printer and a copier, a pixel density may be switched between a printer mode (in which the composite machine is used as a printer) and a copy mode (in which the composite machine is used as a copier). For example, 600 dpi is selected for the printer mode while 400 dpi is selected for the copy mode. Thereby, it is possible to achieve the pixel density suitable for each mode.

Furthermore, there is a case where, with the use of an operation panel or such, a user or an operator wishes to switch the pixel density freely by inputting pixel density switching instructions, according to each particular operation purpose (desired function), i.e., for a case where a high image quality (1200 dpi) is preferred or for a case where rather a high speed (many number of output printed matters) (600 dpi) operation is preferred, for example.

In these cases, by appropriately driving and controlling the light path deflection devices (liquid crystal devices) 243a and 243b provided in the relevant image forming apparatus, it is possible to easily switch the pixel density.

In the above-described first application example shown in FIG. 29 according to the third aspect of the present invention, relative position (beam pitch) among the plurality of beams scanning the to-be-scanned surface of the single photosensitive drum 216 is adjusted to a desired value, and thus, obtaining a high quality output image can be achieved.

Figure 28:
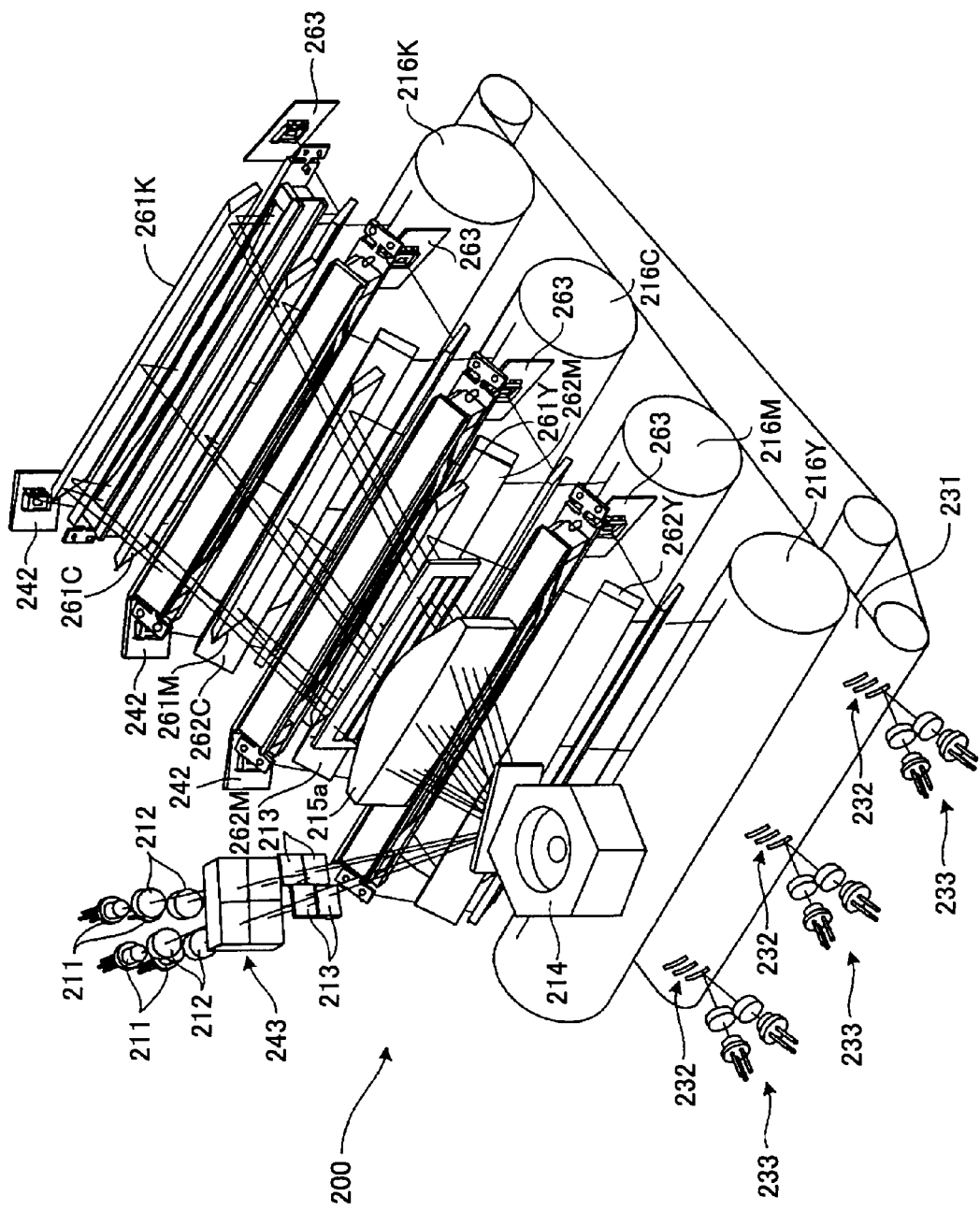
FIG. 28 shows a configuration example of an optical scanning device used in an image forming apparatus in a four drum tandem type in further another embodiment of the third aspect of the present invention.
Figure 30:
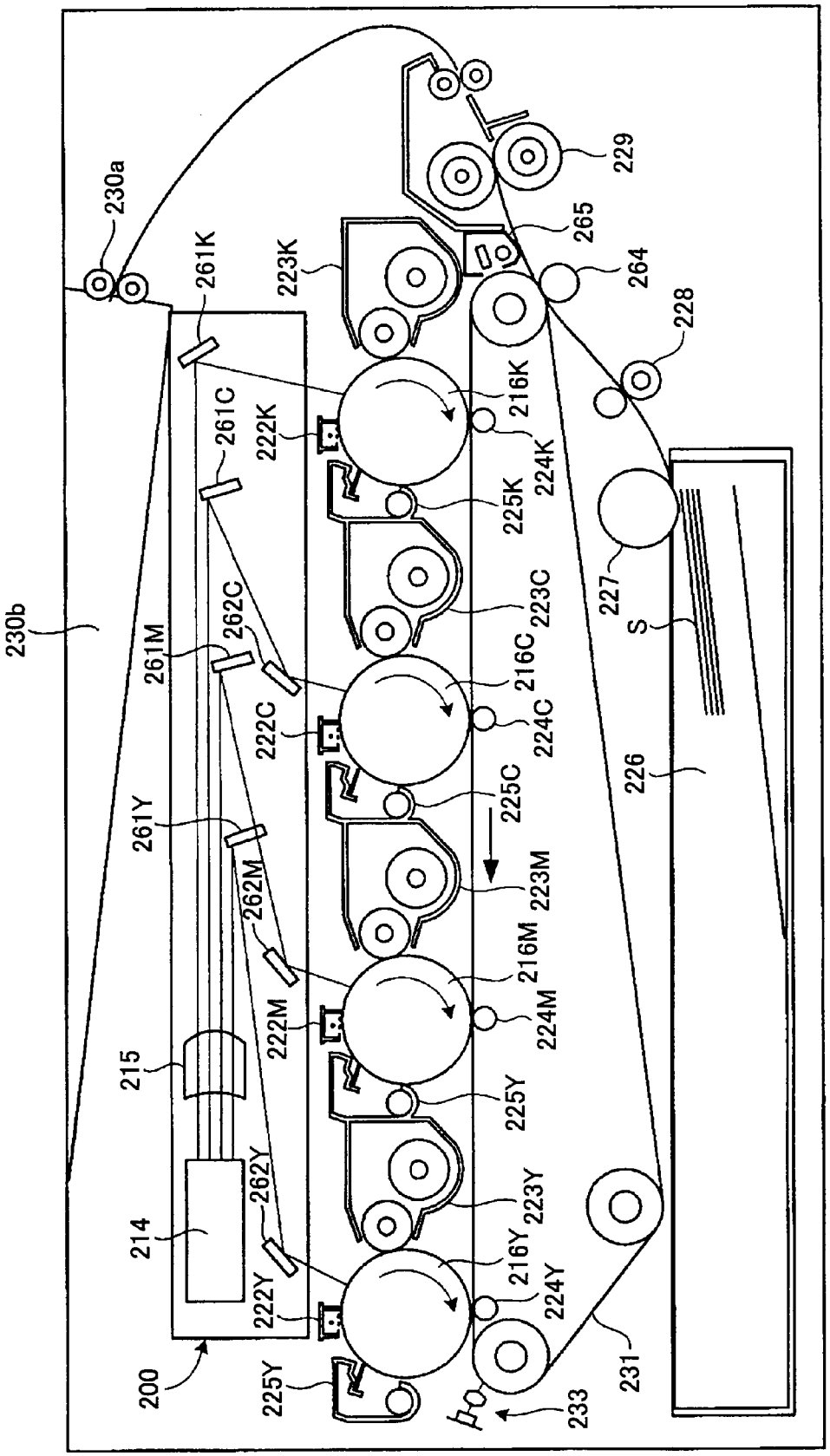
FIG. 30 shows a configuration example of an image forming apparatus in a four drum tandem type applying the optical scanning device shown in FIG. 28.

On the other hand, in a second application example shown in FIGS. 28 and 30 also according to the third aspect of the present invention, correction of scan line positional shift among a plurality of photosensitive bodies (color drift among stations) is directed to.

FIG. 28 shows a configuration example of an optical scanning device 200 used in a four drum tandem type image forming apparatus, and FIG. 30 shows a configuration example of a four drum tandem type image forming apparatus employing the optical scanning device 200, according to the third aspect of the present invention.

In this image forming apparatus, as shown in FIGS. 28 and 30, an intermediate transfer belt 231 acting as an intermediate transfer body, provided to lie approximately horizontally is provided. On the intermediate transfer belt 231, a photosensitive drum 216K for black K, a photosensitive drum 216C for cyan C, a photosensitive drum 216M for magenta M and a photosensitive drum 216Y for yellow Y are disposed in the stated order from the side of upstream in sequence. Hereinafter, the corresponding suffixes K, C, M and Y are attached as is necessary to respective reference numerals.

These photosensitive drums 216K, 216C, 216M and 216Y are produced to have the same diameter, and, around each of them, process devices for carrying out image forming according to the electrophotographic process are disposed in sequence, and thus, image production stations for the respective colors are configured. Description is made next for the image production station for the block K as a typical example. Around the photosensitive drum 216K, an electric charger 222K, an exposing part of the optical scanning device 200, a developing device 223K, a transfer member 224K, a cleaning device 225K and so forth are disposed in sequence. The same process devices are disposed around each of the photosensitive drums 116C, 116M and 116Y for the image production station of the other relevant three colors.

In the present embodiment of FIGS. 28 and 30, the four photosensitive drums 216K, 216C, 216M and 216Y are used as the to-be-scanned surfaces set for the respective colors, and for each of them, the scanning optical system of the optical scanning device 200 is provided to have a one-to-one correspondence relationship. As shown in FIG. 28, the optical scanning device 200 has four sets, for the respective four photosensitive drums 116K, 116C, 116M and 116Y, each set including a light source (for example, a semiconductor laser) 211, a coupling lens 212, a cylindrical lens 213 and a liquid crystal device 243. A single optical scanning device (polygon mirror) 214 is used in common for the four laser beams for the respective four colors, and also, a scanning lens 215 of a scanning optical system on the side of the polygon mirror 214 is used in common for these four laser beams. Further, as is necessary, a lens for correcting an image surface curvature, an aberration or such may be provided in the light path of each laser beam. Instead of such a lens for correction, it is also possible to configure mirrors, originally provided for bending the light paths, in such a manner that these mirrors also have the relevant correction functions. The four light sources 211 may be multi-beam light sources each emitting a plurality of laser beams (for example, semiconductor laser arrays or such).

The laser beams emitted from the four light sources 211 pass through the coupling lenses 212, the liquid crystal devices 243 and the cylindrical lenses 213, and then, are incident on a deflection reflective surface of the polygon mirror 214. Then, these laser beams are deflected by the polygon mirror 214 for scanning, pass through the scanning lens 215, scan and expose the to-be-scanned surfaces of the respective photosensitive drums 216Y, 216M, 216C and 216Y via the light path bending mirrors 261K, 261C, 261M, 262C, 262M and 262Y. Thus, respective electrostatic latent images are produced thereon. Corresponding to the respective laser beams, synchronization detection sensors 242 for detecting their scanning start positions, detection sensors 263 for detecting the beam spot position and/or beam spot separation and/or beam waist position of each laser beam, or such, are provided.

The electrostatic latent images thus produced on the respective photosensitive drums 216K, 216C, 216C and 216Y by means of the scanning and exposing with the respective laser beams are developed and thus visualized as a result of being developed by the developing devices 223K, 223C, 223M and 223Y for the respective colors, and thus, toner images are produced on the surfaces of the respective photosensitive drums. The thus-produced toner images of the respective colors on the respective photosensitive drums 216K, 216C, 216M and 216Y are then transferred to the intermediate transfer belt 231 in such a manner that they may be superposed by each other in sequence, and thus, a color toner image of the four colors thus superposed is produced on the intermediate transfer belt 231. On the other hand, the surfaces of the respective photosensitive drums 216K, 216C, 216M and 216Y from which the toner images are thus transferred are cleaned by the cleaning devices 225K, 225C, 225M and 225C, respectively, and thus, residual toner or paper dust is removed therefrom.

Further with reference to FIG. 30, a paper feeding cassette 226 is detachable from the body of the image forming apparatus. In a state in which the paper feeding cassette 226 in which the recording paper sheets S are held is loaded in the image forming apparatus body as shown, the top sheet S is fed from the cassette 226 by means of a paper feeding roller 227, and the movement top of the thus-fed recording paper S is nipped by a registration roller pair 228. The registration roller pair 228 feeds the recording paper S to a nip part between a secondary transfer roller 264 and the intermediate transfer belt 231, in such a manner that a timing of feeding the recording paper S may be adjusted in response to movement of the toner image transferred on the intermediate transfer belt 231 to a secondary transfer position. The thus-fed recording paper S is placed on the toner image on the intermediate transfer belt 231 at the secondary transfer part, and has the toner image transferred thereto in an electrostatic transfer manner by a function of a secondary transfer roller 264. The recording paper S thus having the toner image transferred thereto is sent to a fixing device 229, the toner image is fixed to the recording paper S by the fixing device 229, the recording paper S passes through a conveyance path, and then, the recording paper S is ejected to a paper ejecting tray 230b by means of a paper ejecting roller pair 230a. On the other hand, the surface of the intermediate transfer belt 231 from which the toner image is thus transferred is cleaned by a belt cleaning device 265, and thus, residual toner or paper dust is removed therefrom.

In the color image forming apparatus configured as shown in FIGS. 28 and 30, phases of both the movement of the intermediate transfer belt 231 and the rotation of the polygon mirror 214 are not in synchronization. Therefore, there is a possibility that an image writing start position in the sub-scan direction shifts among the image production stations (the respective photosensitive drums) for an amount corresponding to one scanning operation at the maximum.

In order to solve this problem, in the configuration of FIG. 28, the liquid crystal devices 243 are provided in the respective light paths of the laser beams reaching the respective photosensitive drums 216K, 216C, 216M and 216Y. These liquid crystal devices 243 may be produced in a manner in which a plurality of respective effective areas are provided in a single device, or separate devices are provided each having a single effective area for each laser beam.

By changing the beam spot positions on the respective photosensitive drums 216K, 216C, 216M and 216Y by means of these liquid crystal devices 243, it becomes possible to correct a difference of the writing start positions among the image production stations (that is, a relative position error of the beam spots among the photosensitive drums) caused due to the above-mentioned non-synchronization of the phases between the movement of the intermediate transfer belt 231 and the rotation of the polygon mirror 214. Thereby, it is possible to reduce color drift of the toner image on the intermediate transfer belt 231, otherwise occurring due to the above-mentioned difference in the writing start positions, for example, and as a result, it is possible to obtain a high quality output image (color image).

Further, it is possible to correct a possible error in the writing start timings (that is, writing start positions) in the sub-scan direction, by detecting toner images 232 specially produced for detecting color drift among the image production stations in three positions on the intermediate transfer belt 231, for example, by means of color drift detection sensors 233 each including a light emitting device and a light receiving device, respectively, as shown. Then, the liquid crystal devices 243 are driven and controlled according to the thus-obtained detection results (a degree of actual color drift occurring among the image production stations for the respective colors). Furthermore, it is possible to apply a configuration in which, for the purpose of detecting a beam waist position (focusing condition), a single-dot toner image is specially produced, a detection sensor for detecting an area of the thus-produced single-dot toner image is provided, and a possible error of the beam waist position (focusing condition) is corrected based on the detection result of this detection sensor.

Furthermore, it is possible to achieve correction of a beam spot position and/or beam spot separation and/or beam wait position at a higher accuracy by carrying out the correction based on the detection results of, not only that of the above-mentioned color drift detection sensors 233 provided in the image forming apparatus, but also sensors 263 for detecting a beam spot position and/or beam spot separation and/or beam waist position on the to-be-scanned surfaces provided in the optical scanning device, or temperature sensors (not shown).

The liquid crystal devices 243 for correcting the beam spot position and/or beam spot separation and/or beam waist position should not be necessary provided on the respective light paths of all the laser beams for the respective colors. Instead, an alternative configuration may be applied in which, for the purpose of carrying out a positional adjustment with respective to a reference color (for example, black K), the liquid crystal devices 243 are provided only on the light paths of the other colors (cyan C, magenta M and yellow Y).

A third example of applying the above-mentioned optical scanning device according to the third aspect of the present invention is described next.

Figure 31:
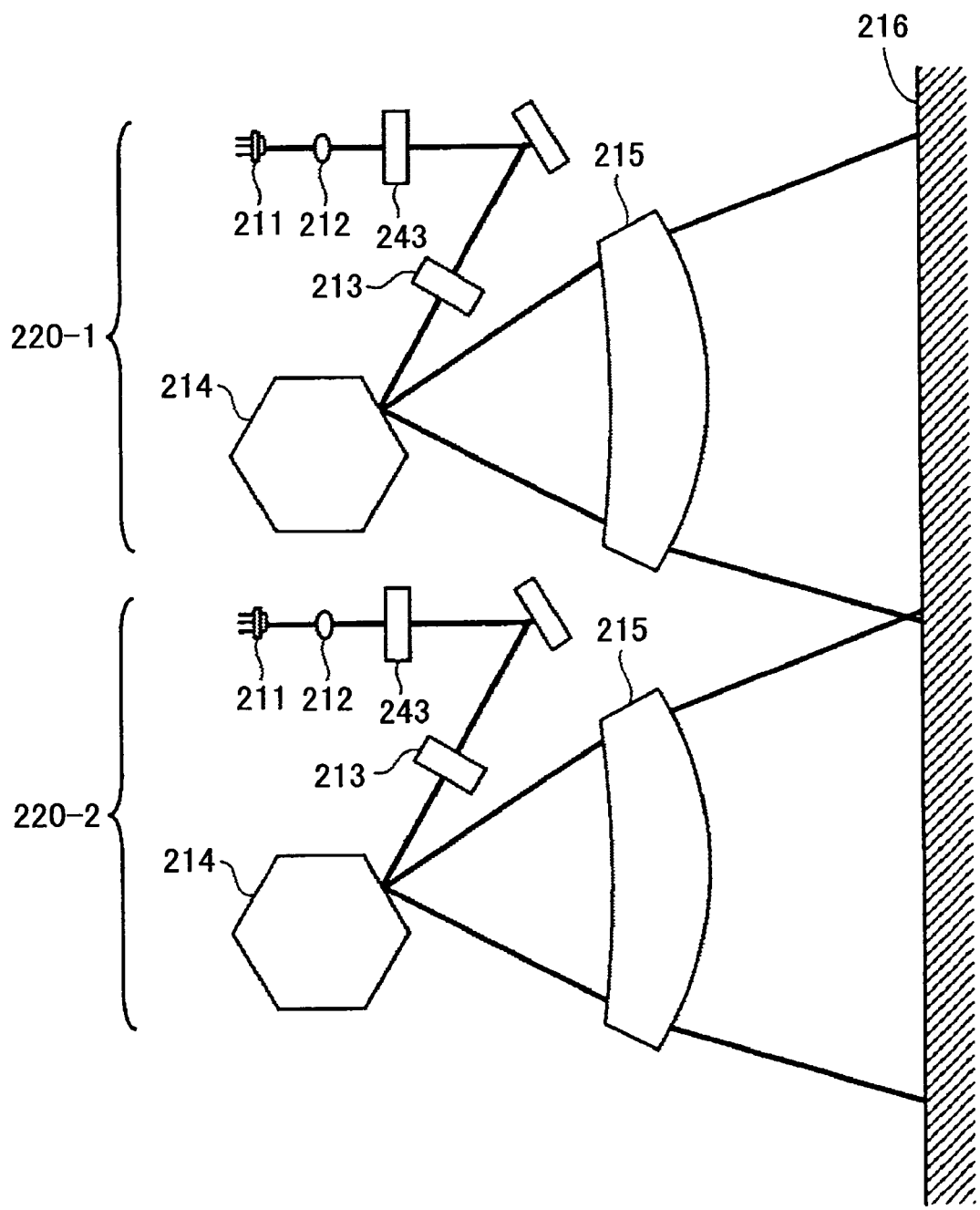
FIG. 31 shows further another embodiment of the third aspect of the present invention, and shows a configuration example for a case where a plurality of optical scanning devices are disposed side by side in a main scan direction, and scanning is carried out in such a manner that an effective writing range is divided.

As shown in FIG. 31, it is possible to apply a configuration in which, a plurality of optical scanning devices 220-1 and 220-2 are disposed side by side in the main scan direction, and thereby, an effective writing range to be scanned is divided or shared therebetween. A configuration of each of the respective optical scanning devices 220-1 and 220-2 is approximately the same as the optical scanning device shown in FIG. 19 or 27. That is, each optical scanning device 220-1 or 220-2 includes a semiconductor laser 211 as a light source, a coupling lens 212, a liquid crystal device 243, a cylindrical lens 213, a polygon mirror 214, a scanning lens 215 and so forth. As the light source, a multi-beam light source may be applied including a plurality of semiconductor lasers or a semiconductor laser array.

A laser beam emitted by the semiconductor laser 211 and coupled by the coupling lens 212 can be deflected by means of the liquid crystal device 243 by a slight angle, and thus, correction can be made such that a beam spot position on the to-be-scanned surface 216 may be changed. Accordingly, at a time of initial adjustment or for a case where an error in a scan line position occurs at a position at which the divided scanning ranges are connected with one another, due to environmental fluctuation/aging variation or such, it is possible to correct the scan line positional error by driving the liquid crystal devices 243 appropriately.

In the configuration shown in FIG. 31, it is possible to widen the effective writing range by disposing the plurality of optical scanning devices 220-1 and 220-2 side by side, and thus, it is possible to carry out image forming to a large-sized recording paper such as that of A1, A2, B1, B2 or such. On the other hand, when the same effective writing range is applied, it is possible to miniaturize the optical devices and the deflection devices, thereby it is possible to reduce beam waist positional shift occurring due to mechanical tolerance or temperature fluctuation, and thus, and it is possible to reduce wavefront aberration. As a result, it is possible to obtain a high quality output image.

Thus, in an optical scanning device according to the third aspect of the present invention, it is possible to apply it as a suitable optical writing device in an image forming apparatus, and thereby, it is possible to achieve the image forming apparatus from which a high quality output image can be obtained. Further, it is possible to produce a multi-color or full-color image with an effectively reduced color drift or tint sift, and thus, it is possible to achieve an image forming apparatus having a well reduced color drift. An image forming apparatus according to the third aspect of the present invention can be applied to a digital copier, a laser printer, a laser facsimile machine, a laser plotter, a document printer or such including an optical scanning device. Further, an optical scanning device according to the third aspect of the present invention can also be applied for, other than an image forming apparatus, an image display apparatus, an image drawing apparatus or such.

Further, the present invention is not limited to the above-described embodiments, and variations and modifications may be made without departing from the basic concept of the present invention claimed in Cross-Reference to Related applications.

What is claimed is:

1. An optical scanning device comprising a laser-beam-phase-modulatable liquid crystal device, said liquid crystal device comprising:
    stripe-like electrode patterns arranged in one direction; and
    a voltage controller configured to change an effective value of a driving voltage separately for each of said stripe-like electrode patterns such that the driving voltage of each of said stripe-like electrode patterns is defined by a continuously changing function,
    wherein the liquid crystal device is disposed on a light path extending between a light source and a polygon scanner, and, when the liquid crystal device is viewed from an entrance side, the plural strip-like electrode patterns are disposed within an effective area of the liquid crystal device, and a light beam applied to the liquid crystal device is deflected as a result of passing through the plural electrode patterns.

2. An optical scanning device comprising a laser-beam-phase-modulatable liquid crystal device, said liquid crystal device comprising:
    stripe-like electrode patterns arranged in one direction; and
    a voltage controller configured to change an effective value of a driving voltage of said stripe-like electrode patterns such that a refractive index distribution obtained from driving the liquid crystal device is not constant and the refractive index distribution is in proportion to a position (coordinate) in the direction of the arrangement of said stripe-like electrode patterns,
    wherein the liquid crystal device is disposed on a light path extending between a light source and a polygon scanner, and, when the liquid crystal device is viewed from an entrance side, the plural strip-like electrode patterns are disposed within an effective area of the liquid crystal device, and a light beam applied to the liquid crystal device is deflected as a result of passing through the plural electrode patterns.

3. The optical scanning device as claimed in claim 1, wherein the effective value of the driving voltage is separately changed for each of the stripe-like electrode patterns in such a manner that a refractive index distribution obtained from driving said liquid crystal device is in proportion to a position (coordinate) in the direction of the arrangement of said stripe-like electrode patterns.

4. The optical scanning device as claimed in claim 1, wherein the effective value of the driving voltage is separately changed for each of the stripe-like electrode patterns in such a manner that a difference (PV within an entrance beam diameter) between a maximum value and a minimum value of a curve, obtained from removing a slope component from a curve, obtained from approximating, by a polynomial having a quadratic order or a higher order, a deviation between a transmitted wavefront aberration of transmitted light when the liquid crystal device is driven and the same when the liquid crystal device is not driven, is equal to or less than $\lambda/4$ (where $\lambda$ denotes a laser beam wavelength).

5. The optical scanning device as claimed in claim 1, wherein the effective value of the driving voltage is separately changed for each of the stripe-like electrode patterns in such a manner that a refractive index curve with respect to a position (coordinate) in the direction of the arrangement of the stripe-like electrode patterns is one which at least can be approximated by a polynomial having a quadratic order or a higher order.

6. The optical scanning device as claimed in claim 1, wherein an integrated circuit (IC) generating an electric signal driving said liquid crystal device is mounted on a substrate on which also an integrated circuit (IC) generating an electric signal driving a semiconductor laser emitting a laser beam is mounted.

7. The optical scanning device as claimed in claim 2, wherein an integrated circuit (IC) generating an electric signal driving said liquid crystal device is mounted on a substrate on which also an integrated circuit (IC) generating an electric signal driving a semiconductor laser emitting a laser beam is mounted.

8. The optical scanning device as claimed in claim 1, wherein an electric signal driving said liquid crystal device and an electric signal driving a semiconductor laser emitting a laser beam are generated by a common integrated circuit (IC).

9. The optical scanning device as claimed in claim 2, wherein an electric signal driving said liquid crystal device and an electric signal driving a semiconductor laser emitting a laser beam are generated by a common integrated circuit (IC).

10. The optical scanning device as claimed in claim 1, wherein a plurality of laser beams are used to scan a common to-be-scanned surface, and, by means of said liquid crystal device, a position of a beam spot of at least one laser beam can be changed.

11. The optical scanning device as claimed in claim 2, wherein a plurality of laser beams are used to scan a common to-be-scanned surface, and, by means of said liquid crystal device, a position of a beam spot of at least one laser beam can be changed.

12. The optical scanning device as claimed in claim 1, wherein a plurality of laser beams are used to scan different to-be-scanned surfaces, and, by means of said liquid crystal device, a position of a beam spot of at least a laser beam which scans one to-be-scanned surface can be changed.

13. The optical scanning device as claimed in claim 2, wherein a plurality of laser beams are used to scan different to-be-scanned surfaces, and, by means of said liquid crystal device, a position of a beam spot of at least a laser beam which scans one to-be-scanned surface can be changed.

14. The optical scanning device as claimed in claim 1, wherein by means of said liquid crystal device, a position (imaging position) of a beam waist of a laser beam in the vicinity of a to-be-scanned surface can be changed.

15. The optical scanning device as claimed in claim 2, wherein by means of said liquid crystal device, a position (imaging position) of a beam waist of a laser beam in the vicinity of a to-be-scanned surface can be changed.

16. The optical scanning device as claimed in claim 10, further comprising:
   a detecting part configured to detect a position of a beam spot of the laser beam and/or beam spot separation on the to-be-scanned surface,
   wherein a beam spot position of at least one laser beam is corrected based on a detection result of said detecting part.

17. The optical scanning device as claimed in claim 11, further comprising:
   a detecting part configured to detect a position of a beam spot of the laser beam and/or beam spot separation on the to-be-scanned surface,
   wherein a beam spot position of at least one laser beam is corrected based on a detection result of said detecting part.

18. The optical scanning device as claimed in claim 12, further comprising:
   a detecting part configured to detect a position of a beam spot of the laser beam and/or beam spot separation on the to-be-scanned surface,
   wherein a beam spot position of at least one laser beam is corrected based on a detection result of said detecting part.

19. The optical scanning device as claimed in claim 13, further comprising:
   a detecting part configured to detect a position of a beam spot of the laser beam and/or beam spot separation on the to-be-scanned surface,
   wherein a beam spot position of at least one laser beam is corrected based on a detection result of said detecting part.

20. The optical scanning device as claimed in claim 14, further comprising:
   a detecting part configured to detect a position (imaging position) of a beam waist of the laser beam in the vicinity of the to-be-scanned surface,
   wherein based on a detection result of said detecting part, the position of the beam waist is corrected.

21. The optical scanning device as claimed in claim 15, comprising:
   a detecting part configured to detect a position (imaging position) of a beam waist of the laser beam in the vicinity of the to-be-scanned surface,
   wherein based on a detection result of said detecting part, the position of the beam waist is corrected.

22. The optical scanning device as claimed in claim 10, further comprising:
   a temperature detecting part configured to detect a temperature inside of the device,
   wherein based on a detection result of said temperature detecting part, at least one of a beam spot position on the to-be-scanned surface, beam spot separation and a beam waist position is corrected.

23. The optical scanning device as claimed in claim 11, further comprising:
   a temperature detecting part configured to detect a temperature inside of the device,
   wherein based on a detection result of said temperature detecting part, at least one of a beam spot position on the to-be-scanned surface, beam spot separation and a beam waist position is corrected.

24. The optical scanning device as claimed in claim 12, further comprising:
   a temperature detecting part configured to detect a temperature inside of the device,
   wherein based on a detection result of said temperature detecting part, at least one of a beam spot position on the to-be-scanned surface, beam spot separation and a beam waist position is corrected.

25. The optical scanning device as claimed in claim 13, further comprising:
   a temperature detecting part configured to detect a temperature inside of the device,
   wherein based on a detection result of said temperature detecting part, at least one of a beam spot position on the to-be-scanned surface, beam spot separation and a beam waist position is corrected.

26. The optical scanning device as claimed in claim 14, further comprising:
   a temperature detecting part configured to detect a temperature inside of the device,
   wherein based on a detection result of said temperature detecting part, at least one of a beam spot position on the to-be-scanned surface, beam spot separation and a beam waist position is corrected.

27. The optical scanning device as claimed in claim 15, further comprising:
   a temperature detecting part configured to detect a temperature inside of the device,
   wherein based on a detection result of said temperature detecting part, at least one of a beam spot position on the to-be-scanned surface, beam spot separation and a beam waist position is corrected.

28. An image forming apparatus comprising:
   an image carrying body having photoconductivity;
   a charging part electrically charging said image carrying body;
   an optical scanning device forming an electrostatic latent image by scanning the electrically charged image carrying body with a laser beam;
   a developing part visualizing with toner the electrostatic latent image on said image carrying body; and
   a transferring part transferring a thus-visualized toner image to a recording medium or to an intermediate transfer body,
   wherein as said optical scanning device, the optical scanning device claimed in claim 1 is employed.

29. An image forming apparatus comprising:
   an image carrying body having photoconductivity;
   a charging part electrically charging said image carrying body;
   an optical scanning device forming an electrostatic latent image by scanning the electrically charged image carrying body with a laser beam;
   a developing part visualizing with toner the electrostatic latent image on said image carrying body; and
   a transferring part transferring a thus-visualized toner image to a recording medium or to an intermediate transfer body,
   wherein as said optical scanning device, the optical scanning device claimed in claim 2 is employed.

30. The image forming apparatus as claimed in claim 28, wherein based on a detection result of a detecting part configured to detect at least one of a position of the toner image visualized by said developing part or an area of the toner image, at least one of a beam spot position on said image carrying body and a beam waist position is corrected.

31. The image forming apparatus as claimed in claim 29, wherein based on a detection result of a detecting part configured to detect at least one of a position of the toner image visualized by said developing part or an area of the toner image, at least one of a beam spot position on said image carrying body and a beam waist position is corrected.

32. An image forming apparatus comprising:
a plurality of image carrying bodies provided side by side, each having photoconductivity;
a charging part electrically charging each image carrying body;
an optical scanning device forming an electrostatic latent image by scanning each electrically charged image carrying body with a laser beam;
a developing part visualizing with toner of a respective color the electrostatic latent image on each image carrying body; and
a transferring part transferring a thus-visualized toner image of the respective color to a recording medium or to an intermediate transfer body on each other in a superposing manner in sequence,
wherein as said optical scanning device, the optical scanning device claimed in claim 1 is employed.

33. An image forming apparatus comprising:
a plurality of image carrying bodies provided side by side, each having photoconductivity;
a charging part electrically charging each image carrying body;
an optical scanning device forming an electrostatic latent image by scanning each electrically charged image carrying body with a laser beam;
a developing part visualizing with toner of a respective color the electrostatic latent image on each image carrying body; and
a transferring part transferring a thus-visualized toner image of the respective color to a recording medium or to an intermediate transfer body on each other in a superposing manner in sequence,
wherein as said optical scanning device, the optical scanning device claimed in claim 2 is employed.

34. The image forming apparatus as claimed in claim 32, wherein based on a detection result of a detecting part configured to detect at least one of a position of the toner image of each color visualized by said developing part or an area of the toner image, at least one of a beam spot position on each image carrying body and a beam waist position is corrected.

35. The image forming apparatus as claimed in claim 33, wherein based on a detection result of a detecting part configured to detect at least one of a position of the toner image of each color visualized by said developing part or an area of the toner image, at least one of a beam spot position on each image carrying body and a beam waist position is corrected.

36. A method of driving a liquid crystal device in an optical scanning device provided with a laser-beam-phase-modulatable liquid crystal device, wherein said liquid crystal device has stripe-like electrode patterns arranged in one direction, said method comprising:
disposing the liquid crystal device on a light path extending between a light source and a polygon scanner;
disposing the plural strip-like electrode patterns within an effective area of the liquid crystal device when the liquid crystal device is viewed from an entrance side;
changing an effective value of a driving voltage separately for each of said stripe-like electrode patterns such that the driving voltage of each of said stripe-like electrode patterns is defined by a continuously changing function; and
deflecting a light beam applied to the liquid crystal device as a result of passing through the plural electrode patterns.

37. A method of driving a liquid crystal device in an optical scanning device provided with a laser-beam-phase-modulatable liquid crystal device, wherein said liquid crystal device has stripe-like electrode patterns arranged in one direction, comprising:
disposing the liquid crystal device on a light path extending between a light source and a polygon scanner;
disposing the plural strip-like electrode patterns within an effective area of the liquid crystal device when the liquid crystal device is viewed from an entrance side;
driving the voltage of each of said stripe-like electrode patterns in the liquid crystal device such that a refractive index distribution is not constant and the refractive index distribution is in proportion to a position (coordinate) in the direction of the arrangement of said stripe-like electrode patterns; and
deflecting a light beam applied to the liquid crystal device as a result of passing through the plural electrode patterns.

38. The method of driving the liquid crystal device as claimed in claim 36, further comprising:
separately changing the effective value of the driving voltage for each of the stripe-like electrode patterns in such a manner that a refractive index distribution obtained from thus driving said liquid crystal device is in proportion to a position (coordinate) in the direction of the arrangement of said stripe-like electrode patterns.

39. The method of driving the liquid crystal device as claimed in claim 36, further comprising:
separately changing the effective value of the driving voltage for each of the stripe-like electrode patterns in such a manner that a difference (PV within an entrance beam diameter) between a maximum value and a minimum value of a curve, obtained from removing a slope component from a curve, obtained from approximating, by a polynomial having a quadratic order or a higher order, a deviation between a transmitted wavefront aberration of transmitted light when the liquid crystal device is driven and the same when the liquid crystal device is not driven is equal to or less than $\lambda/4$ (where $\lambda$ denotes a laser beam wavelength).

40. The method of driving the liquid crystal device as claimed in claim 36, further comprising:
separately changing the effective value of the driving voltage for each of the stripe-like electrode patterns in such a manner that a refractive index curve with respect to a position (coordinate) in the direction of the arrangement of the stripe-like electrode patterns is one which at least can be approximated by a polynomial having a quadratic order or a higher order.

41. The optical scanning device as claimed in claim 1, wherein the continuously changing function is a straight line having a non-zero slope.

42. The optical scanning device as claimed in claim 1, wherein the continuously changing function is a quadratic polynomial.

* * * * *